(12) United States Patent
Okouchi et al.

(10) Patent No.: US 10,668,644 B2
(45) Date of Patent: Jun. 2, 2020

(54) PORTABLE CUTTING DEVICES

(71) Applicant: MAKITA CORPORATION, Anjo-shi, Aichi (JP)

(72) Inventors: Katsumi Okouchi, Anjo (JP); Yohei Ogino, Anjo (JP)

(73) Assignee: MAKITA CORPORATION, Anjo (JP)

( * ) Notice: Subject to any disclaimer, the term of this patent is extended or adjusted under 35 U.S.C. 154(b) by 163 days.

(21) Appl. No.: 15/677,609

(22) Filed: Aug. 15, 2017

(65) Prior Publication Data

US 2018/0056543 A1 Mar. 1, 2018

(30) Foreign Application Priority Data

Sep. 1, 2016 (JP) .................................. 2016-170728
Dec. 15, 2016 (JP) .................................. 2016-243659

(51) Int. Cl.
| | |
|---|---|
| *B27G 19/04* | (2006.01) |
| *B23D 47/12* | (2006.01) |
| *B23Q 5/10* | (2006.01) |
| *B27B 27/04* | (2006.01) |
| *B27B 9/02* | (2006.01) |
| *B27B 3/28* | (2006.01) |
| *B27B 9/00* | (2006.01) |

(52) U.S. Cl.
CPC ............. *B27G 19/04* (2013.01); *B23D 47/12* (2013.01); *B23Q 5/10* (2013.01); *B27B 27/04* (2013.01); *B27B 3/28* (2013.01); *B27B 9/00* (2013.01); *B27B 9/02* (2013.01)

(58) Field of Classification Search
CPC .......... B23D 47/12; B23D 45/16; B23Q 5/10; B27B 27/04; B27B 3/28; B27B 9/00; B27B 9/02; B27G 19/04
See application file for complete search history.

(56) References Cited

U.S. PATENT DOCUMENTS 1,854,510 A * 4/1932 Haas ........................ B27B 9/02
30/376
2,693,207 A * 11/1954 Berge ....................... B27B 9/00
30/376

(Continued)

FOREIGN PATENT DOCUMENTS

| JP | 2000-37705 A | 2/2000 |
| JP | 2002-18811 A | 1/2002 |

*Primary Examiner* — Stephen Choi
(74) *Attorney, Agent, or Firm* — Oliff PLC

(57) ABSTRACT

The dust proof circular saw has a main body with a rotating disc cutter blade and a cover fixed to the body to cover a blade outer radial periphery part. The body is supported by a base such that an angle of the body in the up-down and right-left directions can be adjusted at a base upper side. A further blade outer radial periphery is covered by an auxiliary cover. The auxiliary cover covers a gap between the fixed cover and the base. The auxiliary cover is moved by a mechanism relative to the body in accordance with an angle of the circular saw main body relative to the base in the up-down direction. The auxiliary cover is pivotally connected to the base, and is pivoted around a laterally tilting support shaft in the right-left direction by an interlock mechanism in accordance with a body angle in the right-left direction.

9 Claims, 37 Drawing Sheets

(56) References Cited

U.S. PATENT DOCUMENTS

| | | | |
|---|---|---|---|
| 5,537,748 A * | 7/1996 | Takahashi | B23D 59/006 30/124 |
| 6,269,543 B1 | 8/2001 | Ohkouchi | |
| 2002/0002774 A1 | 1/2002 | Onose et al. | |

* cited by examiner

PORTABLE CUTTING DEVICES

CROSS-REFERENCE TO RELATED APPLICATIONS

This application claims priority to Japanese patent application serial numbers 2016-170728 filed Sep. 1, 2016 and 2016-243659 filed Dec. 15, 2016, where the contents of both are incorporated herein by reference in their entirety for all purposes.

BACKGROUND

The present invention relates to portable cutting devices, such as a portable circular saw and particularly relates to, for example, a dust proof circular saw having a dust box for collecting chips.

Japanese Laid-Open Patent Publication No. 2000-37705 (hereinafter referred to as a Publication No. 705) and Japanese Laid-Open Patent Publication No. 2002-18811 (herein after referred to as a Publication No. 811) disclose a portable circular saw. The portable circular saw includes a circular saw main body with a motor for rotating a disc cutter blade, a rectangular base for supporting the circular saw main body and a fixed cover fixed to the circular saw main body so as to cover an outer peripheral surface of the disc cutter blade. A front end of the circular saw main body is pivotally attached to the base such that the pivotal angle of the circular saw main body with respect to the base can be adjusted in an up-down direction. In this way a projecting height of the disc cutter blade relative to the base can be adjusted and determined.

A dust cover is pivotally attached to a circular saw main body according to the Publication No. 705 so as to rotate about the same radial center as that of the disc cutter blade. The dust cover is positioned to cover a gap between the fixed cover and the base in the vicinity of the pivotal fulcrum of the circular saw main body. A distance between the fixed cover and the base varies when the circular saw main body base is vertically pivoted with respect to the dust cover. The dust cover rotates with respect to the fixed cover in accordance with the pivotal movement of the circular saw main body. In this way the dust cover is able to reliably cover the gap between the fixed cover and the base regardless of the pivotal angle of the circular saw main body. As a result, it is possible to prevent chips from blowing out of the gap between the fixed cover and the base.

A slide cover is attached at a front end of a fixed cover in a vertically slidable manner according to the Publication No. 881. A distance between the fixed cover and the base varies when the circular saw main body base is vertically pivoted with respect to the dust cover. The dust cover rotates with respect to the fixed cover. The slide cover is designed to cover the gap between the fixed cover and the base regardless of the vertical pivotal angle of the circular saw main body.

The vertical pivotal angle of the circular saw main body with respect to the base is adjusted before the circular saw main body is positioned. Further, the lateral tilting angle of the circular saw main body with respect to the base also could be adjusted before the circular saw main body is positioned. Thus, there is a need of a configuration that can efficiently prevent chips from being scattered not only if the vertical pivotal angle of the circular saw main body with respect to the base is adjusted but also even if, for example, the lateral tilting angle of the circular saw main body with respect to the base is adjusted.

SUMMARY

In one aspect of the present disclosure, a portable cutting device includes a cutting device main body having a motor for rotating a disc cutter blade, and a fixed cover which is fixed to the cutting device main body to cover a part of an outer radial periphery of the disc cutter blade. The cutting device main body is supported by a base such that an angle in an up-down direction can be adjusted at an upper side of the base to adjust the extent to which the disc cutter blade projects in a downward direction beyond the base. The base also supports the cutting device main body such that an angle in a right-left direction can be adjusted to adjust a lateral tilting angle of the disc cutter blade. An outer radial periphery of the disc cutter blade is covered by an auxiliary cover. The auxiliary cover covers a gap between the fixed cover and the base in the vicinity of a pivotal center of the cutting device main body in the up-down direction. The auxiliary cover is moved by an auxiliary cover vertically moving mechanism. The auxiliary cover moves with respect to the cutting device main body in accordance with the angle of the cutting device main body in the up-down direction. The auxiliary cover is pivotally connected to the base in the right-left direction by a laterally tilting support shaft. The auxiliary cover is rotated around the laterally tilting support shaft by an interlock mechanism in the right-left direction. The auxiliary cover rotates in the right-left direction in accordance with the angle of the cutting device main body in the right-left direction.

Therefore, the auxiliary cover follows the angle of the cutting device main body not only when the cutting device main body is vertically moved with respect to the base, but also when the cutting device main body is laterally tilted. The shape of the gap between the fixed cover and the base varies in accordance with the angles in the up-down direction and the right-left direction of the circular saw main body, thereby the auxiliary cover may move in response to the change of the shape of the gap. In this way, the auxiliary cover can reduce the scattering of chips out of the gap between the fixed cover and the base.

In another aspect of the disclosure, the portable cutting device includes a cutting device main body having a motor for rotating a disc cutter blade, and a fixed cover which is fixed to the cutting device main body to cover a part of an outer radial periphery of the disc cutter blade. The cutting device main body is supported by a base such that an angle in an up-down direction can be adjusted at an upper side of the base to adjust the extent to which the disc cutter blade projects in a downward direction beyond the base. The base also supports the cutting device main body such that an angle in a right-left direction can be adjusted to adjust a tilting angle of a rotation center axis of the disc cutter blade. The portable cutting device includes an auxiliary cover and an auxiliary cover vertically moving mechanism. The auxiliary cover is movably attached to the fixed cover to cover an outer radial periphery of the disc cutter blade and cover a gap between the fixed cover and the base in a vicinity of a pivotal center of the cutting device main body in the up-down direction. The auxiliary cover vertically moving mechanism moves the auxiliary cover with respect to the fixed cover in accordance with the angle of the cutting device main body in the up-down direction.

Therefore, the auxiliary cover moves with respect to the fixed cover when an angle of the cutting device main body is adjusted with respect to the base in the up-down direction. When the cutting device main body is tilted in the right-left direction, the auxiliary cover is tilted with the fixed cover in the right-left direction since the auxiliary cover is attached to the fixed cover. The shape of the gap between the fixed cover and the base varies in accordance with the angle of the cutting device main body. Thereby the auxiliary cover moves accordingly corresponding to the shape of the gap. In this way, the auxiliary cover may reduce the scattering of chips out of the gap between the fixed cover and the base.

In another aspect of the disclosure, the portable cutting device includes a cutting device main body having a motor for rotating a disc cutter blade, and a cover body which is attached to the cutting device main body to cover an outer radial periphery of the disc cutter blade. The cutting device main body is supported by a base such that an angle of the cutting device in an up-down direction can be adjusted at an upper side of the base to adjust the extent to which the disc cutter blade projects in a downward direction beyond the base. The cover body is tilted with the cutting device main body in the right-left direction. A part of the cover body moves with respect to the cutting device main body in the up-down direction in accordance with the up-down pivotal movement of the circular saw main body so that a gap between the cover body and the base is reduced in the vicinity of a pivotal center of the cutting device main body in the up-down direction.

Therefore, a part of the cover body moves in the up-down direction with respect to the cutting device main body in accordance with the angle of the cutting device main body with respect to the base in the up-down direction. The cover body is tilted with the cutting device main body when the cutting device main body is tilted in the right-left direction, in accordance with the angle of the cutting device main body in the right-left direction, since the cover body is attached to the cutting device main body. As a result, although the shape of the gap between the fixed cover and the base may vary in accordance with the angle of the cutting device main body, the position and the angle of a part of the cover body vary in response to the angle of the cutting device main body. In this way, the gap between the cover body and the base can be reduced so that the scattering of the chips can be reliably reduced.

DETAILED DESCRIPTION

Figure 1:
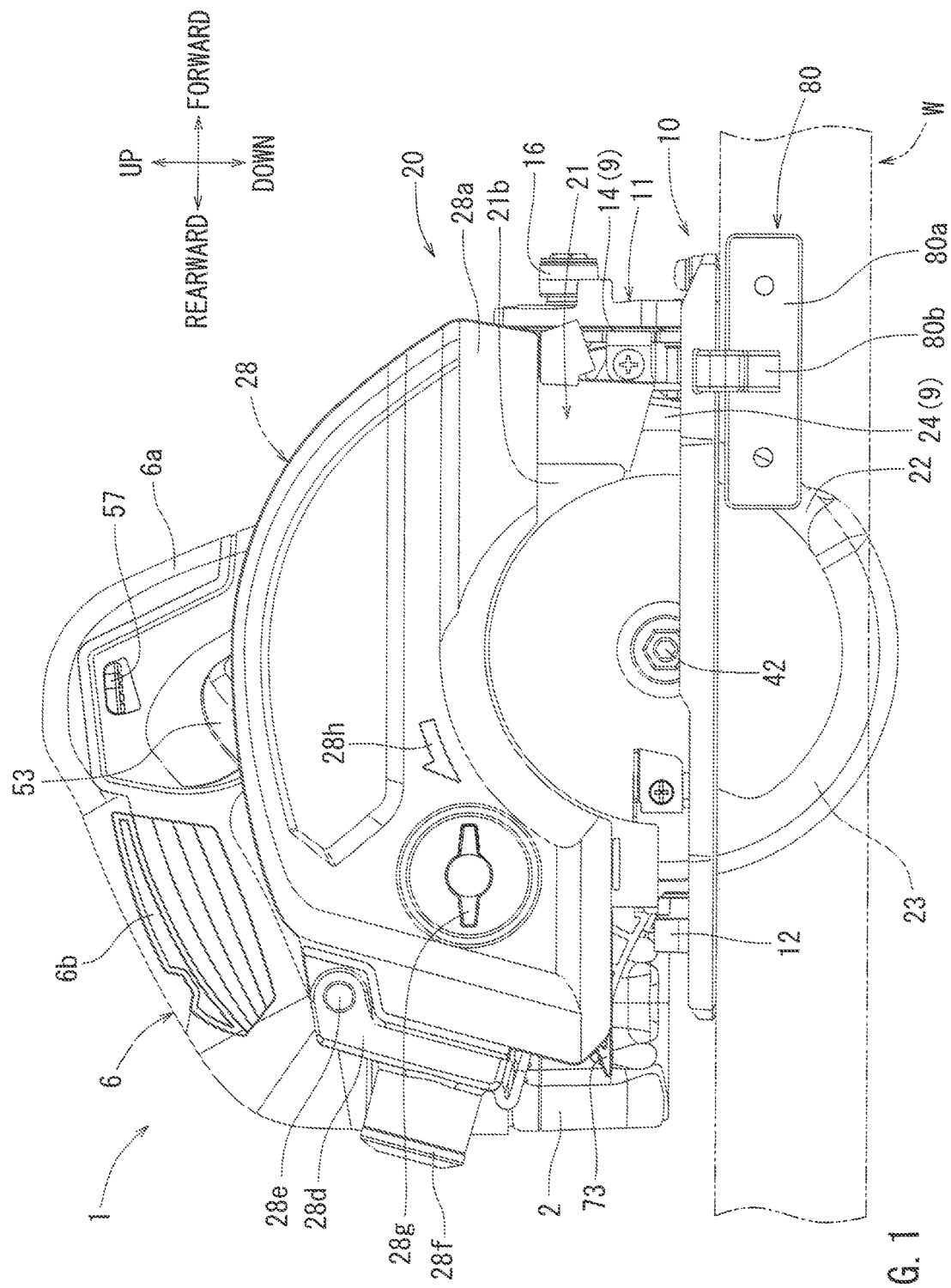
FIG. 1 is a right side view of a portable circular saw.
Figure 4:
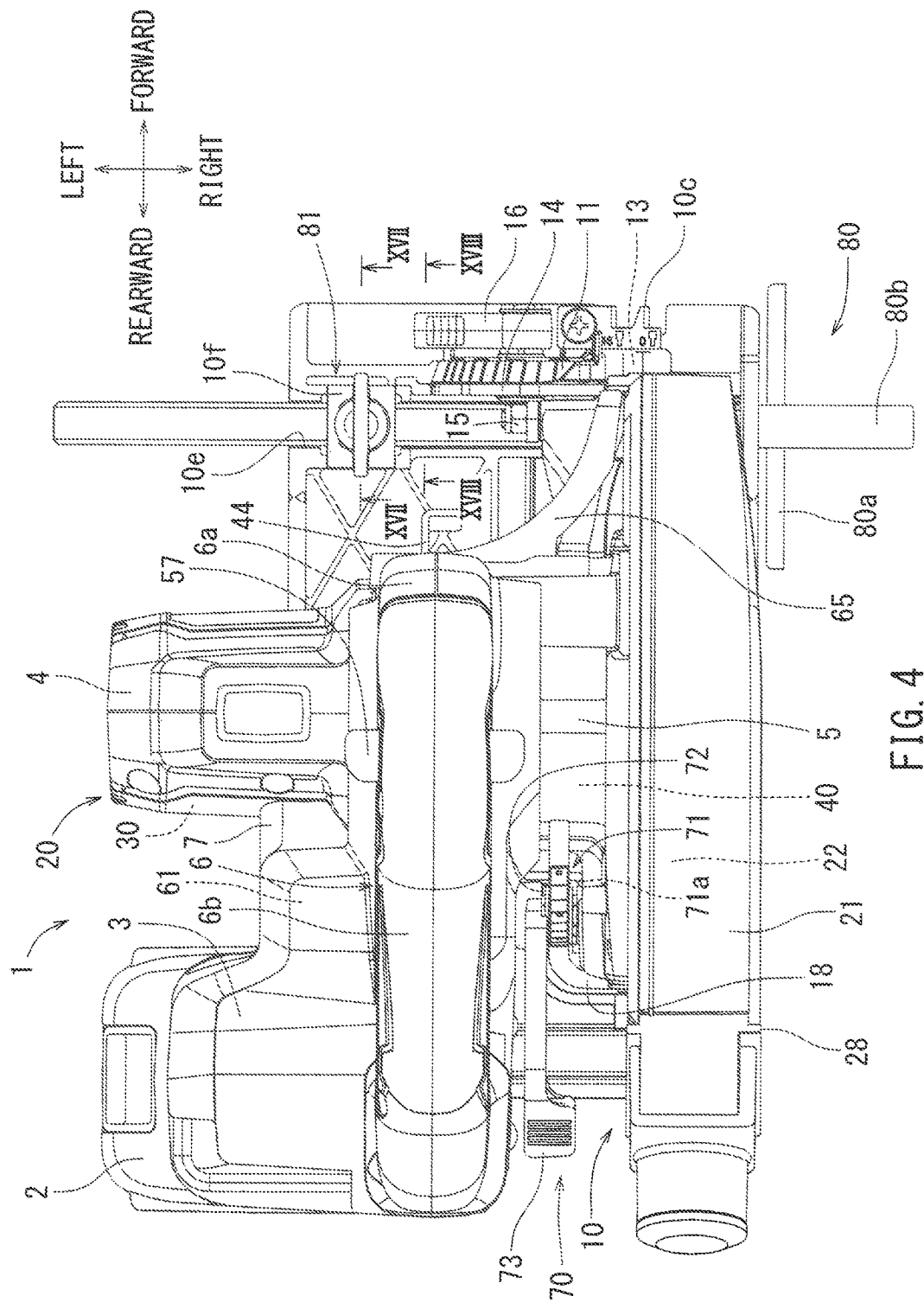
FIG. 4 is a plan view of the portable circular saw.

One exemplary embodiment according to the present disclosure will now be described with reference to the drawings. FIGS. 1 and 4 show a dust proof circular saw (portable circular saw) 1 as one example of a portable machining device or a portable cutting device that is movably operated while being held by a hand of a user. This device is utilized mainly for cutting a siding board(s), plasterboard(s) etc. and is also referred to as a dust collecting circular saw. The dust proof circular saw will now be described as follows using a front-rear direction, right-left direction and up-down direction. A front side corresponds to a direction in which the dust proof circular saw 1 is advanced when the dust proof circular saw 1 cuts or machines a workpiece W, as directionally indicated in the legend in FIG. 1. A right-left direction will be determined based on the position of the user positioned at a rear side of the dust proof circular saw 1, where the rear direction is also directionally indicated in said legend.

Figure 5:
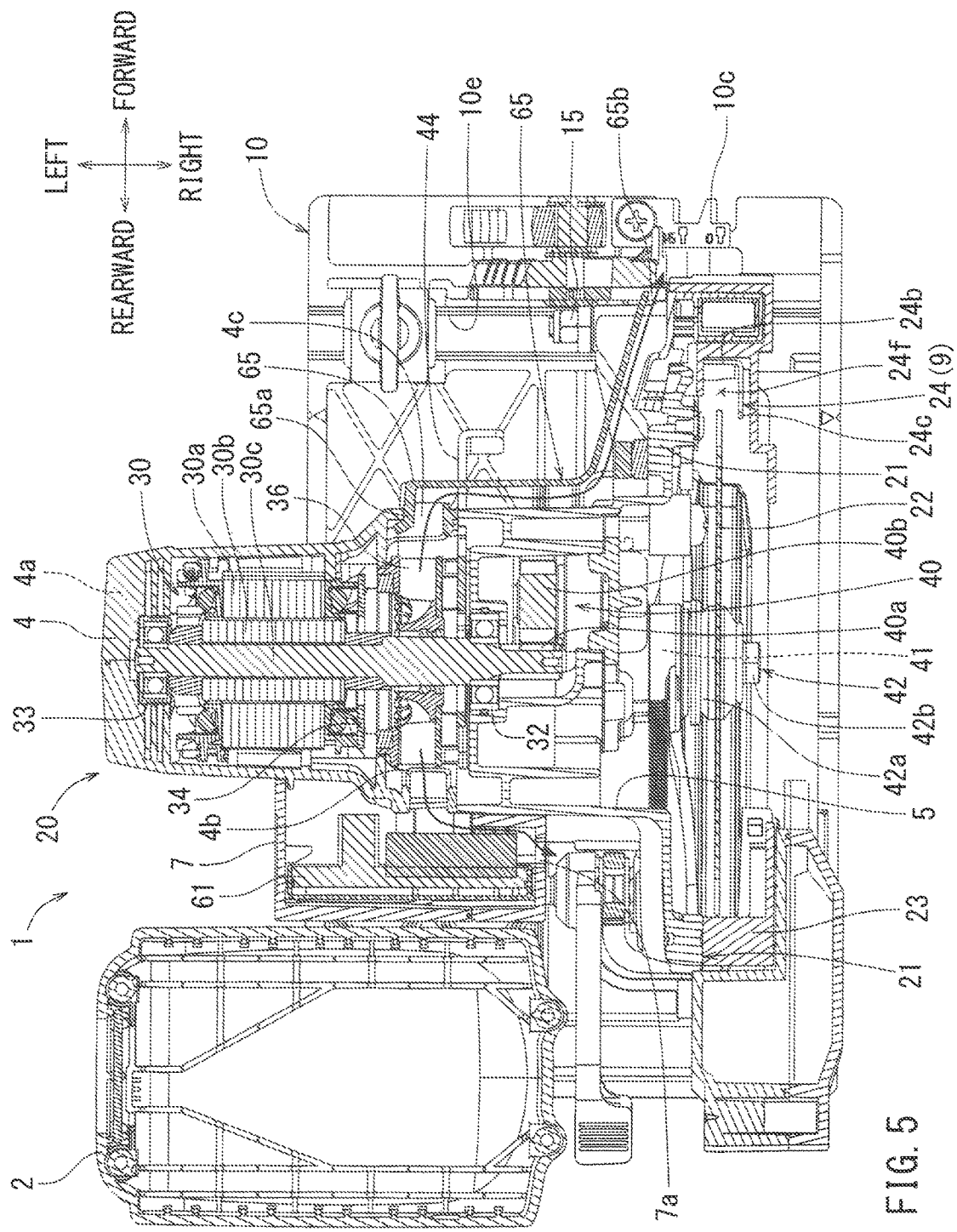
FIG. 5 is a horizontal cross sectional view of the portable circular saw.

As shown in FIG. 1, the dust proof circular saw 1 includes a circular saw main body (also referred to as a machine tool main body, or a cutting device main body) 20 and a base 10 which supports the circular saw main body 20 in an angle-adjustable manner. As shown in FIGS. 4 and 5, the circular saw main body 20 includes an electric motor 30 for rotating a disc cutter blade (saw blade) 22 and a battery 2 which supplies electric power to the electric motor 30.

As shown in FIGS. 4 and 5, the electric motor 30 is a brushless motor that is stored in a motor housing 4. The electric motor 30 includes a stator 30a fixed on an inner peripheral surface of the motor housing 4 and a rotor 30b rotatably supported and positioned at an inner peripheral side of the stator 30a. A sensor board 34 with a magnetic sensor for detecting a rotating position of the rotor 30b is mounted on a right side of the stator 30a (lower side in FIG. 5). A motor shaft 30c is inserted into the rotor 30b so that the rotor 30b is fixed to the motor shaft 30c. A left end of the motor shaft 30c is rotatably supported to rotate about the central longitudinal axis of the motor housing 4 in the left-right direction by a bearing 33. A right end of the motor shaft 30c is rotatably supported to rotate about said central longitudinal axis, which extends from the motor housing rightward into the gear housing 5, by a bearing 32.

As shown in FIG. 5, a gear housing 5 is provided on a right side of the motor housing 4. A reduction gear mechanism 40, which serves to reduce rotational output of the electric motor 30, is arranged within the gear housing 5. The reduction gear mechanism 40 includes a pinion gear 40a attached to an end of the motor shaft 30c, an intermediate gear 40b meshed with the pinion gear 40a, and a spindle 41 meshed with the intermediate gear 40b. The spindle 41 is positioned below the motor shaft 30c and rotatably supported by the gear housing 5 to rotate about an axis which is parallel to the motor shaft 30c. A distal end of the spindle 41 protrudes rightward from the gear housing 5 and the cutting blade 22 is attached to the distal end.

Figure 2:
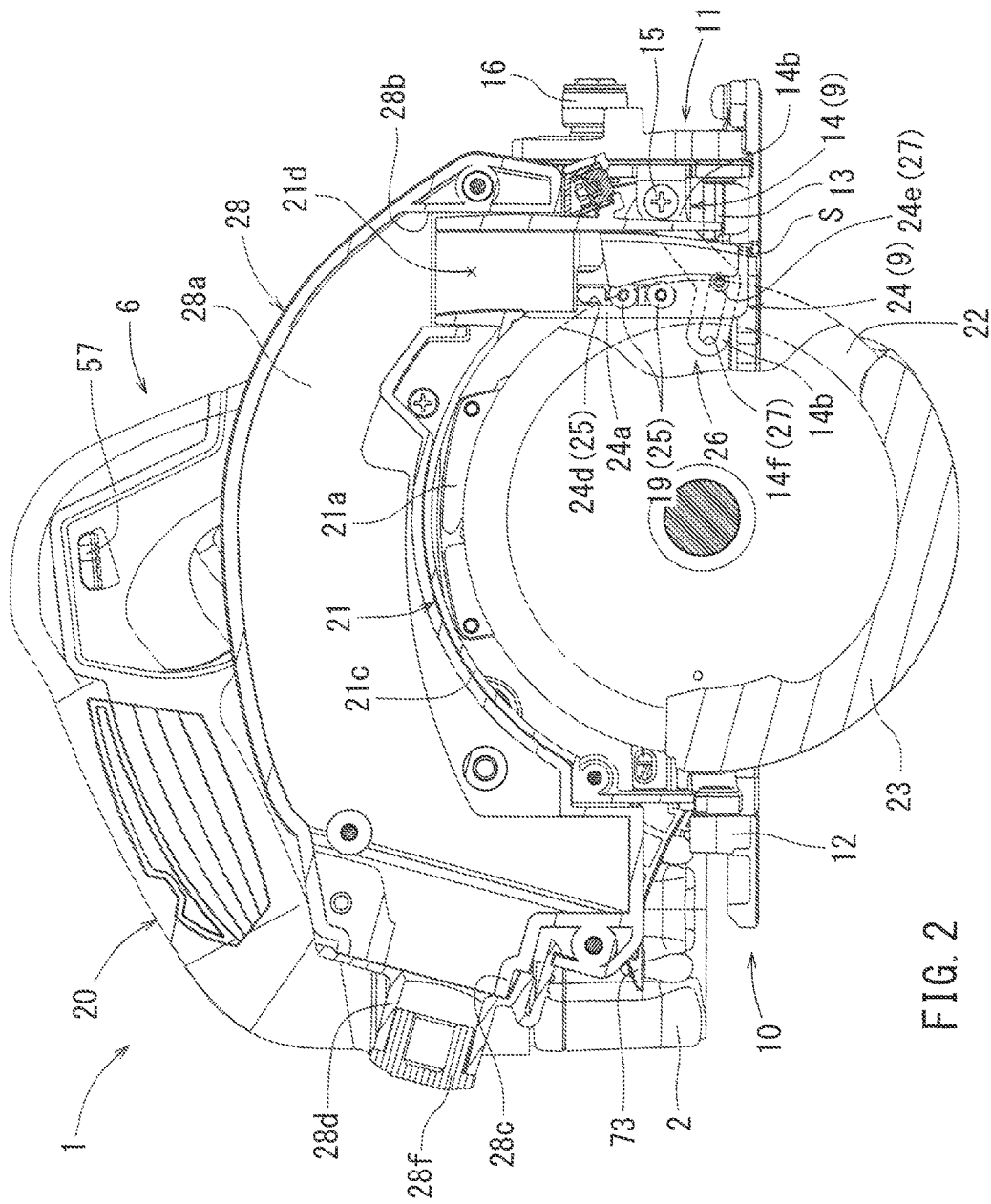
FIG. 2 is a right side view of the portable circular saw that is partially removed.

As shown in FIGS. 1 and 5, the cutting blade 22 is fixed to the distal end of the spindle 41 by an attachment body 42. The attachment body 42 includes an inner flange 42a for supporting the cutting blade 22 from the left side and an outer flange 42b for supporting the cutting blade 22 from the right side. An outer radial periphery of the cutting blade 22 may be covered by a cover body (9, 21 and 23). The cover body includes a fixed cover 21 for covering a substantially half part of an upper side of an outer radial periphery of the cutting blade 22, a movable cover 23 movable at a rear part of the fixed cover 21, and an auxiliary cover 9 movable at a front part of the fixed cover 21. A dust box 28 is connected to an upper part of the fixed cover 21 for receiving the chips As shown in FIG. 5, the fixed cover 21 is provided on the right side of the gear housing 5 and extends from the gear housing 5. As shown in FIGS. 1 and 2, the fixed cover 21 includes a left side surface 21a which is positioned on the left side of the cutting blade 22 and fixed to the circular saw main body 20, a right side surface 21b which covers a right side surface of an upper region on the outer radial periphery of the cutting blade 22, and a peripheral wall 21c which connects upper ends of the left side surface 21a and the right side surface 21b. The peripheral wall 21c is formed in a circular arc shape and covers the upper region on the outer radial periphery of the cutting blade 22. A discharge pipe 21d extending upwardly is formed at a front part of the fixed cover 21 to be connected to an opening 28b of the dust box 28.

As shown in FIGS. 1 and 2, the dust box 28 includes a box main body 28a extending along an upper outer peripheral edge of the fixed cover 21. An opening 28b is formed at a front part of the box main body 28a to which the discharge pipe 21d of the fixed cover 21 is connected. The cutting blade 22 rotates in a direction as indicated by an arrow 28h as shown on the right side surface of the dust box 28 to cut the workpiece W. The chips are blown up at the front side of the cutting blade 22 when the chips are produced from the workpiece W. The blown up chips are introduced fro the fixed cover 21 into the box main body 28a and accumulated in the box main body 28a.

As shown in FIGS. 1 and 2, the dust box 28 has a lever 28g on a right side surface thereof. The dust box 28 is removably attached to the circular saw main body 20 by utilizing a male thread which is integrally formed with the lever 28g. A discharge hole 28c is formed at the rear part of the box main body 28a. A cover 28d for opening and closing the discharge hole 28c is pivotally attached to the box main body 28 by a pin 28e. The box main body 28a is removed first from the circular saw main body 20 when the chips accumulated within the box main body 28a have to be discharged. Subsequently, after being removed, the cover 28d is opened through the pivotal rotation of pin 28e to open the discharge hole 28c so that the chips may be discharged from the interior of the box main body 28a to the outside.

As shown in FIG. 1, a through hole is formed at a rear portion of the cover 28d that is closed by a cap 28f. A vacuum device can be connected to the through hole of the cover 28d via a pipe after the cap 28f is removed from the cover 28d. In this way, the chips within the dust box 28 may be suctioned to the vacuum device via the pipe.

As shown in FIGS. 1 and 2, the movable cover 23 is positioned at a lower rear side of the fixed cover 21 and covers a rear lower region of the outer radial periphery of the cutting blade 22. The movable cover 23 has a circular arc shape and pivots around a radial center of the cutting blade 22, where it is coaxial with the cutting blade 22 with respect to the pivot point at the center of the cutting blade 22. The movable cover 23 is biased in a direction to cover the lower region of the cutting blade 22 i.e. toward the front side by a tension spring. When cutting the workpiece W, a leading end (front end) of the movable cover 23 abuts the workpiece W such that the movable cover 23 is pushed backward a certain circumferential length and its rear end moves clockwise by said length, upward relative to the workpiece W.

Figure 3:
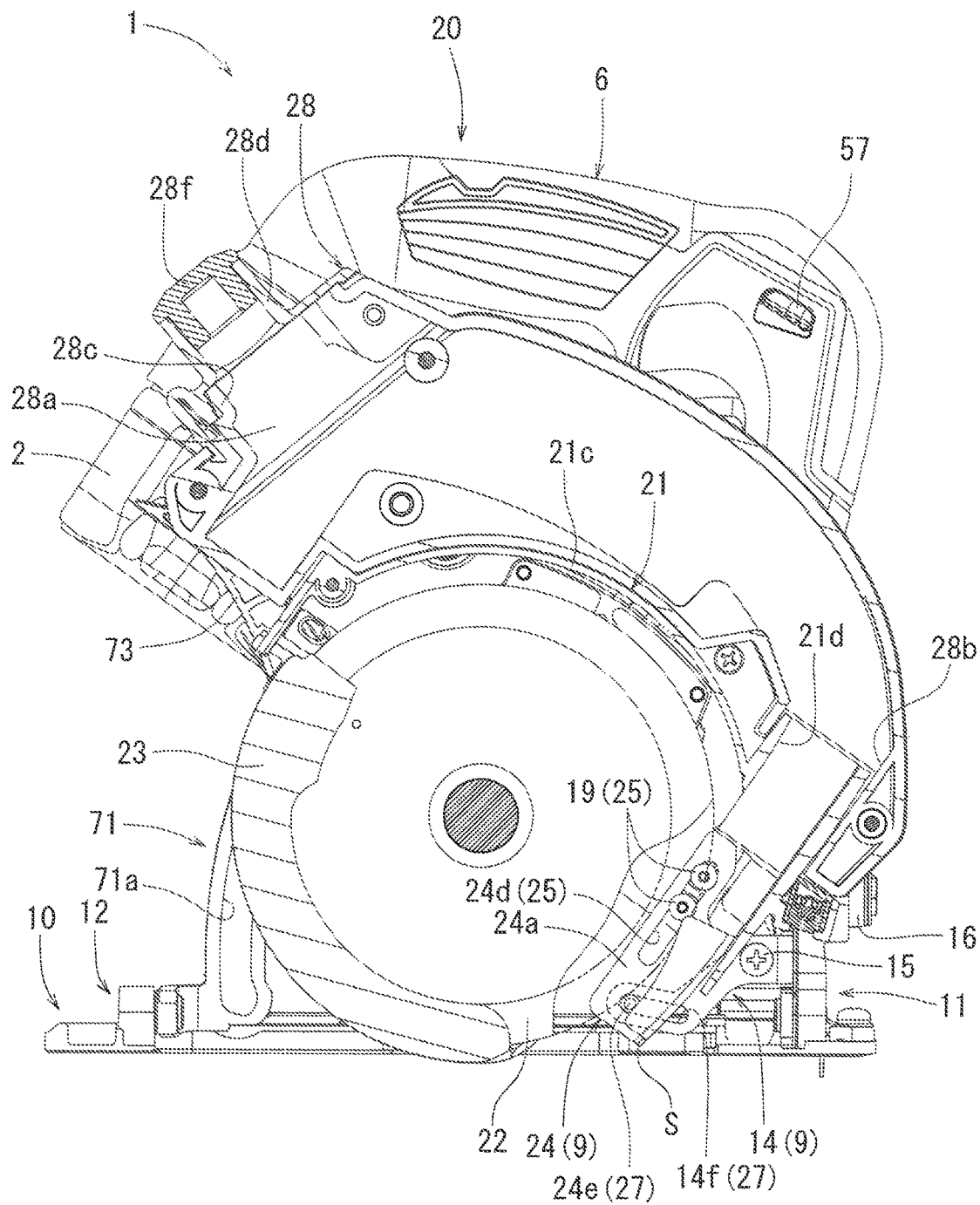
FIG. 3 is a right side view of the portable circular saw that is partially removed when the circular saw main body is positioned in an upper position.

As shown in FIGS. 2 and 3, the auxiliary cover 9 is positioned on a lower front side of the fixed cover 21. The auxiliary cover 9 is positioned at the lower front outer radial periphery of the cutting blade 22 and covers a gap S between the front end of the fixed cover 21 and the base 10 at a tangent to the lower front portion of the cutting blade 22. The gap S varies in accordance with the angle of the circular saw main body 20 with respect to the base 10. In response to said variation, the auxiliary cover 9 moves with respect to the fixed cover 21 or the base 10 in accordance with the angle of the circular saw main body 20. Therefore, the auxiliary cover 9 can efficiently prevent the chips from scattering forward out of the gap S. The auxiliary cover 9 includes a dust cover 24 connected to the circular saw main body 20 or the fixed cover 21, and an angular guide 14 that connects the dust cover 24 to the base 10.

Figure 12:
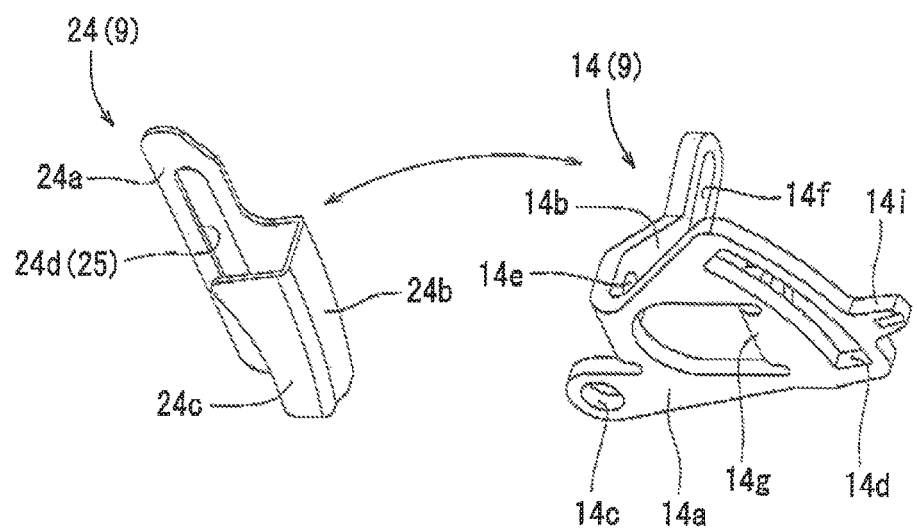
FIG. 12 is a perspective view of a dust cover and an angular guide.
Figure 13:
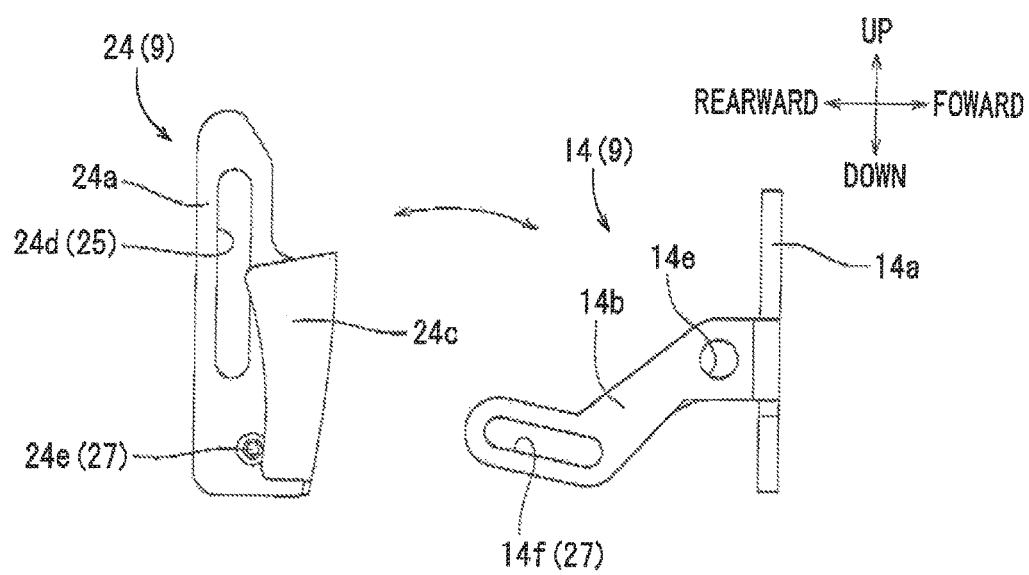
FIG. 13 is a right side view of the dust cover and the angular guide.

As shown in FIGS. 12 to 15, the dust cover 24 includes a vertically elongated first side wall 24a, an off-center second side wall 24c facing vertically opposite to the first side wall 24a, and a front wall 24b laterally connecting the front vertical edges of the first side wall 24a and the second side wall 24c. In its interior, the first side wall 24a includes a vertically elongated hole 24d and a pin 24e extending in a lateral direction away from the second side wall 24c. The vertically elongated hole 24d is substantially linear and defines a cam surface. As shown in FIGS. 2 and 3, one or a plurality of pin(s) 19 extending from the fixed cover 21 may be inserted into the vertically elongated hole 24d. A stopper having a larger diameter than the width of the vertically elongated hole 24d is attached to the leading (right) end of the pin 19. The dust cover 24 is movably connected to the fixed cover 21 by the pin(s) 19 in the up-down direction. As shown in FIG. 13, the pin 24e is provided at a lower portion of the first side wall 24a. The pin 24e is connected to a front-to-rear elongated hole 14f of the angular guide 14 as will be described later.

Figure 15:
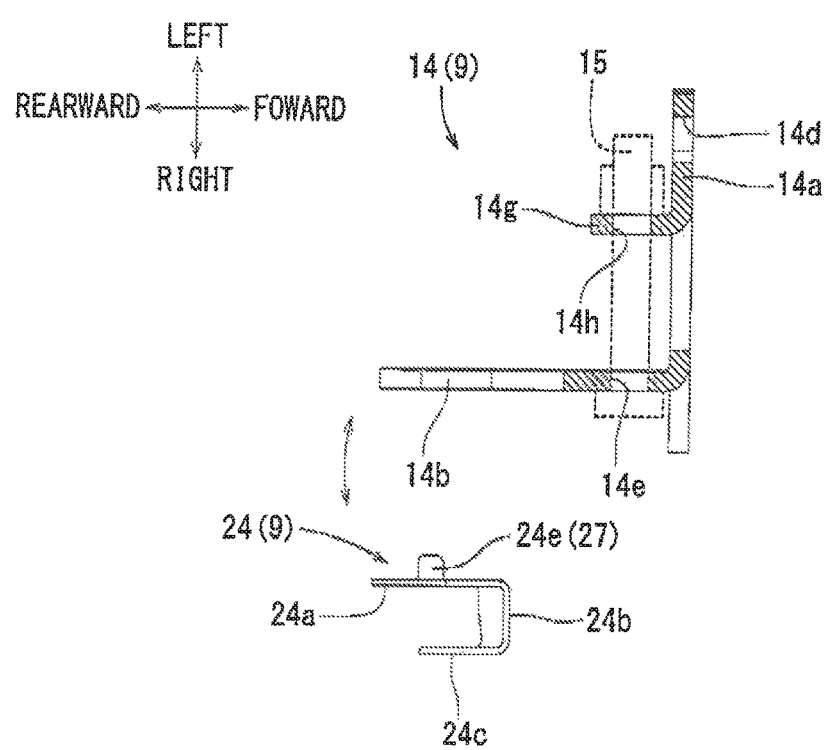
FIG. 15 is a partial sectional top view of the dust cover and the angular guide.

As shown in FIGS. 12, 13, and 15, a vertical length of the second side wall 24c is shorter than that of the first side wall 24a. An upper end of the second side wall 24c is positioned below an upper end of the first side wall 24a, and conversely a lower end of the second side wall 24c is positioned above a lower end of the first side wall 24a. A rear-to-front width of the second side wall 24c is narrower than that of the first side wall 24a, and a rear edge of the second side wall 24c is positioned in front of a rear edge of the first side wall 24a. The rear end of the second side wall 24c has a circular arc shape and extends along the outer peripheral edge for a certain portion of the cutting blade 22 as shown in FIG. 2.

As shown in FIGS. 12 and 15, the front wall 24b connects a front edge of the first side wall 24a and a front edge of the second side wall 24c to face and partially cover/shield the outer peripheral edge of the cutting blade 22 as shown in FIG. 5. The outer peripheral edge of the cutting blade 22 is positioned within a space (groove) 24f or in its vicinity, where the space 24f comprises the interior space encompassed by the first side wall 24a, the second side wall 24c and the front wall 24b. Therefore, the chips produced by the cutting blade 22 during cutting are blown towards and along the space 24f.

Figure 6:
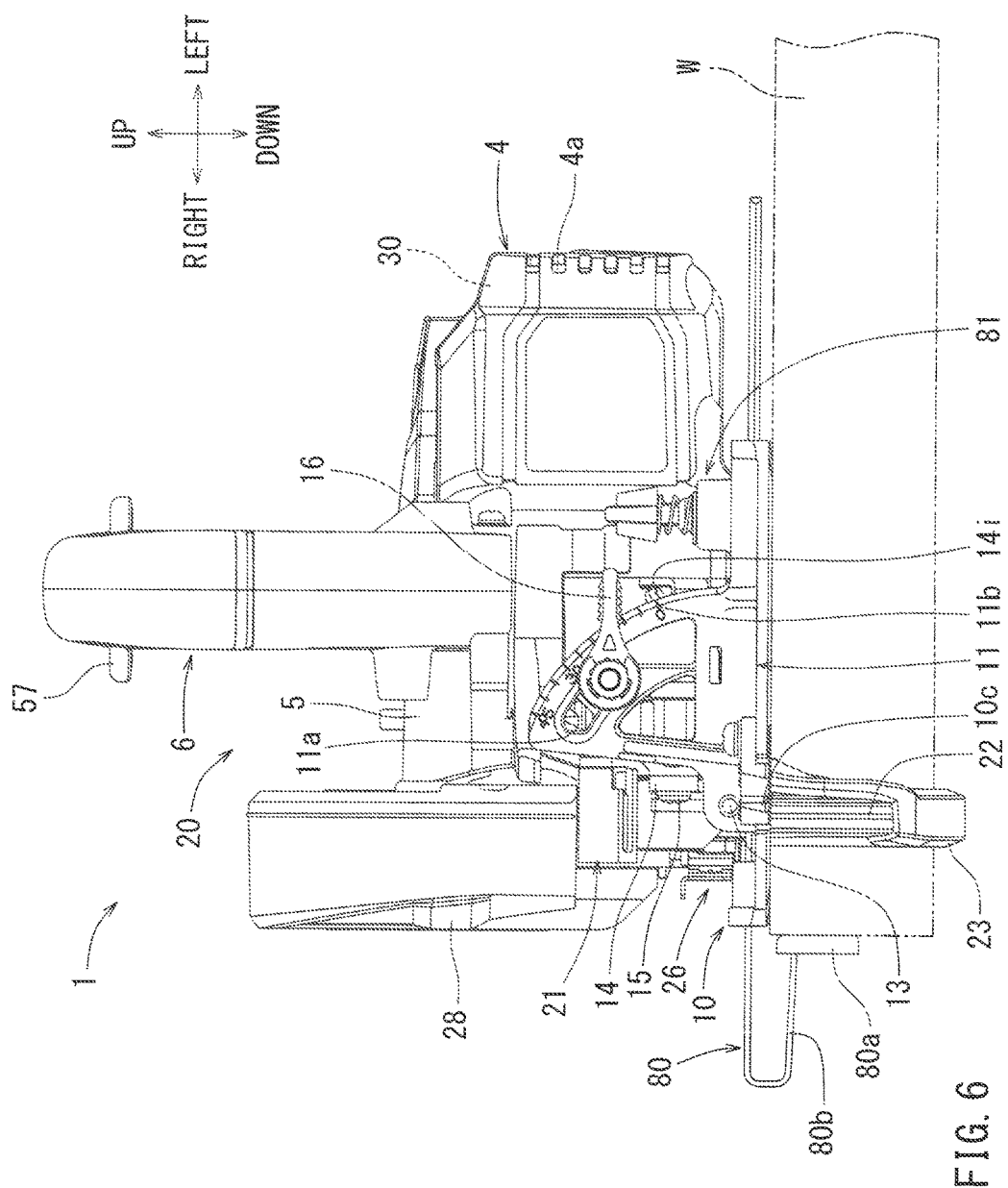
FIG. 6 is a front view of the portable circular saw.

As shown in FIGS. 12 to 15, the angular guide 14 includes a front wall 14a, a first bracket 14b extending rearward from and orthogonal to the front wall 14a, where the front wall 14a extends left-to-right, and a second bracket 14g, also to the left of and parallel to the first bracket 14b and orthogonal to the front wall 14a. A hole 14c is formed at one end (lower right end) of the front wall 14a while an elongated hole 14d is formed at the other end (left end) of the front wall 14a. The hole 14c has a circular shape through which a laterally tilting support shaft 13 as shown in FIG. 6 is inserted. Consequently, the angular guide 14 can be tilted with respect to the base 10 around the laterally tilting support shaft 13.

Figure 14:
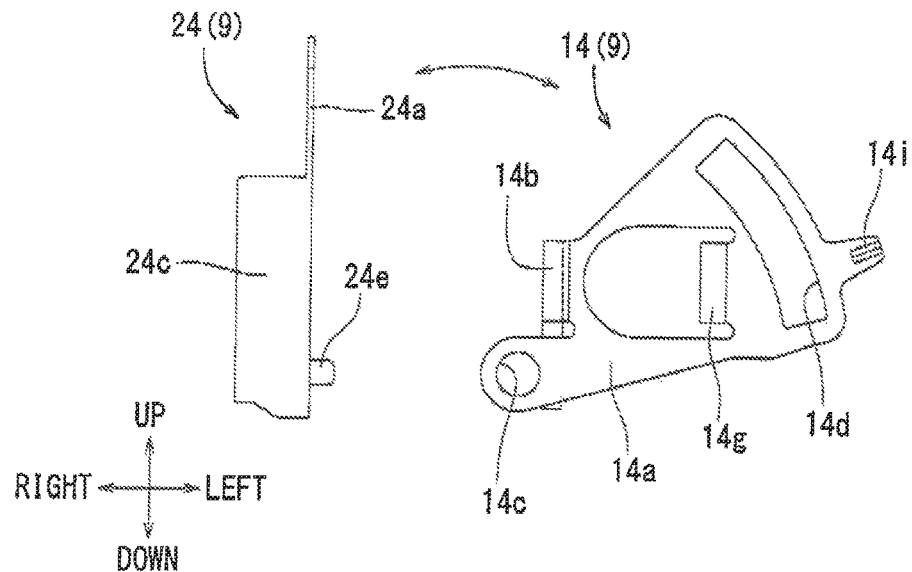
FIG. 14 is a front view of the dust cover and the angular guide.

As shown in FIG. 14, the elongated hole 14d extends arcuately along the left edge of the front wall 14a. A shaft of a knob screw 16 as shown in FIG. 6 may be inserted through the elongated hole 14d. The shaft of the knob screw 16 may also be inserted through a longitudinal hole 11a of a front support portion 11, which extends upright at the front end of the base 10. An elongated hole 11a may also be formed in a circular arc shape similar to the elongated hole 14d. The knob screw 16 releasably locks the angular guide 14 to the front support portion 11 upon being rotated in a tightening direction. The angular guide 14 is allowed to pivot around the laterally tilting support shaft 13 relative to the front support portion 11 when the knob screw 16 is rotated in a loosening direction and thereby the lock is released As shown in FIGS. 6 to 9, the circular saw main body 20 may be tilted with the angular guide 14 relative to the base 10 in a right-left direction so as to be held by the knob screw 16 at a predetermined tilted angle with respect to the base 10.

As shown in FIGS. 12 and 14, the angular guide 14 includes an indicator 14i on the opposite lateral side of the hole 14c. The indicator 14i projects outward from the left side beyond the edge of the front wall 14a. The indicator 14i may be seen from the front view as it outwardly extends beyond the outer edge of the front support portion 11 shown in FIG. 6. An angle indication scale 11b extends along the outer edge arc from left-to-right of the front support portion 11. A tilting angle of the angular guide 14 in the right-left direction with respect to the base 10 may be recognized by reading the scale 11b at the position indicated by indicator 14i. The circular saw main body 20 is attached to the angular guide 14 as will be described later. Therefore, it is possible to learn the tilting angle of the circular saw main body 20 in the right-left direction when the position of the indicator 14i is read by using the scale 11b.

Figure 8:
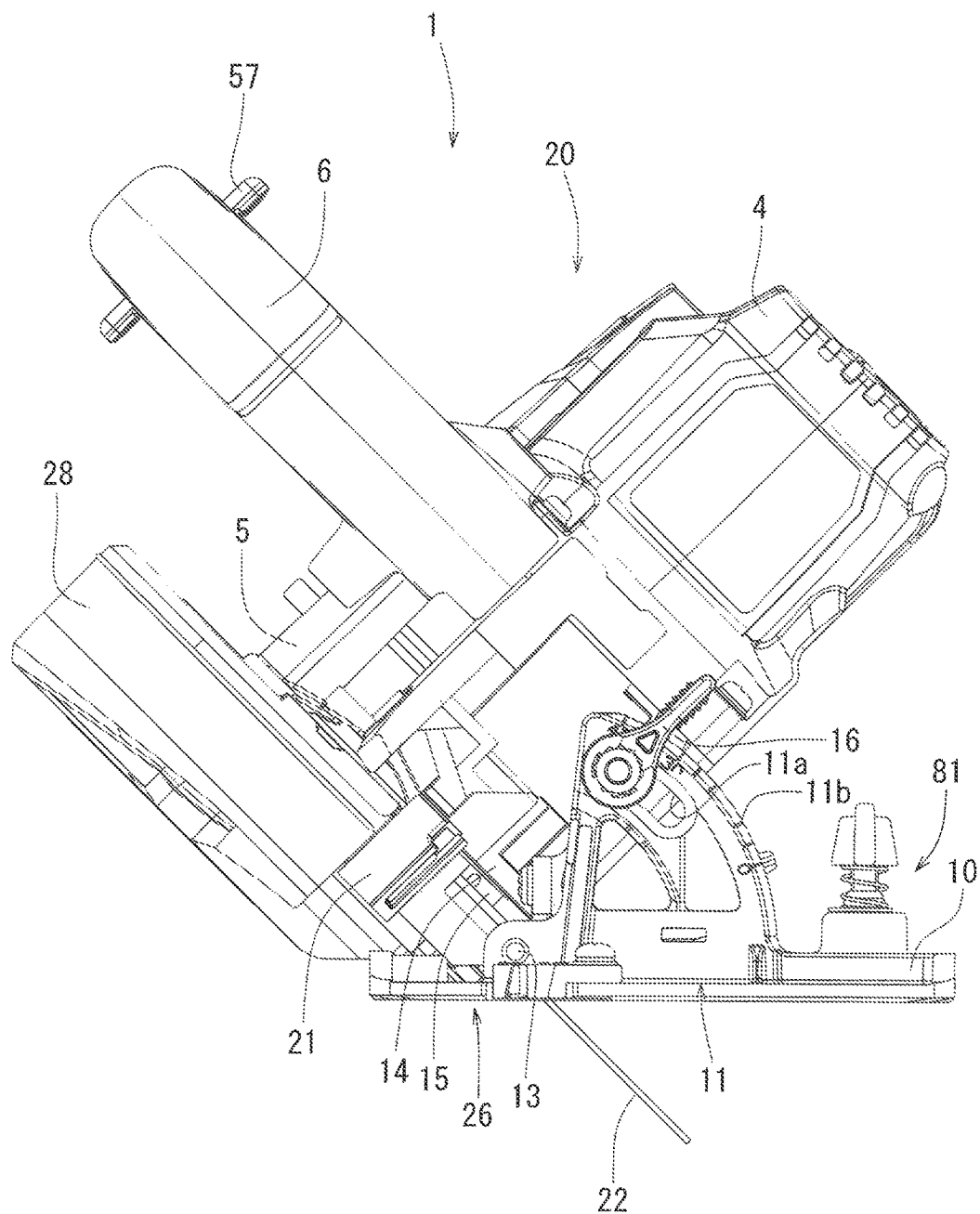
FIG. 8 is a front view of the portable circular saw when the circular saw main body is positioned in a tilted posture.

As shown in FIGS. 4 and 6, the laterally tilting support shaft 13 is positioned in a lower right part of the front support portion 11 and extends in the front-rear direction. The laterally tilting support shaft 13 is inserted, from front-to-rear, through the front support portion 11 and then the hole 14c defined in the angular guide 14. The circular saw main body 20 is attached to the angular guide 14. Therefore, as shown in FIGS. 6 and 8, the tilting angle of the circular saw main body 20 may be adjusted with the angular guide 14 rotating about the laterally tilting support shaft 13 in the right-left direction.

Figure 10:
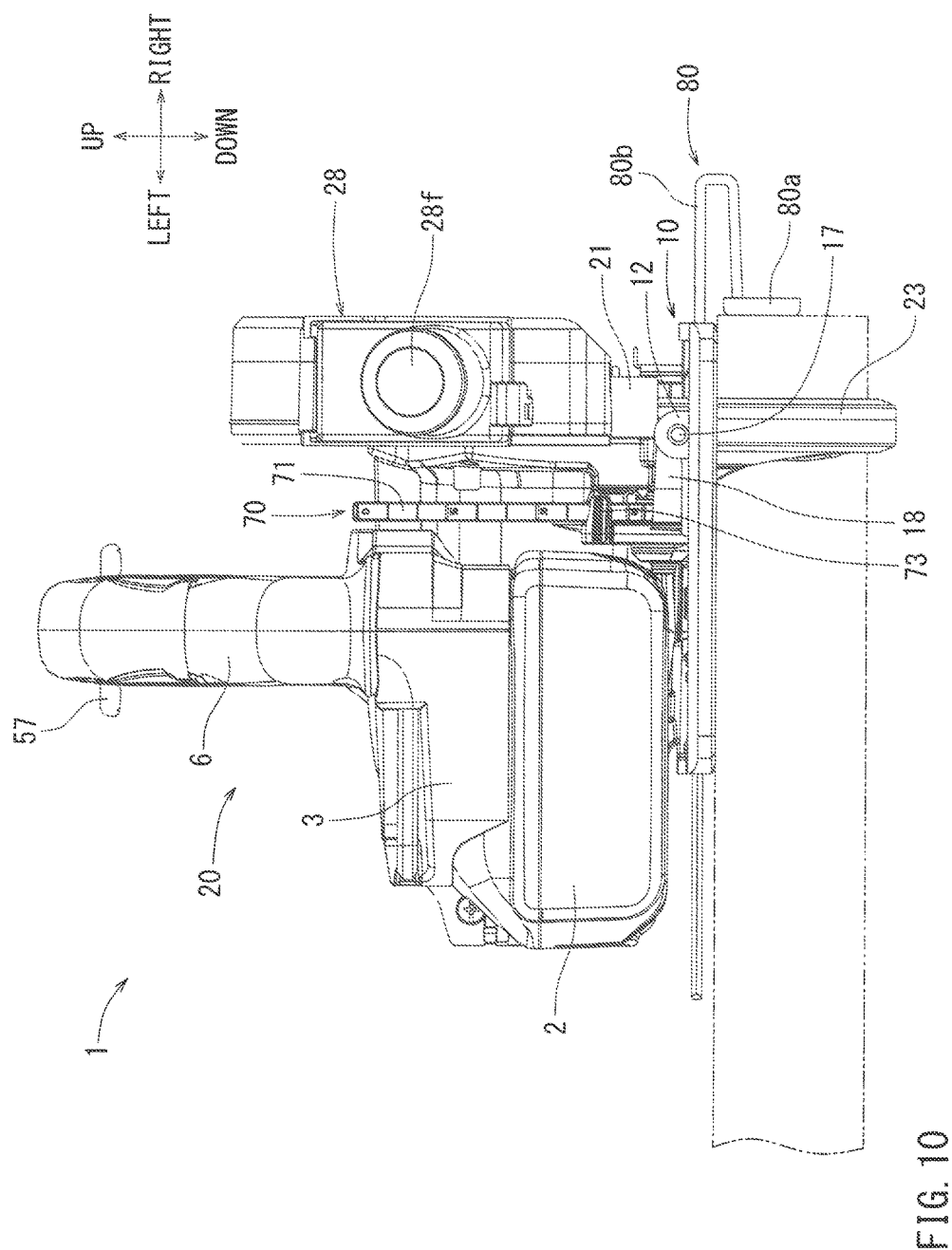
FIG. 10 is a rear view of the portable circular saw.

As shown in FIG. 10, the rear support portion 12 is provided in a rear region of the base 10. The rear support portion 12 is arranged upright on the base 10. The tiltable plate 18 is attached to the rear support portion 12 via the laterally tilting support shaft 17. The tiltable plate 18 includes a depth guide 71, connected to the circular saw main body 20, and extending in an upward direction. The laterally tilting support shaft 17 is positioned on the same front-to-rear axis as the laterally tilting support shaft 13 shown in FIG. 6. Therefore, the angle of the circular saw main body 20 is synchronously adjusted in the right-left direction around the laterally tilting support shafts 13 and 17. In this way, so-called bevel cut may be performed while the cutting angle of the cutting blade 22 is adjusted relative to the workpiece W as shown in FIG. 8.

As shown in FIGS. 12 to 15, the first bracket 14b extends rearward orthogonal from the lower right end of the front wall 14a while the second bracket 14g also extends orthogonal rearward, parallel to the first bracket 14b, from a central region of the front wall 14a. A hole 14e is formed at an upper frontal portion of the first bracket 14, while a hole 14h is formed at the same corresponding front-to-rear location in the second bracket 14g. The holes 14e and 14h are thereby positioned in a coaxial manner as shown in FIG. 15, whereby a vertically pivotal support shaft 15 is inserted through both holes 14e and 14h. As shown in FIGS. 4 and 5, a front part of the circular saw main body 20 is pivotally connected to the vertically pivotal support shaft 15. Therefore, as shown in FIGS. 2 and 3, the circular saw main body 20 is pivoted about the vertically pivotal support shaft 15 relative to the base 10 in the up-down direction. In this way, the extent to which the cutting blade 22 from the base 10 projects in a downward direction may be adjusted.

As shown in FIG. 1, the base 10 slides on the workpiece W as the cutting blade 22 cuts the workpiece W. The cutting blade 22 extends downwardly from the base 10 and the cutting depth in the workpiece W may be determined in accordance with the extent to which cutting blade 22 extends. As shown in FIG. 10, a cutting depth adjustment mechanism 70 is provided at a rear portion of the base 10 for adjusting the cutting depth. The cutting depth adjustment mechanism 70 has a depth guide 71 provided at the tiltable plate 18, which is rotatably attached to the base 10.

As shown in FIGS. 4 and 10, the depth guide 71 is formed at the end of the tiltable plate 18 and extends arcuately from the tiltable plate 18 upwards and toward an upper front side. A guide groove hole 71a having a circular arc shape is formed in the depth guide 71. A fixing screw 72 is inserted into the guide groove hole 71a such that the leading (left) end of the fixing screw 72 is threadably engaged with a left surface of the fixed cover 21. A fixing lever 73 as an operation part is attached to a head of the fixing screw 72. The fixing screw 72 is loosened from the depth guide 71 by upwardly operating the fixing lever 73 so that the circular saw main body 20 is moved with the fixing screw 72 in the up-down direction with respect to the depth guide 71. In this way, the extent (cutting depth) to which the cutting blade 22 projects below the base 10 may be adjusted.

As shown in FIGS. 4 and 10, the cutting depth measuring ruler s displayed on the outer arcuate peripheral surface of the depth guide 71. The extent to which the cutting blade 22 protrudes below the base 10 is learned by using the ruler. The fixing lever 73 is downwardly operated to fix the circular saw main body 20 at a certain position to the depth guide 71 by the fixing screw 72 at a position where the protruding amount corresponds to a predetermined amount. In this way, through the action of fixing lever 73 the cutting depth of the cutting blade 22 in the workpiece W may be adjusted and fixed.

As shown in FIGS. 2 and 3, the auxiliary cover vertically moving mechanism 25 moves the auxiliary cover 9 in the up-down direction relative to the circular saw main body 20. For example, the dust cover 24, which comprises a part of the auxiliary cover 9, may move downward relative to the circular saw main body 20 if the circular saw main body 20 is pivoted from a lower position as shown in FIG. 2 to an upper position as shown in FIG. 3. The auxiliary cover vertically moving mechanism (vertical coupling structure) 25 has pins 19 for coupling the circular saw main body 20 and the dust cover 24 in an up-down direction, and a vertically elongated hole 24d. The pins 19 project from a front portion of the circular saw main body 20. For example, the pins 19 project from a front portion of the fixed cover 21 in the right-to-left direction. The vertically elongated hole 24d is formed in the dust cover 24 into which one or vertically arranged two pin(s) 19 is/are inserted. The vertically elongated hole 24d defines a cam surface abutting the pins 19 while the pins 19 collectively or individually constitute a cam follower which moves along the cam surface.

As shown in FIGS. 2 and 3, the auxiliary cover vertically moving mechanism 25 has a pin 24e for coupling the dust cover 24 and the base 10, and a front-to-rear elongated hole 14f. As shown in FIG. 13, the front-to-rear elongated hole 14f is formed in a lower rear region of the first bracket 14b of the angular guide 14. The front-to-rear elongated hole 14f is elongated in a front-rear direction and substantially linear. The front-to-rear elongated hole 14f extends upwardly from the front toward a rear part at an inclined angle with respect to the horizontal. The pin 24e formed at the dust cover 24 is movably inserted into the front-to-rear elongated hole 14f. Therefore, the dust cover 24 is movably connected to the base 10 via the angular guide 14.

As shown in FIG. 2, the pin 24e is positioned in a front region of the front-to-rear elongated hole 14f when the circular saw main body 20 is positioned in a lower position. Accordingly, the dust cover 24 is positioned in the vicinity of the front part of the angular guide 14. The pins 19 are positioned in a lower region of the vertically elongated hole 24d. Consequently, from this position, the vertical clearance towards the top of elongated hole 24d allows the dust cover 24 to be positioned in a relatively higher position with respect to the circular saw main body 20. As a result, the dust cover 24 covers a gap between the base 10 and the front end of the fixed cover 21 while being positioned in the vicinity of the front part of the cutting blade 22.

As shown in FIG. 3, the pin 24e is positioned in a rear region of the front-to-rear elongated hole 14f when the circular saw main body 20 is positioned in an upper position. Accordingly, the dust cover 24 is positioned in the vicinity of the rear part of the angular guide 14. The pins 19 are positioned in an upper region of the vertically elongated hole 24d. Consequently, from this position, the vertical clearance towards the bottom of elongated hole 24d allows the dust cover 24 to be positioned in a relatively lower position with respect to the circular saw main body 20. The gap S defined between the front end of the fixed cover 21 and the base 10 may be increased by rotating and moving the circular saw main body 20 upward from the lower position shown in FIG. 2 to the upper position shown in FIG. 3. In response, to cover the increased gap, the dust cover 24 moves downward and rearward relative to the fixed cover 21, as the fixed cover 21 moves upwards and forwards.

The position at the front end of the cutting blade 22 corresponding to the intersection point of the cutting blade 22 and the base 10 moves in a rearward direction in the transition from FIG. 2 to FIG. 3 by the movement of the circular saw main body 20 from the lower position shown in FIG. 2 to the upper position shown in FIG. 3. In response, the lower end of the dust cover 24 moves further rearward relative to the fixed cover 21. Consequently, this shows that in accordance with the movement of the main body 20 and fixed cover 21, dust cover 24 may move in the front-rear direction in response to the pivotal movement of the circular saw main body 20 in the up-down direction such that the gap S between the front end of the fixed cover 21 and the base 10 is maintained in an as narrow as possible configuration by the dust cover 24.

As shown in FIGS. 6 to 9, the angular guide 14 is tilted around the laterally tilting support shaft 13 with the circular saw main body 20 when the circular saw main body 20 is tilted in the right-left direction. The dust cover 24 may also be tilted around the laterally tilting support shaft 13 with the fixed cover 21 which is one part of the circular saw main body 20. The gap S defined between the front end of the fixed cover 21 and the base 10 may also move in the right-left direction when the circular saw main body 20 is tilted in the right-left direction relative to the base 10. As described, when the circular saw main body 20 is tilted, consequently, the dust cover 24 is also tilted in the right-left direction at an angle commensurate with the tilting angle of the circular saw main body 20 in the right-left direction. In this way, the gap S between the front end of the fixed cover 21 and the base 10 can be always favorably covered with the dust cover 24. In particular, the dust cover 24 moves such that the point-to-point gap between the leading end of the dust cover 24 and the base 10 may always be equal to or less than 1 mm, preferably equal to or less than 0.5 mm As shown in FIGS. 6 to 9, the auxiliary cover 9 is tilted in the right-left direction relative to the base 10 by using the interlock mechanism 26 in accordance with the angle of the circular saw main body 20 in the right-left direction. The interlock mechanism 26 comprises a laterally tilting support shaft 13 and an angular guide 14, where the angular guide 14 is able to rotate about shaft 13 relative to the base 10 in the right-left direction. Further, as shown in FIG. 2, the interlock mechanism 26 comprises front-to-rear elongated hole 14f and pin(s) 24e for movably connecting the angular guide 14 and the dust cover 24, where the two components are able to move relative to one another. Furthermore, the interlock mechanism 26 also comprises vertically elongated hole 24d and pin(s) 19 for movably connecting the dust cover 24 relative to the circular saw main body 20, where the two components are able to move relative to one another.

As shown in FIGS. 4 and 10, the circular saw main body 20 has battery attachment portion 3 to which the battery 2 is attached. The battery attachment portion 3 is positioned on the left side of the rear part of the circular saw main body 20. The battery attachment portion 3 extends from the left side surface of the fixed cover 21 in the left direction similar to the motor housing 4. The battery attachment portion 3 is formed to have a substantially planar shape and includes rails on its lower surface 3. The rails extend, for example, in the right-left direction and the battery 2 is removably attached to the lower surface of the battery attachment portion 3 using the rails. The utilized battery 2 is a battery for electric power tools and as such may be attached to other electric power tools such as, for example, a screwdriver. The battery 2 may be, for example, a lithium-ion battery of 18V output and can be charged by a separately prepared charger. Therefore, this allows battery 2 to be repeatedly used as a power source, for the dust proof circular saw 1. The battery 2 is electrically connected to a controller 61 shown in FIG. 5 and supplies power to the electric motor 30 via the controller 61.

As shown in FIGS. 4 and 5, the controller 61 may be fully accommodated within the controller housing 7, which is arranged between the battery attachment portion 3 and the motor housing 4. Various electric components such as, for example, a sensor board 34 for detecting a position of the rotor 30b, the electric motor 30, and a switch 53 (see FIG. 1) arranged on the handle 6, may be electrically connected to the controller 61. The controller 61 includes a control circuit that transmits a control signal(s) based on the positional information of the rotor 30b detected by the sensor board 34. Further, the controller 61 may include a drive circuit comprising a field effect transistor (FET) for altering the electric current of the electric motor 30 based on the control signal(s) received from the control circuit, and an automatic breaker circuit for cutting off the power supply to the electric motor 30 in response to the battery 2 condition that is detected and preventing an over-discharged condition or an over-current condition.

As shown in FIGS. 1 and 4, the handle 6 is angled and includes an upright portion 6a extending upright from the motor housing 4 and a grip portion 6b which is inclined rearwardly from a frontal upper part of the upright portion 6a rearwards toward the battery attachment portion 3. A trigger-type switch 53 is provided on a lower surface of the upper part of the grip portion 6b. The switch 53 is supported on the grip portion 6b via a support shaft pullable by the user in a tiltably operatable manner in a vertical direction and biased downwardly by a biasing member such as a compression spring. The user's pulling of the switch 53 upward operates against the biasing force of the biasing member with a fingertip of user's hand gripping the grip portion 6b. The switch 53 then transmits a signal to the controller 61 (see FIG. 5) by being pulled to operate so that the controller 61 supplies the power from the battery 2 to the electric motor 30. As a result, the electric motor 30 starts driving to rotate the cutting blade 22 in the direction indicated by an arrow 28h.

As shown in FIGS. 1 and 6, a lock-on button 57 is disposed on the handle 6. The lock-on button 57 is positioned on the upper front side of the switch 53 and passes through the handle 6 in the right-left direction. The lock-on button 57 is arranged so as to be switchable in the up-down direction with respect to the handle 6. The electric motor 30 is locked in the driving condition by switching the lock-on button 57 in the downward position while the switch 53 is being pulled upward to operate. Consequently, the electric motor 30 can be driven without continuously pulling the switch 53. In this way, an operator can easily perform a long period of work. If a locked-on condition is released, the switch 53 may then be pulled upward again to operate. In this case, if the lock-on condition is released, the lock-on button 57 is switched upward and returns to its original position.

As shown in FIG. 5, a cooling fan 36 may be mounted on the motor shaft 300 of the electric motor 30. The cooling fan 36 may be positioned between the rotor 30b and the bearing 32, and rotate with the motor shaft 30c. External air may be introduced into the motor housing 4 through vent holes 4a formed on the left surface of the motor housing 4 by the cooling fan 36 rotating with the motor shaft 30c. The introduced air cools the electric motor 30 and subsequently flows into the controller housing 7 through the vent holes 4b formed on the rear part of the motor housing 4. The air may be discharged from an exhaust port 7a formed on the right surface of the controller housing 7 after cooling the controller 61 with a heat generating source such as a FET (Field Effect Transistor), or micro-computer.

As shown in FIG. 5, a duct 65 may be connected to the motor housing 4 that may serve to guide the air within the motor housing 4 towards the front direction. The duct 65 includes an attachment part 65a connected to a connecting port 4c that is formed at a right front portion of the motor housing 4. From the connecting port 4c, the duct 65 extends rightward along a front surface of the gear housing 5 and then forward along a lateral surface of the fixed cover 21. An exhaust port 65b is formed at the leading (frontal) end of the duct 65 and is oriented toward the marking line guide 10c of the base 10. The marking line guide 10c is arranged at the front end of the base 10 and is defined by front-to-rear cut-out portions on both the right and left sides of the marking line guide 10c. The cutting blade 22 may be precisely moved by moving the base 10 along a frontal direction while the marking line guide 10c is positioned on a marking line which may be marked on the workpiece W. The chips etc. accumulated in the vicinity of the marking line guide 10c are blown off by the air discharged from the duct 65. Therefore, the visibility of the marking line guide 10c is improved so that the machining work can be performed quickly and precisely.

As shown in FIG. 5, the lock lever 44 is connected to the front portion of the gear housing 5 to be pullable in the vertical direction. The lock lever 44 is connected to the locking member for locking the spindle 41 so that the spindle 41 may be unrotatably locked by operating the lock lever 44. In this way, when the spindle 41 is not rotating, the cutting blade 22 can be attached to or removed from the spindle 41.

Figure 11:
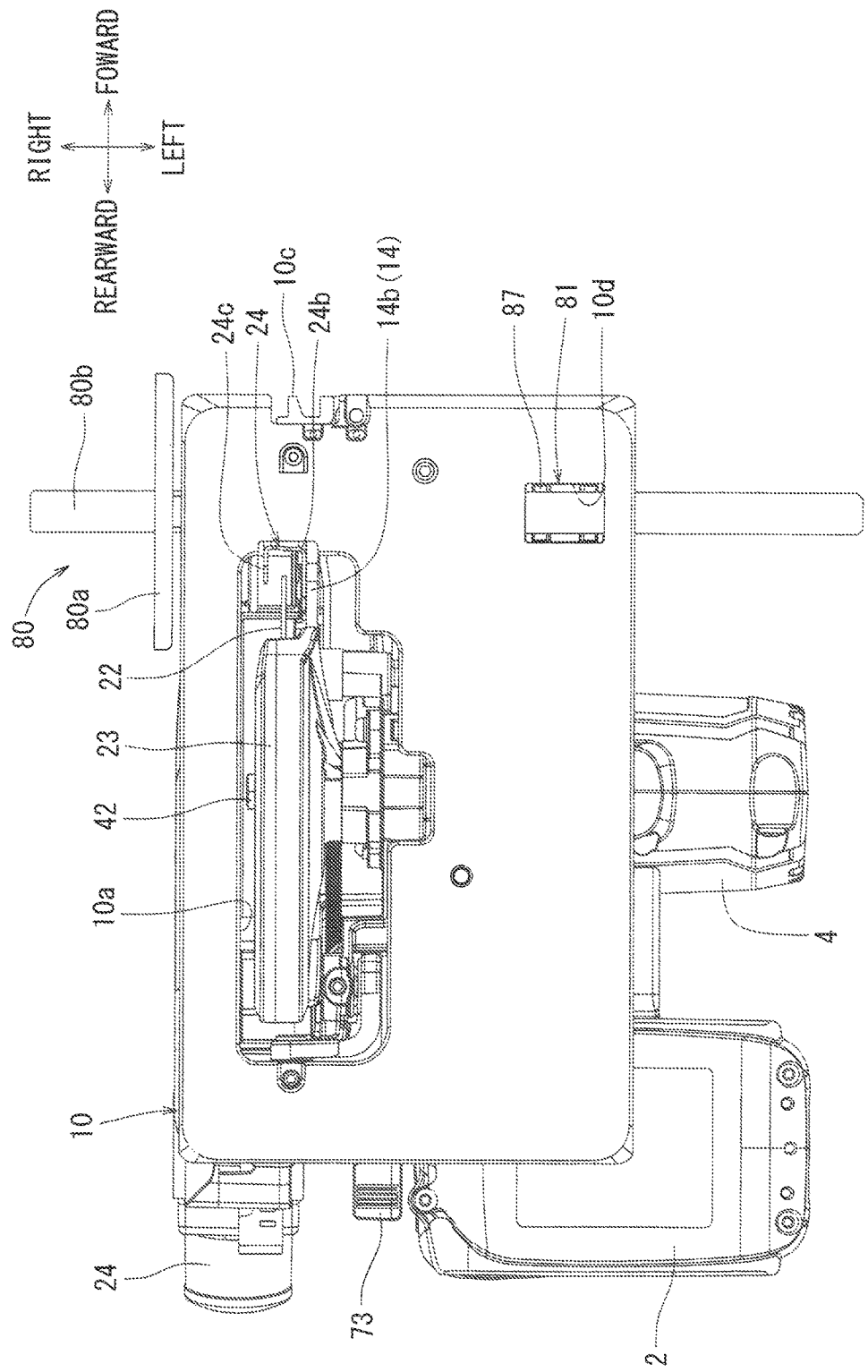
FIG. 11 is a bottom view of the portable circular saw.

As shown in FIGS. 1 and 11, the base 10 is formed as a substantially planar shape. The circular saw main body 20 is supported above the base 10 such that the vertical as well as the lateral angle of the circular saw main body 20 can be adjusted with respect to the base 10. As shown in FIG. 11, a substantially rectangular window 10a is formed in the base 10 into which the cutting blade 22 is inserted. A parallel ruler 80 is attached to the front portion of the base 10 such that the collective position of the circular saw main body 20 and base 10 can be adjusted in the right-to-left direction along the ruler 80.

As shown in FIGS. 4 and 6, the parallel ruler 80 includes a connecting bar 80b attached to the base 10 and a ruler main body 80a provided at an end of the connecting bar 80b. The ruler main body 80a is positioned on a right side of the base 10. The base 10 is placed on the workpiece W and the ruler main body 80a abuts the lateral surface of the workpiece W when the workpiece W is machined. As shown in FIG. 1, the dust proof circular saw 1 is moved in the front direction collectively with the base 10 while the ruler main body 80a is abuts a longitudinal lateral surface of the rectangular workpiece W. In this way, the dust proof circular saw 1 can be moved parallel along said lateral surface of the workpiece W so that the workpiece W can be cut at a predetermined width.

As shown in FIGS. 4 and 6, the connecting bar 80b is a laterally elongated plate and extends beyond the lateral width of the base 10. As shown in FIG. 6, the connecting bar 80b, at its rightmost horizontal end, extends to bend down vertically and then from the lower vertical point further extends back in a left horizontal direction toward but beneath base 10. The ruler main body 80a is provided at this terminal end, beneath base 10, of the bent back connecting bar 80b. The ruler main body 80a is elongated in the front-back direction and oriented in the right-left direction below the base 10. Therefore, the ruler main body 80a can abut a longitudinal lateral side of the rectangular workpiece W.

Figure 16:
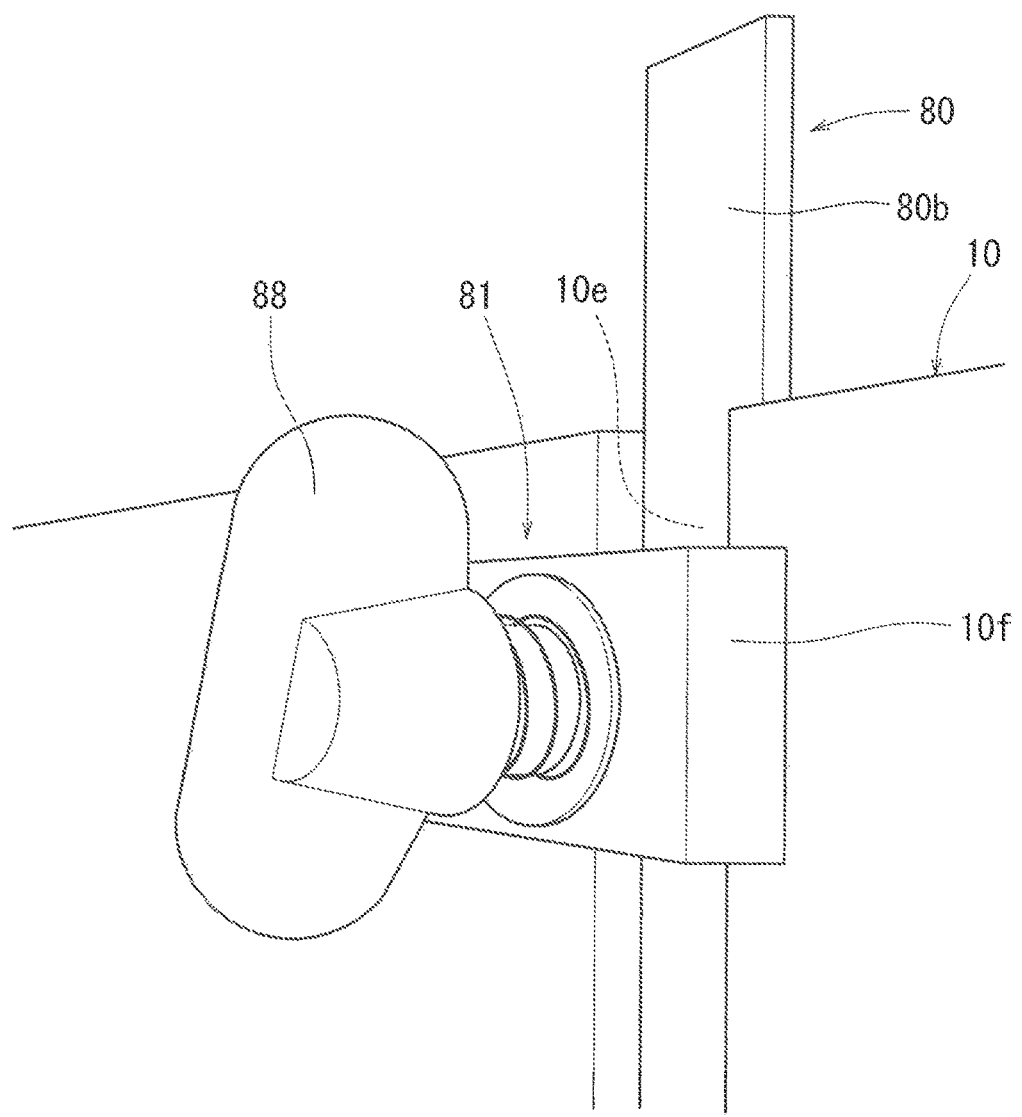
FIG. 16 is a partial perspective view of the portable circular saw in a vicinity of a ruler fixing device.

As shown in FIGS. 4 and 16, an up-to-down, front-to-back cut-out ruler retaining groove 10e is provided in base 10 for movably receiving a connecting bar 80b. Both right and left ends of the ruler retaining groove 10e are open at the rightmost and leftmost sides of the base 10. A position of the ruler main body 80a in the right-left direction may be adjusted by moving the connecting bar 80b along the ruler retaining groove 10e in the right-left direction. The connecting bar 80b is fixed to the base 10 by a ruler fixing device 81.

Figure 17:
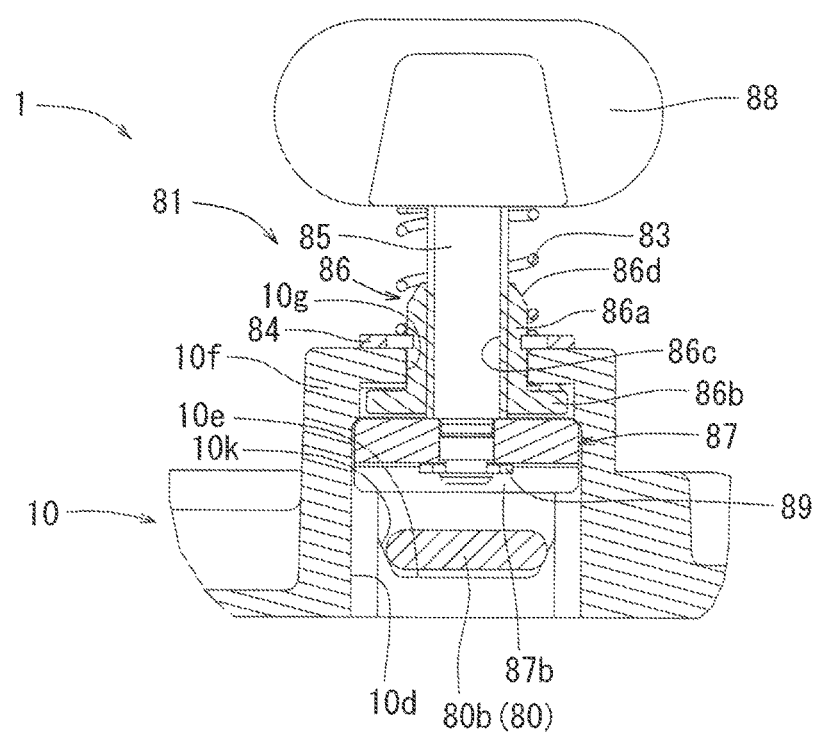
FIG. 17 is a sectional view taken along line XVII-XVII of FIG. 4.
Figure 18:
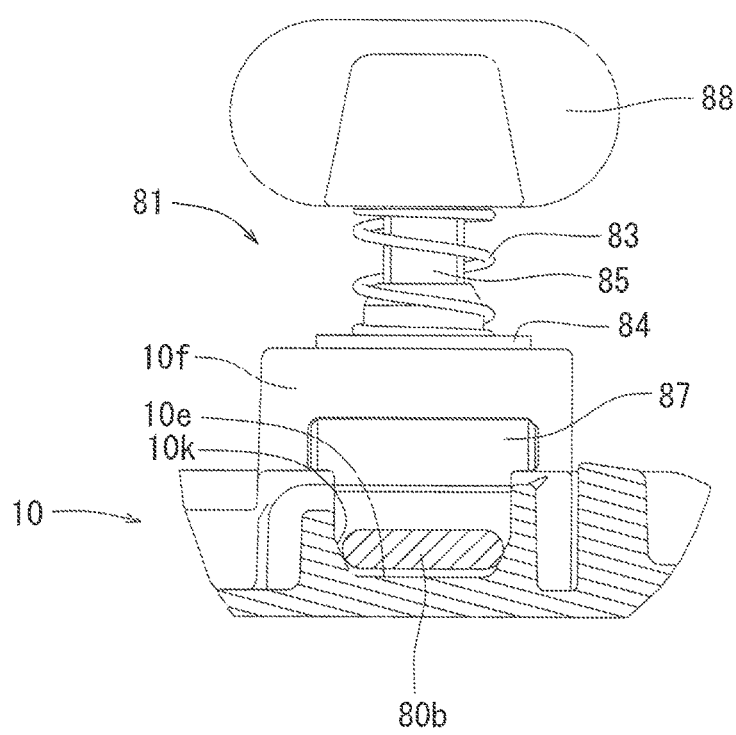
FIG. 18 is a sectional view taken along line XVIII-XVIII of FIG. 4.

As shown in FIGS. 17 and 18, the ruler fixing device 81 pushes the connecting bar 80b downward into the groove 10e. The ruler retaining groove 10e has tapers 10k at its front and back ends. The front and back ends of the connecting bar 80b are pushed against the tapers 10k. Therefore, the connecting bar 80b is prevented from rattling in the front-rear direction by the tapers 10k of the ruler retaining groove 10e. A lower surface of the connecting bar 80b may have tapers at its front and back ends that are pushed against the ruler retaining groove 10e. Alternatively, a taper or tapers may be formed on either one of the connecting bar 80b or the ruler retaining groove 10e.

As shown in FIGS. 16 and 17, the ruler fixing device 81 has a bridge member 10f arranged on the base 10, a hole member 86 that is inserted into a base hole 10g of the bridge member 10f, and a shaft member 85 that is inserted into the hole member 86. As shown in FIG. 4, the bridge member 10f is provided proximate to an edge (for example, the left edge) of the base 10 and extends over the ruler retaining groove 10e in the front-rear direction. As shown in FIGS. 11 and 17, a rectangular hole 10d instead of the ruler retaining groove 10e is formed at a lower part of the bridge member 10f. The rectangular hole 10d has a rectangular shape that corresponds to that of the bridge member 10f.

Figure 19:
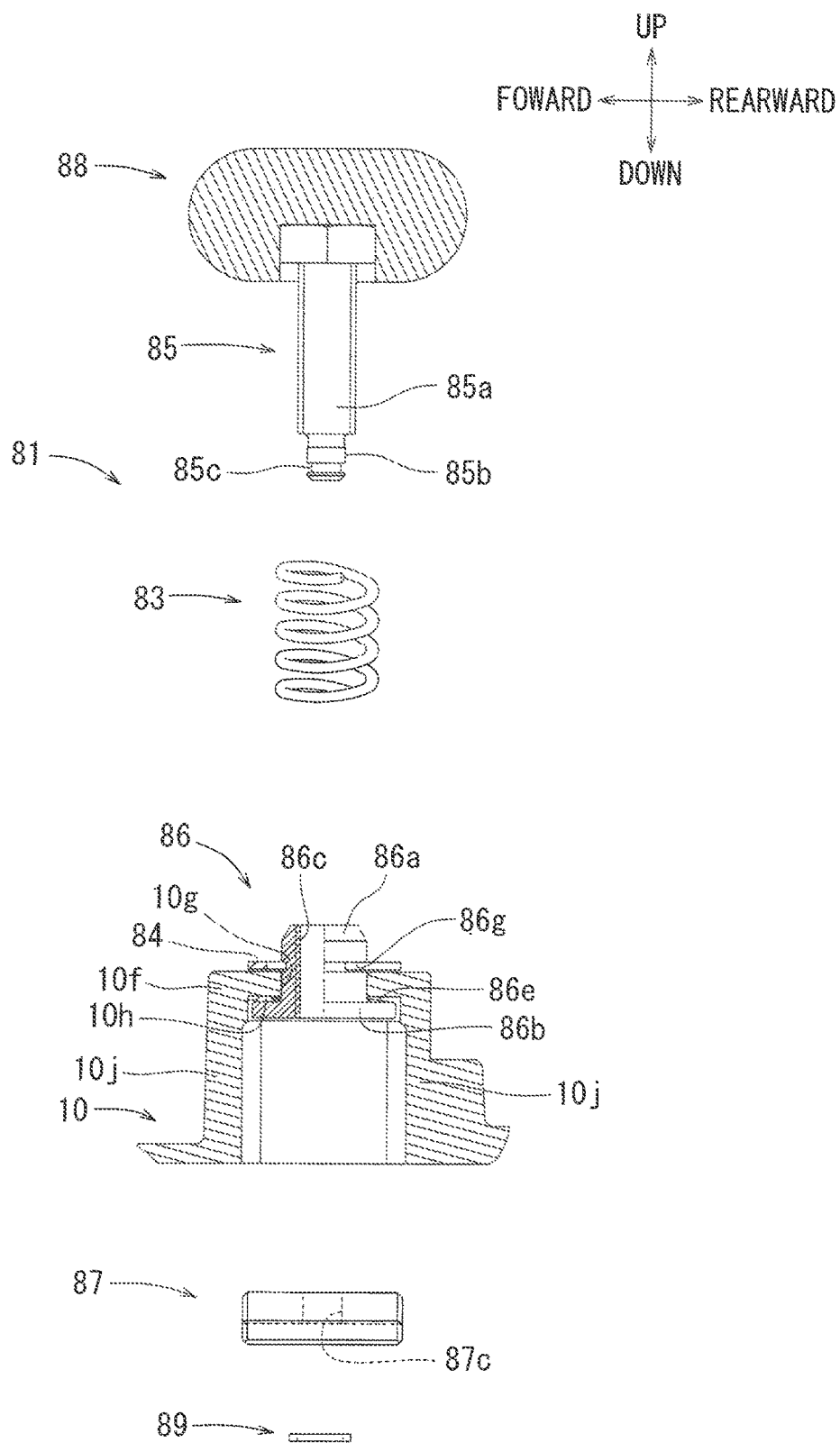
FIG. 19 is a partial sectional right side view of components of the ruler fixing device.
Figure 21:
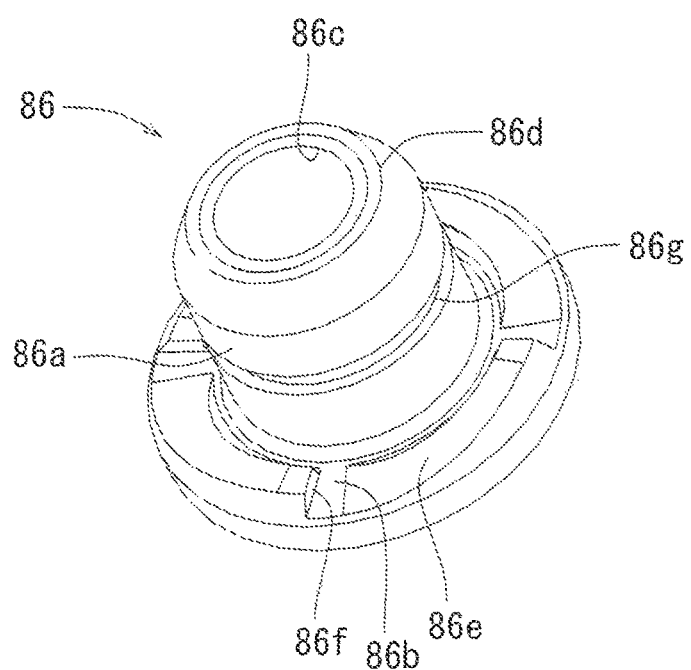
FIG. 21 is a perspective view of a hole member.
Figure 22:
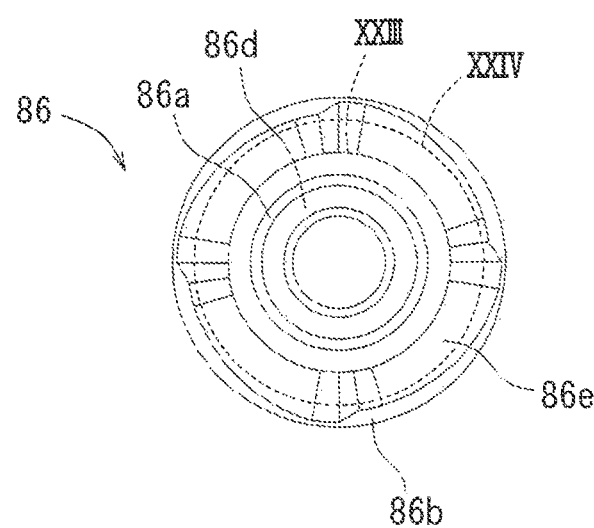
FIG. 22 is a top view of the hole member.
Figure 23:
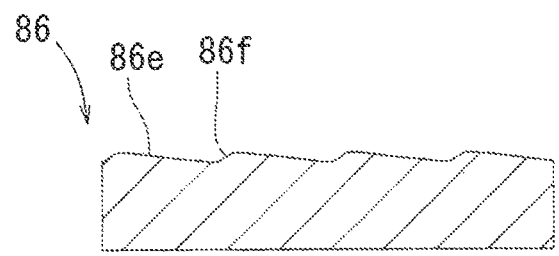
FIG. 23 is a developed view of the hole member on line XXIII-XXIII of FIG. 22.
Figure 24:
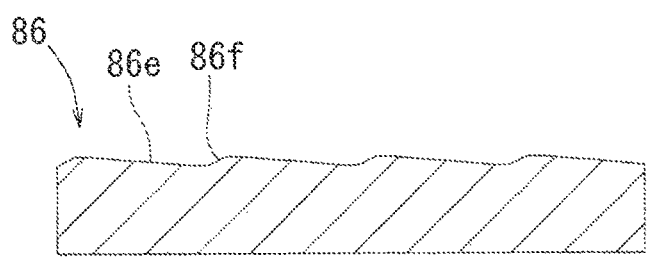
FIG. 24 is a developed view of the hole member on line XXIV-XXIV of FIG. 22.

As shown in FIGS. 19 and 21, the hole member 86 has a tubular portion 86a which is inserted into the base hole 10g of the bridge member 10f, and a flange 86b formed at a lower end of the tubular portion 86a. A groove 86g is formed at an upper outer radial periphery of the tubular portion 86a. The tubular portion 86a is inserted into the base hole 10g from below the bridge member 10f. A slip-off stopper 84 is fitted into the groove 86g positioned above the bridge member 10f. In this way the hole member 86 is attached to the bridge member 10f. The slip-off stopper 84 may be, for example, an E-ring or a C-ring. The hole member 86 has a tapered upper end 86d. The tapered upper end 86d is a circular ring with its diameter and circumference gradually decreasing from top to bottom. Therefore, with this tapered configuration, chips are prevented from accumulating on the upper surface of the hole member 86 and thus do not enter into the hole 86c of the hole member 86 from the upper surface.

As shown in FIGS. 19 and 21, the diameter of flange 86b is larger than a diameter of the base hole 10g of the bridge member 10f and the upper surface of the flange 86b faces a bottom surface of the bridge member 10f at its topmost portion. Inclined surfaces 86e and steps 86f are formed on the upper surface of the flange 86b. As shown in FIGS. 21 to 24, the inclined surfaces 86e extend in a circumferential direction and project counterclockwise gradually increasing in thickness upward. Therefore, the inclined surfaces 86e formed on the upper surface of the flange 86b define a lateral surface cam. A plurality of, inclined surfaces 86e (e.g. four) may be formed on the flange 86b such that steps 86f are formed between the inclined surfaces 86e. Walls extending in the radially inward-outward direction at the same circumferential location may be formed by the steps 86f so as to face in a counterclockwise direction.

Figure 20:
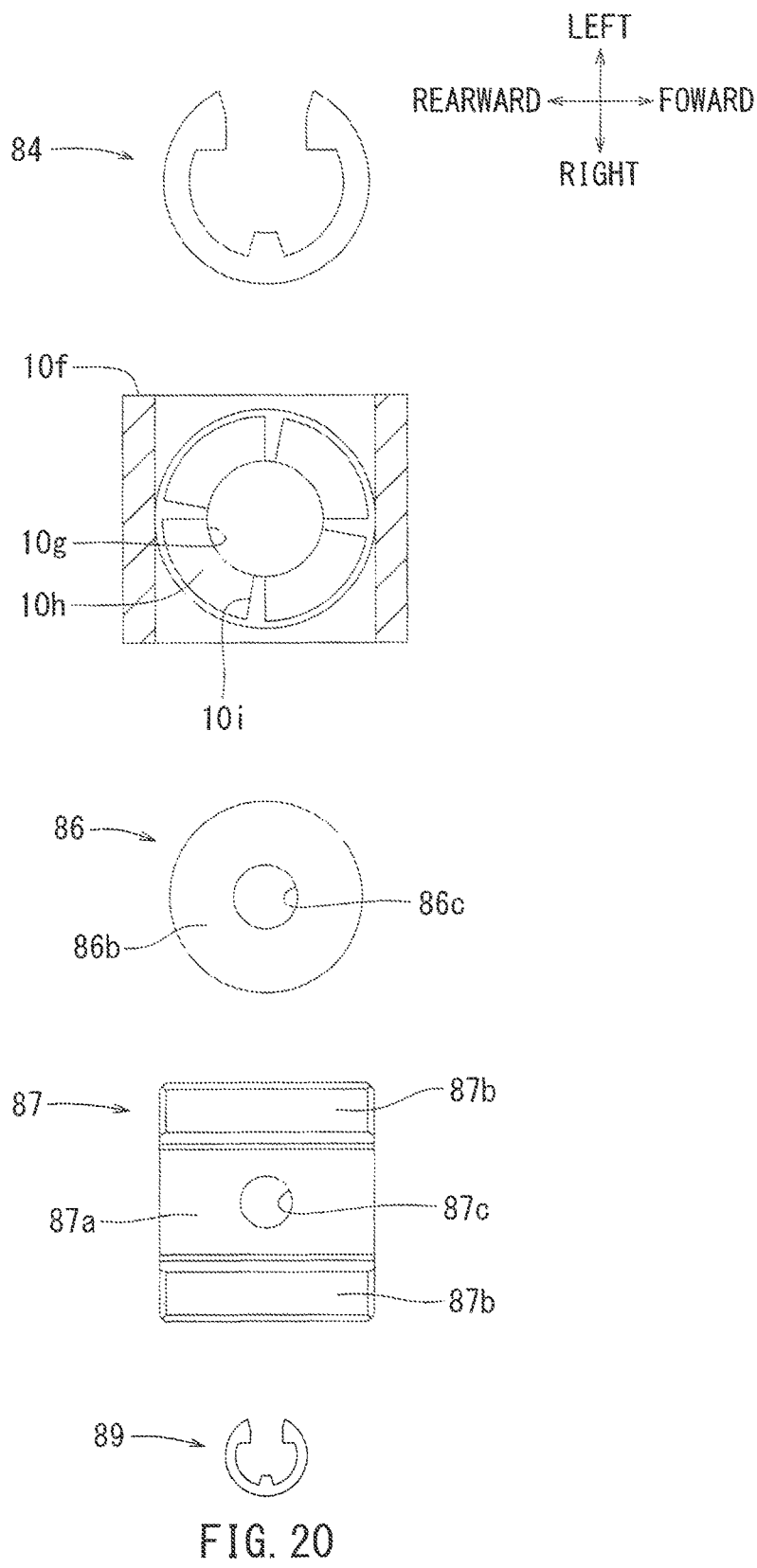
FIG. 20 is a bottom view of the components of the ruler fixing device.

As shown in FIG. 20, inclined surfaces 10h and steps 10i may be formed on the underside of the bridge member 10f. The inclined surfaces 10h and the steps 10i have a shape complementary to those of the inclined surfaces 86e and the steps 86f of the hole member 86 shown in FIG. 21. The inclined surface 10h extends in a circumferential direction and is recessed counterclockwise with thickness decreasing gradually upward. Therefore, the inclined surface 10h formed on the underside of the bridge member 10f defines the lateral surface cam. A plurality of inclined surfaces 10h (e.g. four) may be formed at the lower surface of the bridge member 10f so that steps 10i are formed between the inclined surfaces 10h. Walls extending in the radially inward-outward direction at the same circumferential location may be formed by the steps 10i so as to face in a counterclockwise direction.

Referring to FIGS. 19 to 21, the force is applied to the hole member 86 as well as a shaft member 85 against the bridge member 10f in a clockwise direction when the shaft member 85 is downwardly moved by clockwise rotation with respect to the hole member 86. At this time, the inclined surfaces 86e contact the inclined surfaces 10h so that the hole member 86 is pushed downwardly with respect to the bridge member 10f. Specifically, not the entire surface, but only one part of each inclined surface 86e and inclined surface 10h respectively contact each other. The slip-off stopper 84 is pushed against the upper surface of the bridge member 10f by the hole member 86. This prevents axial rattling of the hole member 86 with respect to the bridge member 10f. Further, the rattling of the hole member 86 in a rotational direction with respect to the bridge member 10f may also be prevented because the back-and-forth friction is increased when inclined surfaces 86e firmly abut the inclined surfaces 10h. In this way, it is possible to prevent the hole member 86 from rattling caused, for example, by vibration, with respect to the bridge member 10f.

Referring to FIGS. 19 to 21, the force is applied to the hole member 86 as well as a shaft member 85 against the bridge member 10f in a counterclockwise direction when the shaft member 85 is upwardly moved by counter-clockwise rotation with respect to the hole member 86. At this time, the steps 86f of the hole member 86 contact the steps 10i of the bridge member 10f. Consequently, the hole member 86 is prevented from rotating further in a counterclockwise direction past a predetermined amount with respect to the bridge member 10f. If the shaft member 85 is further rotated in the counterclockwise direction in this configuration, the shaft member 85 rotates with respect to the hole member 86 and bridge member 10f in the counterclockwise direction such that the shaft member 85 moves upward.

Referring to FIGS. 19 and 20, an operation member 88 is fixed to an upper end of the shaft member 85. The operation member 88 extends radially outward and upward from the shaft member 85 and is grasped by a user. The shaft member 85 includes a large diameter part 85a and a small diameter part 85b positioned below the large diameter part 85a. A male thread is formed on the outer peripheral radial surface of the large diameter part 85a. The large diameter part 85a is screwed into the hole member 86 while being inserted into a spring 83. The spring 83 is, for example, a coil spring having an upper end abutting the operation member 88 and a lower end supported by and abutting the bridge member 10f. When the shaft member 85 is screwed into the hole member 86, the large diameter part 85a is threadably engaged with a female thread formed in the hole 86c of the hole member 86, and this screw-fit configuration provides a resistance to the upwards biasing force of the spring 83.

Referring to FIGS. 19 and 20, the small diameter part 85b of the shaft member 85 extends downwardly from the hole member 86. The small diameter part 85b is inserted in a hole 87c of a pressing member 87. A slip-off stopper 89 is fitted into a groove 85c formed at a lower portion of the small diameter part 85b. The slip-off stopper 89 may be, for example, an E-ring or a C-ring. The slip-off stopper 89 and the large diameter part 85a have a larger diameter than that of the small diameter part 85b. Therefore, the pressing member 87 may be rotatably attached to the small diameter part 85b, vertically between the large diameter part 85a and slip-off stopper 89.

Figure 25:
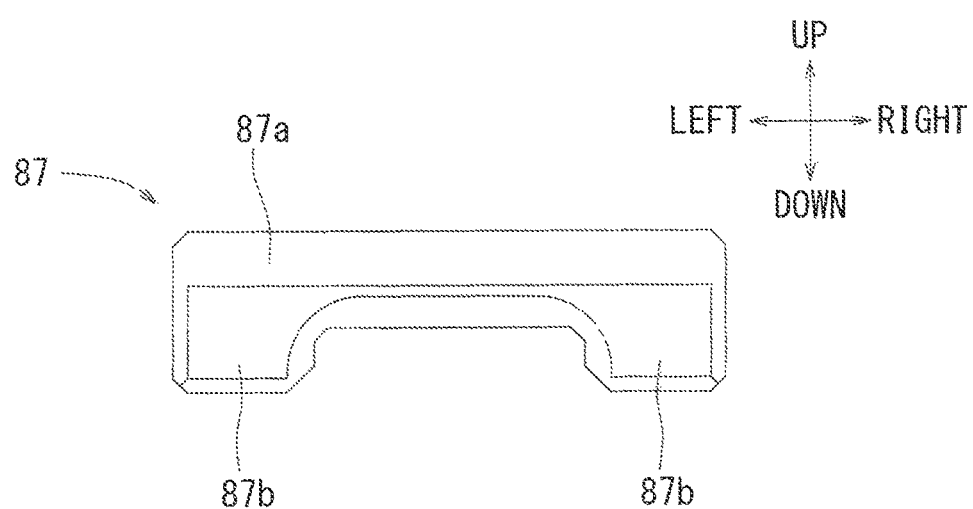
FIG. 25 is a front view of a pressing member.

As shown in FIGS. 19, 20 and 25, the pressing member 87 has a rectangular portion 87a and leg portions 87b extending downwardly from right and left ends on the lower surface of the rectangular portion 87a. The rectangular portion 87a is inserted between two columns 10j of the bridge member 10f. The two columns 10j stand facing opposite each other in the front-to-rear direction and face the lateral surface of the rectangular portion 87a. As a result, the pressing member 87 is restricted from rotating against the bridge member 10f.

As shown in FIGS. 17 and 18, the shaft member 85 moves downwardly with respect to the hole member 86 and the bridge member 10f by clockwise rotation about its longitudinal vertical axis using the operation member 88. The pressing member 87 moves downwardly along with the shaft member 85 so that the leg portions 87b of the pressing member 87 push the connecting bar 80b against the ruler retaining groove 10e. Consequently, the position of the parallel ruler 80 may be maintained with respect to the base 10. The shaft member 85 may move upward with respect to the hole member 86 and the bridge member 10f by counterclockwise rotation of the shaft member 85 around its longitudinal vertical axis. As the pressing member 87 moves upward along with the shaft member 85, the pressing member moves away from the connecting bar 80b. In this way, a position of the parallel ruler 80 in the right-left direction may be fixedly adjusted with respect to the base 10.

As shown in FIG. 19, the bridge member 10f, which is a part of the base 10, may be made of aluminum similar to the other parts of the base 10. On the contrary, the hole member 86 and the shaft member 85 are made of materials having higher abrasion resistance and rigidity than those of base 10, including bridge member 10f. For example, the hole member 86 and the shaft member 85 may be made of metallic materials such as a steel material, an iron material, a titanium material, or a titanium alloy. The hole member 86 and the shaft member 85 may preferably be made of the same material(s) or material(s) having similar abrasion resistance and rigidity. More specifically, the hole member 86 may have a hole region including the hole 86c, where said hole region may be made of a material having higher abrasion resistance and rigidity than those of the base 10. For example, a hole wall surface may be surface-treated by hard chrome plating or hardening etc. Alternatively, only the interior of the hole member 86 and the hole wall surface may be made of a metallic material etc.

The portable circular saw (portable machining device) 1 as mentioned above, has the base 10, the parallel ruler 80 and the ruler fixing device 81 as shown in FIG. 6. The base 10 supports the circular saw main body (machining device main body) 20 and is placed on the workpiece W. As shown in FIGS. 6 and 17, the parallel ruler 80 includes a connecting bar 80b slidably installed in the ruler retaining groove 10e of the base 10 and a ruler main body 80a extending along a lateral edge of and underneath the base 10 from a terminal end of the connecting bar 80b, which is positioned outside of the base 10. The parallel ruler 80 through ruler main body 80a abuts the longitudinal lateral surface of workpiece W when the circular saw main body 20 is moved along the lateral surface of the workpiece W. The ruler fixing device 81 includes a hole 86c formed in the base 10, a shaft member 85 threadably screwed into the hole 86c, and a pressing member 87 attached to an end of the shaft member 85 helping to press the connecting bar 80b against the ruler retaining groove 10e. A hole region including the hole 86c is made of a material having a higher abrasion resistance than that of the other region of the base 10.

Therefore, referring to FIG. 17, even in the case where chips produced during machining the workpiece W enter into the hole 86c, the hole region is hardly scraped by the chips because of the high abrasion resistance material. Accordingly, because the abrasion in the hole region by the chips may be reduced, it is possible to reduce the rattling of the pressing member 87 with respect to the base 10 caused by the abrasion of the hole 86c. As a result the parallel ruler 80 can be stably fixed to the base 10 by the ruler fixing device 81.

Referring to FIG. 17, the hole region 86c may be made of the same kind of the material as that of the shaft member 85. For example, the hole member 86 and the shaft member 85 may be made of a steel material. Therefore, the hole region is prevented from being scraped more than the shaft member 85 when the chips enter into the hole 86c. Consequently, the abrasion by the chips in the hole region may be reduced so that it is possible to reduce the rattling of the shaft member 85 and the pressing member 87 with respect to the base 10, wherein the rattling is caused by the abrasion of the hole 86c.

Referring to FIG. 17, the hole region 86c alone may also be made of a steel material. Therefore, the abrasion resistance in the hole region would be higher than in the other regions of the base 10 made of, for example, aluminum. Consequently, it would be possible to reduce the abrasion by the chips in the hole region.

As shown in FIG. 17, the dust proof circular saw 1 has a hole 86c and a hole member 86 which can be removably attached to base 10. Therefore, when the hole region of the hole 86c is damaged, only a hole member 86 would have to be replaced with a new hole member 86, without needing to replace the entire base 10. As a result, the damage to the hole 86c may be repaired by only needing to replace a relatively small component.

As shown in FIG. 17, since the hole member 86 has a tapered upper end 86d, this helps deflect chips produced during machining of the workpiece W away, and these chips thus do not have substantial accumulation on the leading end of the hole member 86. Therefore, the chips accumulated on the leading end of the hole member 86 are less likely enter into the hole 86c of the hole member 86.

As shown in FIG. 17, the base 10 includes a bridge member 10f that is positioned above the connecting bar 80b and extends over the connecting bar 80b. A base hole 10g is formed in the bridge member 10f into which the hole member 86 is inserted. The hole member 86 includes a tubular portion 86a inserted into the base hole 10g, and a flange 86b formed around a lower end of the tubular portion 86a and vertically opposing a bottom surface of the bridge member 10f at its topmost portion. A slip-off stopper 84 vertically opposing an upper surface at the top of the bridge member 10f is provided on the tubular portion 86a. Therefore, the hole member 86 is attached to the bridge member 10f by the flange 86b and the slip-off stopper 84.

As shown in FIGS. 20 and 21, a structure that converts relative rotational force to an axial force to press the slip-off stopper 84 against the bridge member 10f is provided between an upper surface of the flange 86b at the hole member 86 and a lower surface of the bridge member 10f. The hole member 86 is firmly held with respect to the bridge member 10f so that the rattling may be prevented with respect to the bridge member 10f.

The above-described portable circular saw (portable cutting device) 1 has a circular saw main body (cutting device main body) 20 with an electric motor 30 for rotating a disc cutter blade 22 and a fixed cover 21 fixed to the circular saw main body 20 to cover a part of the outer radial periphery of the disc cutter blade 22. The base 10 supports the circular saw main body 20 such that the angle in the up-down direction of the circular saw main body 20 can be adjusted at its upper side to adjust the extent that the disc cutter blade 22 projects in a downward direction. Further, the base 10 supports the circular saw main body 20 in the right-left direction as well, such that the angle in the tight-left direction can be adjusted to allow the tilting angle of a rotation center axis of the disc cutter blade 22 to be adjusted. The auxiliary cover 9 covers the outer radial periphery of the disc cutter blade 22 in a gap S between the fixed cover 21 and the base 10 in the vicinity of the pivotal center of the circular saw main body 20 (vertically pivotal support shaft 15) in the up-down direction. The auxiliary cover vertically moving mechanism 25 moves the auxiliary cover 9 with respect to the circular saw main body 20 in accordance with a vertical angle of the circular saw main body 20. The laterally tilting support shaft 13 pivotally connects the auxiliary cover 9 to the base 10 in the right-left direction. The interlock mechanism 26 rotates the auxiliary cover 9 around the laterally tilting support shaft 13 in the right-left direction in accordance with the angle of the circular saw main body 20 in the right-left direction.

Therefore, as shown in FIGS. 2 and 3, the auxiliary cover 9 follows an angle of the circular saw main body 20 not only when the circular saw main body 20 is vertically moved with respect to the base 10, but also when the circular saw main body 20 is laterally tilted. The shape of a gap S between the fixed cover 21 and the base 10 varies in accordance with the angle in the up-down direction and the right-left direction of the circular saw main body 20. Thereby the auxiliary cover 9 moves corresponding to a change of the shape of the gap S. In this way, by covering the gap S in accordance with the up-down and right-left positions of the circular saw main body 20, the auxiliary cover 9 may reduce scattering of chips out of the gap S between the fixed cover 21 and the base 10.

As shown in FIGS. 6 and 15, the auxiliary cover 9 includes the angular guide 14 that is attached to the base 10 such that the angle in the right-left direction can be adjusted. The angular guide 14 is provided with the brackets 14b and 14g for connecting the circular saw main body 20 to the auxiliary cover 9. Therefore, the angles in the right-left direction of both the angular guide 14 of the auxiliary cover 9 and circular saw main body 20 can be adjusted by adjusting the angle of the angular guide 14 in the right-left direction.

Figure 7:
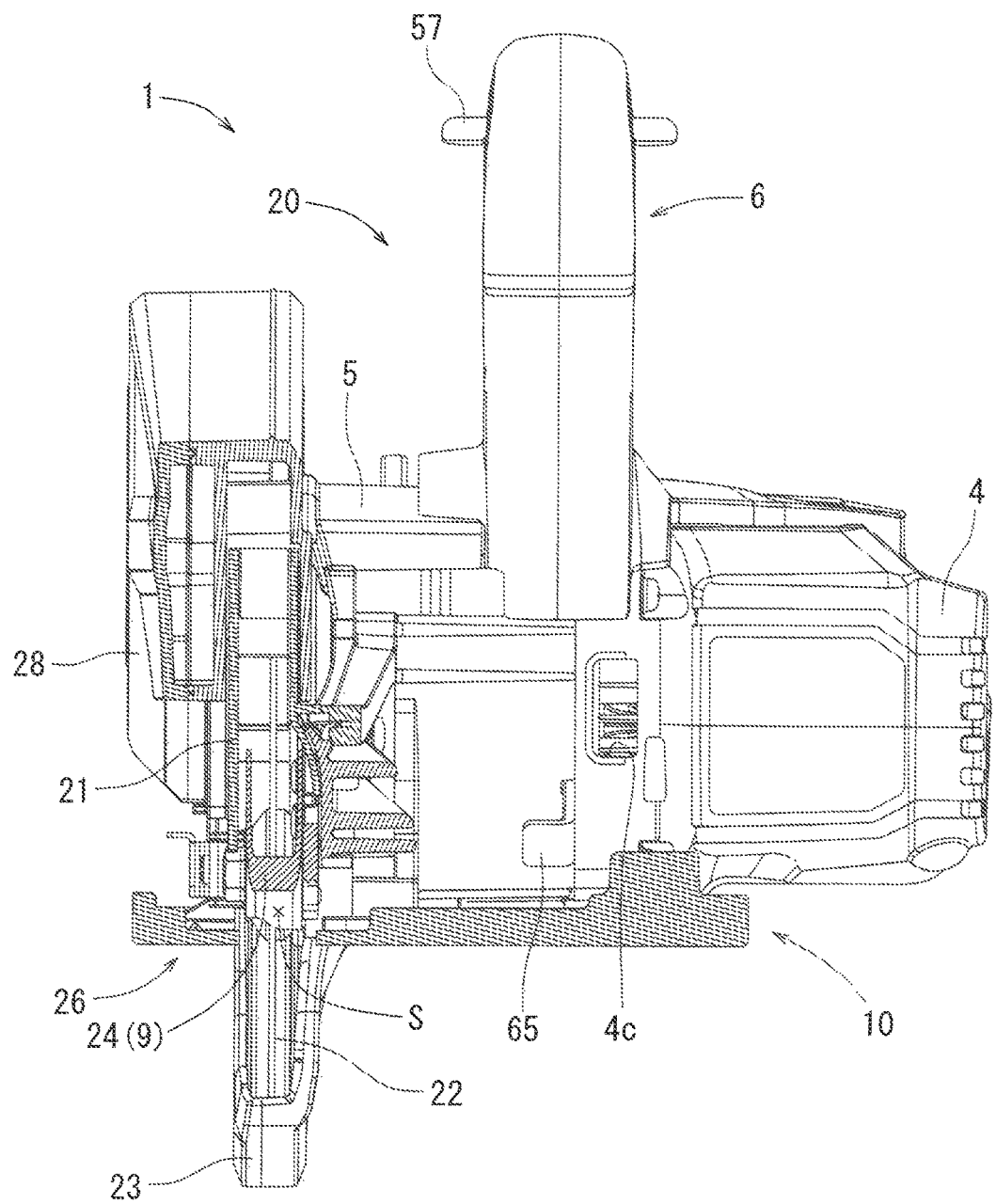
FIG. 7 is a front view of the portable circular saw that is partially removed.
Figure 9:
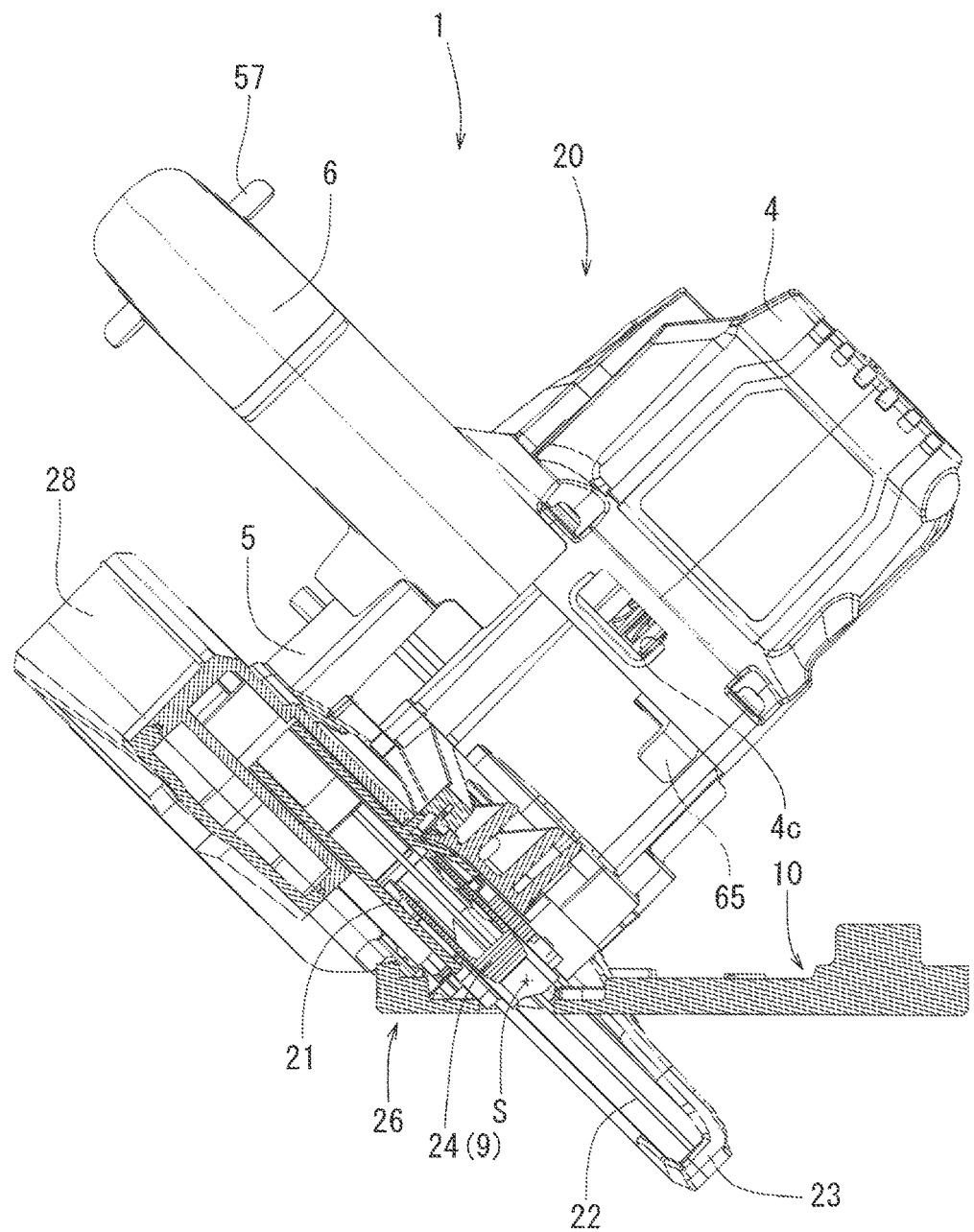
FIG. 9 is a front view of the portable circular saw that is partially removed when the circular saw main body is positioned in a tilted posture.

As shown in FIG. 2, the auxiliary cover 9 includes the angular guide 14 attached to the base 10 in an angle-adjustable manner in the right-left direction, and also includes the dust cover 24 connected to the angular guide 14 and the circular saw main body 20. Consequently, the dust cover 24 is tilted with respect to the base 10 in the right-left direction in accordance with the angle of the angular guide 14 in the right-left direction as shown in FIGS. 7 and 9. Further, the dust cover 24 moves relative to the circular saw main body 20 in accordance with the angle of the circular saw main body 20 in the up-down direction as shown in FIGS. 2 and 3.

As shown in FIGS. 2 and 3, the dust proof circular saw 1 has a vertical coupling structure (auxiliary cover vertically moving mechanism 25) for movably connecting the dust cover 24 in the up-down direction with respect to the circular saw main body 20. Therefore, the dust cover 24 is able to move in the up-down direction with respect to the circular saw main body 20 in correspondence with the angle of the circular saw main body 20 in the up-down direction.

As shown in FIG. 2, a vertical coupling structure 25 includes a vertically elongated hole 24d formed in the dust cover 24 and pins 19 that project from the circular saw main body 20 and are inserted in the vertically elongated hole 24d so as to move along the vertically elongated hole 24d. Therefore, with a relatively simple construction, the dust cover 24 can be connected to the circular saw main body 20 in a vertically movable manner.

As shown in FIGS. 2 and 3, the frontal intersection point of the outer radial periphery of the disc cutter blade 22 and the base 10 moves in the front-rear direction when the angle of the circular saw main body 20 is adjusted in the up-down direction. The dust proof circular saw 1 also includes an auxiliary cover laterally moving mechanism 27 that moves a lower end of the dust cover 24 in the front-rear direction commensurate with the movement of the intersection point. The auxiliary cover laterally moving mechanism 27 includes a front-to-rear elongated hole 14f formed in the angular guide 14 and pins 24e that protrude from the dust cover 24 and are movably inserted into the front-to-rear elongated hole 14f along the front-to-rear elongated hole 14f.

Therefore, due to the construction of the auxiliary laterally moving mechanism 27, the lower end of the dust cover 14 moves in the front-rear direction when the frontal intersection point of the outer radial periphery of the disc cutter blade 22 and the base 10 moves in the front-rear direction. Consequently, the dust cover 24 is always positioned in the vicinity of the disc cutter blade 22. As a result, due to its positioning close to the cutter blade 22, the dust cover 24 may favorably reduce the scattering of the chips caused by the disc cutter blade 22.

As shown in FIG. 2, the angular guide 14 is provided with the bracket 14b to which the circular saw main body 20 is rotatably attached in the up-down direction. The front-to-rear elongated hole 14f of the angular guide 14 is formed in the bracket 14b. The bracket 14b is adjacent to the circular saw main body 20 so as to be attached to the circular saw main body 20. The dust cover 24 is also adjacent to the circular saw main body 20 since the dust cover 24 is connected to the front-to-rear elongated hole 14f of the bracket 14b. The dust cover 24 may be adjacent to the disc cutter blade 22 since the disc cutter blade 22 is attached to the circular saw main body 20. As a result, the dust cover 24 can favorably reduce the scattering of chips caused by the disc cutter blade 22.

As shown in FIGS. 2 and 3, the dust proof circular saw 1 includes an auxiliary cover 9 and an auxiliary cover vertically moving mechanism 25. The auxiliary cover 9 is movably attached to the fixed cover 21 to cover the outer radial periphery of the disc cutter blade 22 in the gap S defined between the fixed cover and the base 10 in the vicinity of the pivotal center of the cutting device main body 20 in the up-down direction (vertically pivotal support shaft 15). The auxiliary cover vertically moving mechanism 25 allows the auxiliary cover 9 to move with respect to the fixed cover 21 in accordance with the angle of the circular saw main body 20 in the up-down direction, as described supra.

Therefore, as shown in FIGS. 2 and 3, the auxiliary cover 9 moves with respect to the fixed cover 21 by adjusting to an angle of the circular saw main body (cutting device main body) 20 relative to the base 10 in the up-down direction. When the circular saw main body 20 is tilted in the right-left direction, the auxiliary cover 9 also tilts with the fixed cover 21 in the right-left direction since the auxiliary cover 9 is attached to the fixed cover 21. As a result, since the shape of the gap S between the fixed cover 21 and the base 10 varies in accordance with the angle of circular saw main body 20, the auxiliary cover 9 thereby moves in accordance with the shape of the gap. In this way, the auxiliary cover 9 may reduce scattering of chips out of the gap S between the fixed cover 21 and the base 10.

As shown in FIGS. 2 and 3, the portable circular saw (portable cutting device) 1 includes a cover body (9, 21 and 23) attached to the circular saw main body (cutting device main body) 20 to cover a part of the outer radial periphery of the disc cutter blade 22. The cover body may tilt along with the circular saw main body 20 in the right-left direction. Part of the cover body moves with respect to the circular saw main body 20 in the up-down direction in accordance with the pivotal movement of the circular saw main body 20 in the up-down direction such that the gap S defined between the cover body and the base 10 may be reduced in the vicinity of the of the pivotal center of the circular saw main body 20 in the up-down direction (vertically pivotal support shaft 15).

Therefore, as shown in FIGS. 2 and 3, the part of the cover body (9, 21 and 23) that moves with respect to the circular saw main body 20 in the up-down direction a by adjusting to an angle of the circular saw main body 20 with respect to the base 10 in the up-down direction. As shown in FIGS. 7 and 9, when the circular saw main body 20 is tilted in the right-left direction, the cover body tilts along with the circular saw main body 20 since the cover body is attached to the circular saw main body 20. Thus, although the shape of the gap between the cover body and the base 10 may vary in accordance with the angle of the circular saw main body 20, a position and an angle of a part of the cover body (dust cover 24) may be changed in response to the angle of the circular saw main body 20. Accordingly, the gap S between the cover body and the base 10 may be reduced regardless of rotation of the circular saw main body 20 in the up-down and/or right-left directions so that the scattering of the chips can be reliably prevented.

As shown in FIGS. 2 and 3, the dust cover 24 is slidably connected to the circular saw main body 20 by the pins 19 inserted into the vertically elongated hole 24d. Alternatively, the dust cover 24 may slide while abutting a guide wall provided on the circular saw main body 20, and may be supported by said guide wall.

The dust proof circular saw 1 has been described above as one exemplary embodiment of the portable cutting device 1. Alternatively, the portable cutting device may be, for example, a cutter with a diamond wheel as a circular cutting blade to be rotated.

The auxiliary cover 9 and the circular saw main body 20 collectively tilt around the laterally tilting support shafts 13 and 17 in the right-left direction through the angular guide 14, as described above. Alternatively, the auxiliary cover 9 and the circular saw main body 20 may be separately attached to the laterally tilting support shafts 13 and 17 in a tiltable manner. In this case, an interlock mechanism that allows the auxiliary cover 9 to be tilted in the right-left direction in accordance with the tilting movement of the circular saw main body 20 in the right-left direction would be provided.

As shown in FIGS. 2 and 3, the vertical coupling structure 25 includes vertically elongated hole 24d formed in the dust cover 24 and at least one pin 19 that projects from the circular saw main body (cutting device main body) 20 and are inserted in the vertically elongated hole 24d to move along the vertically elongated hole 24d. Alternatively, the vertical coupling structure 25 may include the vertically elongated hole formed in the circular saw main body 20 and at least one pin that projects from the dust cover 24 and are inserted into the vertically elongated hole to move along said hole.

As shown in FIGS. 2 and 3, the auxiliary cover laterally moving mechanism 27 includes a front-to-rear elongated hole 14f formed in the angular guide 14 and at least one pin 24e that projects from the dust cover and are inserted into the front-to-rear elongated hole to move along the front-to-rear elongated hole 14f. Alternatively, the auxiliary cover laterally moving mechanism 27 may have a front-to-rear elongated hole formed in the dust cover 24 and at least one pin that projects from the angular guide 14 and are inserted into the front-to-rear elongated hole to move along said hole.

Figure 26:
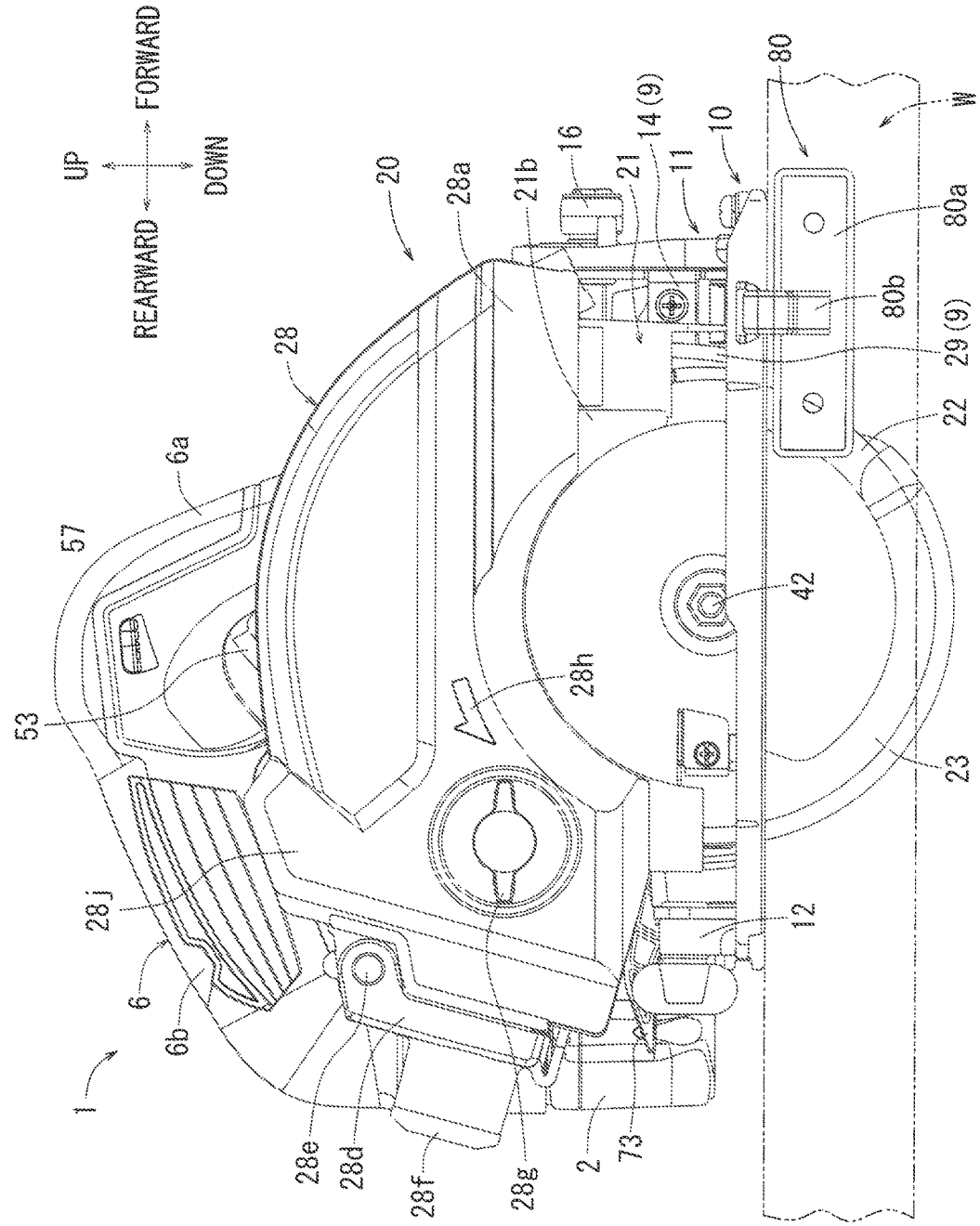
FIG. 26 is a right side view of a dust proof circular saw.

As shown in FIGS. 1 to 25, as an alternative to the dust proof circular saw 1, the dust proof circular saw 1 shown in FIGS. 26 to 47 may be adopted. The dust proof circular saw 1 shown in FIGS. 26 to 47 has a dust cover 29 shown in FIGS. 28 and 37 as an alternative to the dust cover 24 shown in FIGS. 3 and 12. The dust proof circular saw 1 shown in FIGS. 26 to 47 has a blower mechanism 90 shown in FIG. 29 as an alternative to the duct 65 shown in FIG. 5. The dust box 28 shown in FIGS. 26 and 45 has a temporary holding mechanism 28j in addition to the configuration shown in FIG. 1. Hereinafter, the dust proof circular saw 1 shown in FIGS. 26 to 47 will be described mainly with regard to the differences between it and the dust proof circular saw 1 shown in FIGS. 1 to 25. The dust proof circular saw 1 shown in FIGS. 26 to 47 will be described as follows assigned with the same reference numerals to the same components as those of the dust proof circular saw 1 shown in FIGS. 1 to 25

Figure 27:
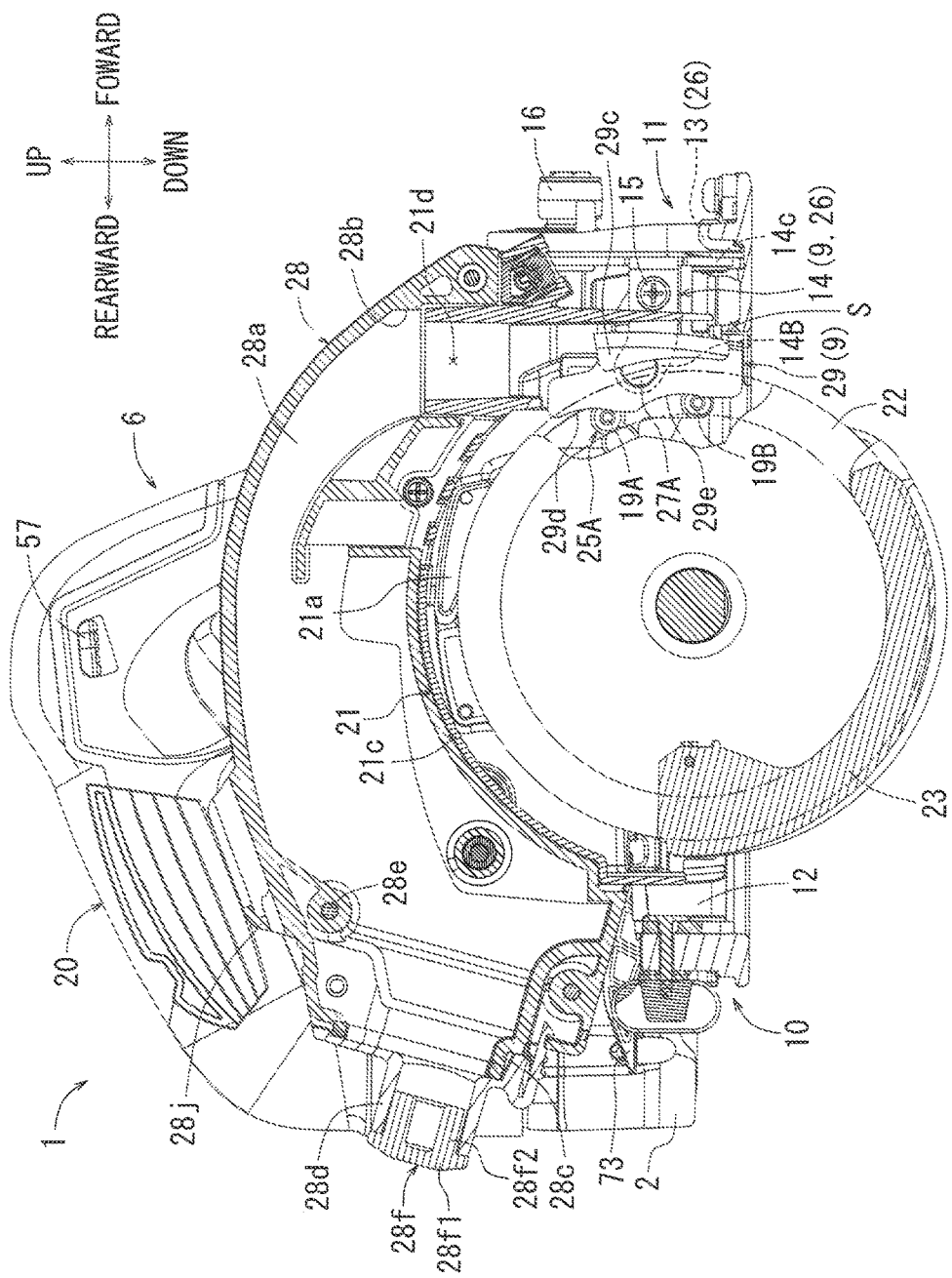
FIG. 27 is a right side view of the dust proof circular saw that is partially removed.
Figure 28:
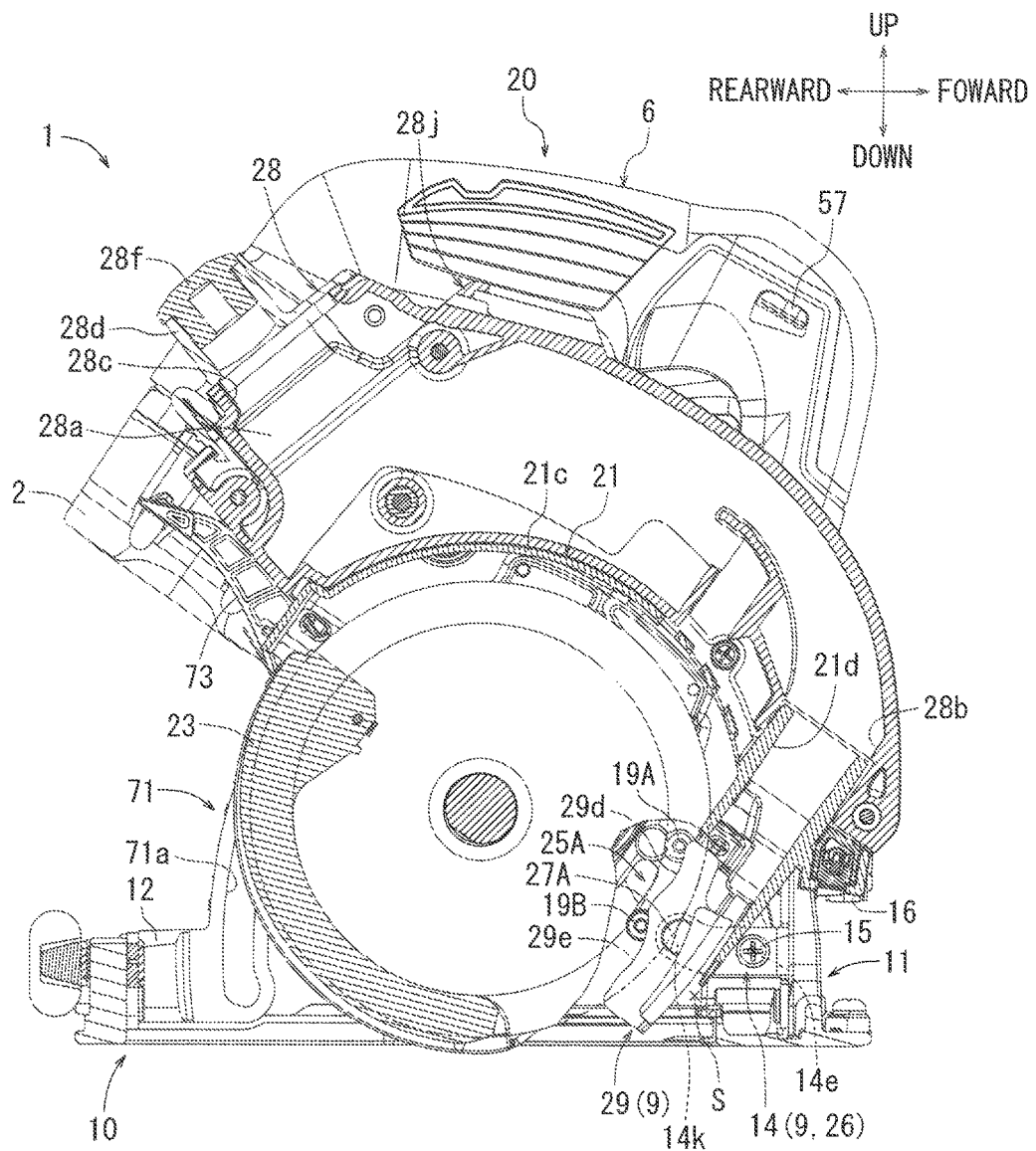
FIG. 28 is a right side view of the dust proof circular saw that is partially removed when the circular saw main body is positioned in an upper position.
Figure 29:
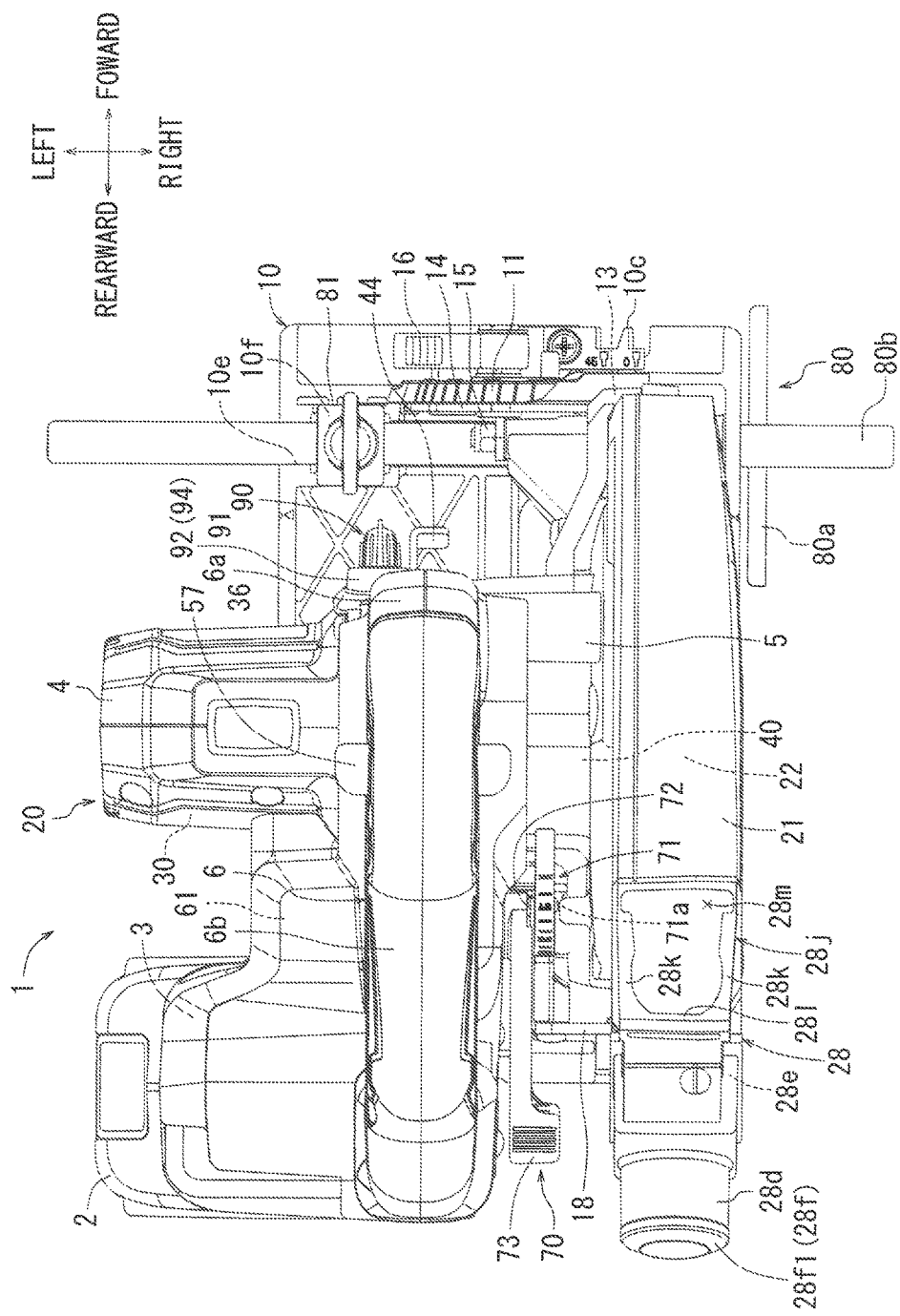
FIG. 29 is a plan view of the dust proof circular saw.

As shown in FIGS. 27 and 28, the dust proof circular saw 1 has an auxiliary cover 9. The auxiliary cover 9 includes a dust cover 29 and an angular guide 14 for connecting the dust cover 29 to the base 10. As shown in FIGS. 37 to 40, the dust cover 29 has a vertically elongated first side wall 29a, a second side wall 29c laterally opposed to the first side wall 29a, and a front wall 29b for connecting front ends of the first side wall 29a and the second side wall 29c in the left-to-right direction. A hole 29g is formed in the vertical central area of the first side wall 29a. A shaft member 27A shown in FIG. 27 is inserted into the hole 29g and also into the hole 14k of the angular guide 14. In this way the dust cover 29 is rotatably connected to the angular guide 14.

Figure 37:
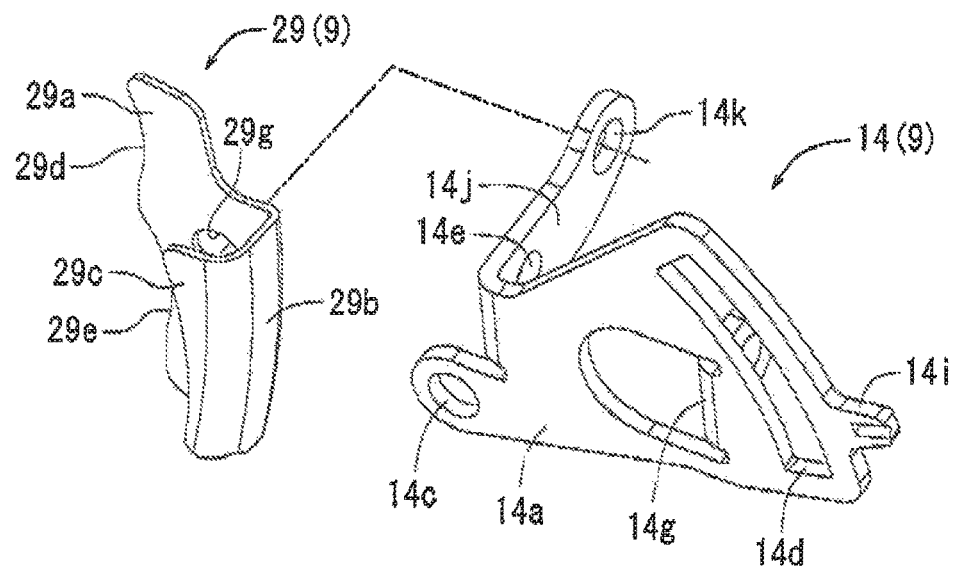
FIG. 37 is a perspective view of the dust cover and the angular guide.
Figure 38:
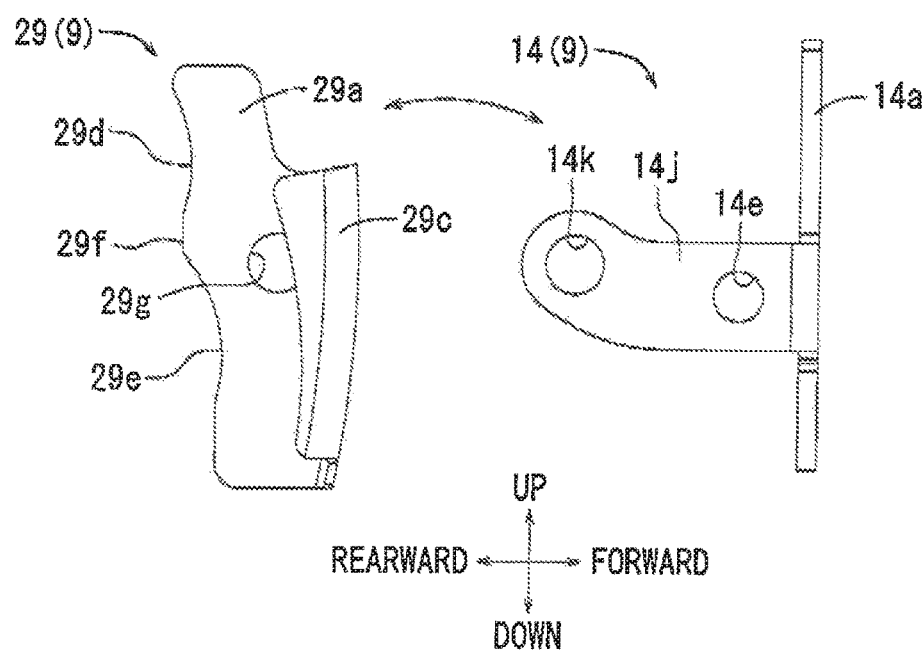
FIG. 38 is a right side view of the dust cover and the angular guide.

As shown in FIGS. 37 and 38, cam surfaces 29d and 29e are defined on the rear edge of the first side wall 29a. The cam surface 29d is positioned in an upper region of the rear edge of the first side wall 29a and may be positioned above the hole 29g. The cam surface 29e is positioned in a lower region of the rear edge of the first side wall 29a and may be positioned below the hole 29g. The cam surfaces 29d and 29e are forwardly recessed. A rearward protrusion 29f is formed on the rear edge of the first side wall 29a vertically between the cam surfaces 29d and 29e.

As shown in FIG. 38, the vertical length of the second side wall 29c is shorter than that of the first side wall 29a. An upper end of the second side wall 29c is positioned below an upper end of the first side wall 29a and a lower end of the second side wall 29c is positioned above the lower end of the first side wall 29a. A front-to-rear width of the second side wall 29c is narrower than that of the first side wall 29a and a rear edge of the second side wall 29c is positioned forward relative to the rear edge of the first side wall 29a. The rear edge of the second side wall 29c is configured in a curved arcuate shape and extends in a shape complementary to the outer peripheral edge of the cutting blade 22 as shown in FIG. 27.

Figure 30:
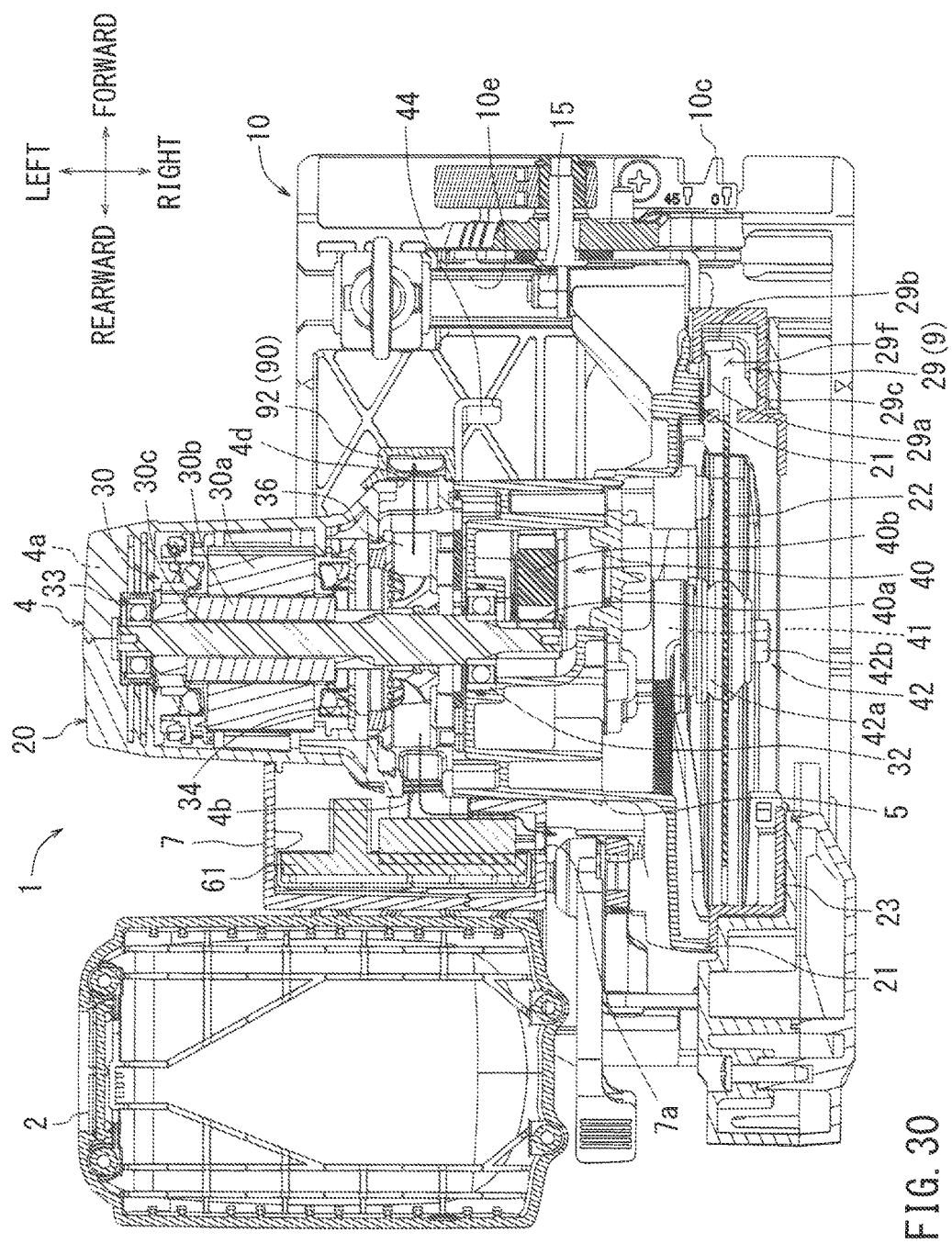
FIG. 30 is a horizontal cross-sectional view of the dust proof circular saw.
Figure 39:
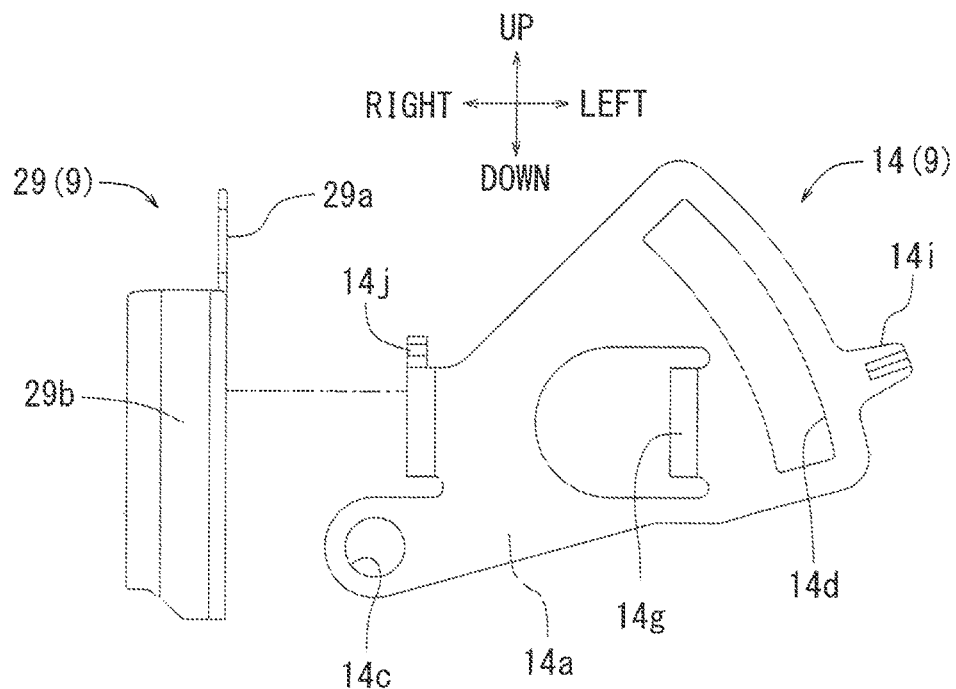
FIG. 39 is a front view of the dust cover and the angular guide.
Figure 40:
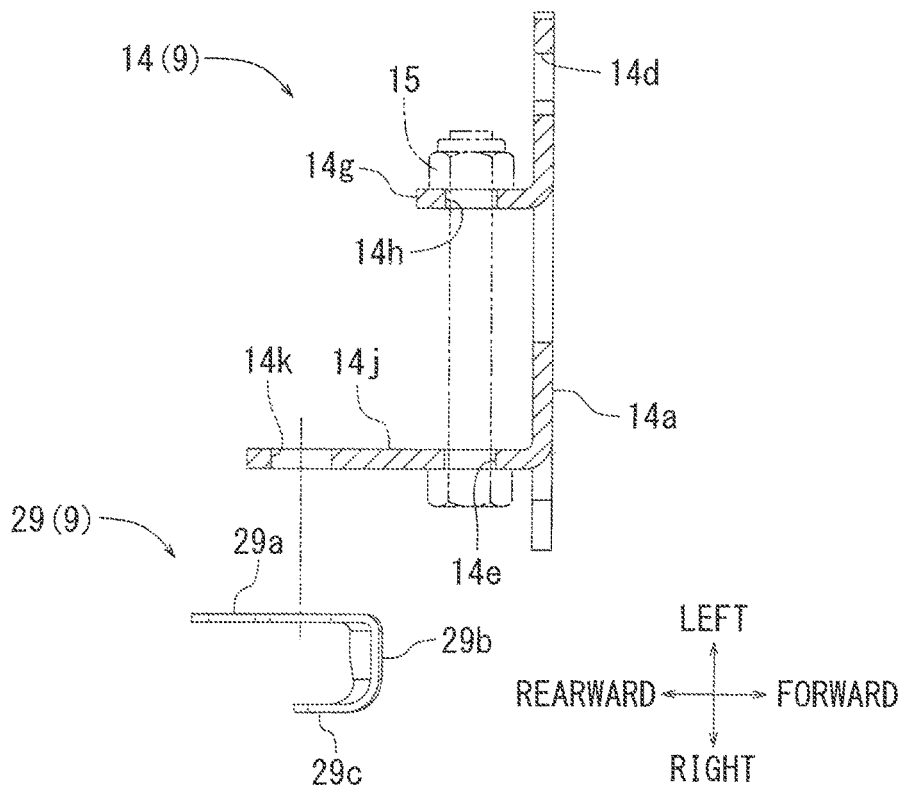
FIG. 40 is a partial sectional top view of the dust cover and the angular guide.

As shown in FIGS. 37, 39 and 40, the front wall 29b connects the front edge of the first side wall 29a and the front edge of the second side wall 29c, and oppositely faces the outer peripheral edge of the cutting blade 22 in the front-to-rear direction as shown in FIG. 30. The outer peripheral edge of the cutting blade 22 is encompassed on three sides by a groove 29f defined by the first side wall 29a, the second side wall 29c and the front wall 29b, and is positioned in the vicinity of the groove 29f. Therefore, the chips produced by the cutting blade 22 during machining are accommodated by the groove 29f and flows along the groove 29f.

As shown in FIGS. 37 to 40, the angular guide 14 includes a front wall 14a in the left-to-right direction, a first bracket 14j and second bracket 14g extending orthogonally backward from the front wall 14a. The first bracket 14j extends rearward from a rightward end of the front wall 14a and the second bracket 14g extends rearward from a central region of the front wall 14a. The first bracket 14j and the second bracket 14g extend parallel to each other.

As shown in FIGS. 27 and 28, the auxiliary cover 9 is tilted by the auxiliary cover tilting mechanism 25A with respect to the circular saw main body 20. For example, the dust cover 29, which is one part of the auxiliary cover 9, is forwardly tilted with respect to the circular saw main body 20 by rotating the circular saw main body 20 from a lower position shown in FIG. 27 to an upper position shown in FIG. 28. The auxiliary cover tilting mechanism 25A includes cam surfaces 29d and 29e of the dust cover 29 and pins (cam follower) 19A and 19B which abut the cam surfaces 29d and 29e.

As shown in FIGS. 27 and 28, the pins 19A and 19B are provided on the circular saw main body 20. For example, the pins 19A and 19B may be provided on the fixed cover 21 and project from a left side surface 21a of the fixed cover 21 in the left-to-right direction. The pins 19A and 19B have a cylindrical columnar shape with the outer radial peripheral surface of each pin abutting the respective cam surfaces 29d and 29e. The pin 19A contacts a lower region of the cam surfaces 29d and the pin 19B contacts a lower region of the cam surface 29e when the circular saw main body 20 is placed in a lower position shown in FIG. 27. The pin 19A contacts an upper region of the cam surface 29d and the pin 19B contacts an upper region of the cam surface 29e when the circular saw main body 20 is placed in an upper position shown in FIG. 28.

As shown in FIGS. 27 and 28, the pin 19A moves upward and pushes the cam surface 29d forward when the circular saw main body 20 is upwardly moved around the vertically pivotal support shaft 15 with respect to the base 10. As a result, due to the interaction of the upward movement of the pin 19A and the cam surface 29d, the dust cover 29 rotates clockwise around the shaft member 27A. The pin 19B moves downward and pushes the earn surface 29e forward when circular saw main body 20 is downwardly moved with respect to the base 10 around the vertically pivotal support shaft 15. As a result due to the interaction of the downward movement of the pin 19B and the cam surface 29e, the dust cover 29 rotates counterclockwise around the shaft member 27A.

As shown in FIG. 38, a hole 14k is formed in a rear region of the first bracket 14j of the angular guide 14. The shaft member 27A is inserted into the hole 29g of the dust cover 29 and the hole 14k. Therefore, the dust cover 29 can rotate around the shaft member 27A and is pivotally connected to the base 10 via the angular guide 14.

As shown in FIG. 27, a lower end of the dust cover 29 is adjacent to the base 10 when the circular saw main body 20 is placed in a lower position. Accordingly, the dust cover 29 covers the gap S between the base 10 and the front end of the fixed cover 21. The front end position of the cutting blade 22 corresponding to the intersection point of the cutting blade 22 and the base 10 may move rearward by pivoting the circular saw main body 20 from a lower position shown in FIG. 27 to the upper position shown in FIG. 28.

Correspondingly, the lower end of the dust cover 29 also moves rearward with respect to the base 10, commensurate with the movement of said intersection point. Therefore, the lower end of the dust cover 29 moves in a front-rear direction in accordance with the pivotal end of the circular saw main body 20 in the up-down direction to be always positioned in the vicinity of the cutting blade 22. Therefore, the dust cover 29 may effectively cover the gap S between the base 10 and the front end of the fixed cover 21.

As shown in FIGS. 31 to 34, the auxiliary cover 9 is tilted in the right-left direction with respect to the base 10 in accordance with the angle of the circular saw main body 20 in the right-left direction using the interlock mechanism 26 (angular guide 14). In particular, the angular guide 14 is pivotally connected to the base 10 around the laterally tilting support shaft 13. The auxiliary cover 9 is connected to the angular guide 14 via the shaft member 27A, which is inserted into the hole 14k of the angular guide 14. Thus, the auxiliary cover 9 may also tilt along with the angular guide 14 in the right-left direction with respect to the base 10 about laterally tilting support shaft 13 when the circular saw main body 20 is tilted along with the angular guide 14 in the right-left direction with respect to the base 10.

Figure 31:
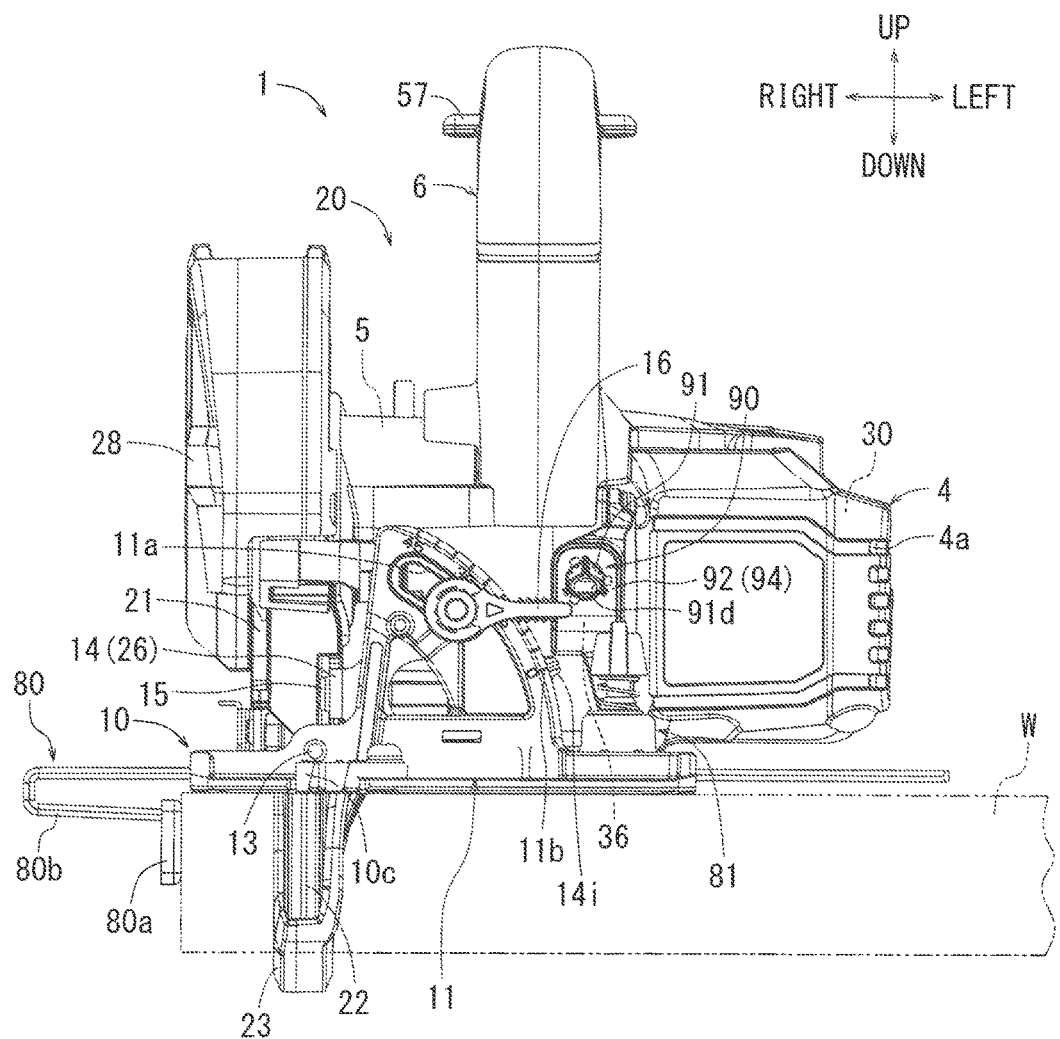
FIG. 31 is a front view of the dust proof circular saw.
Figure 32:
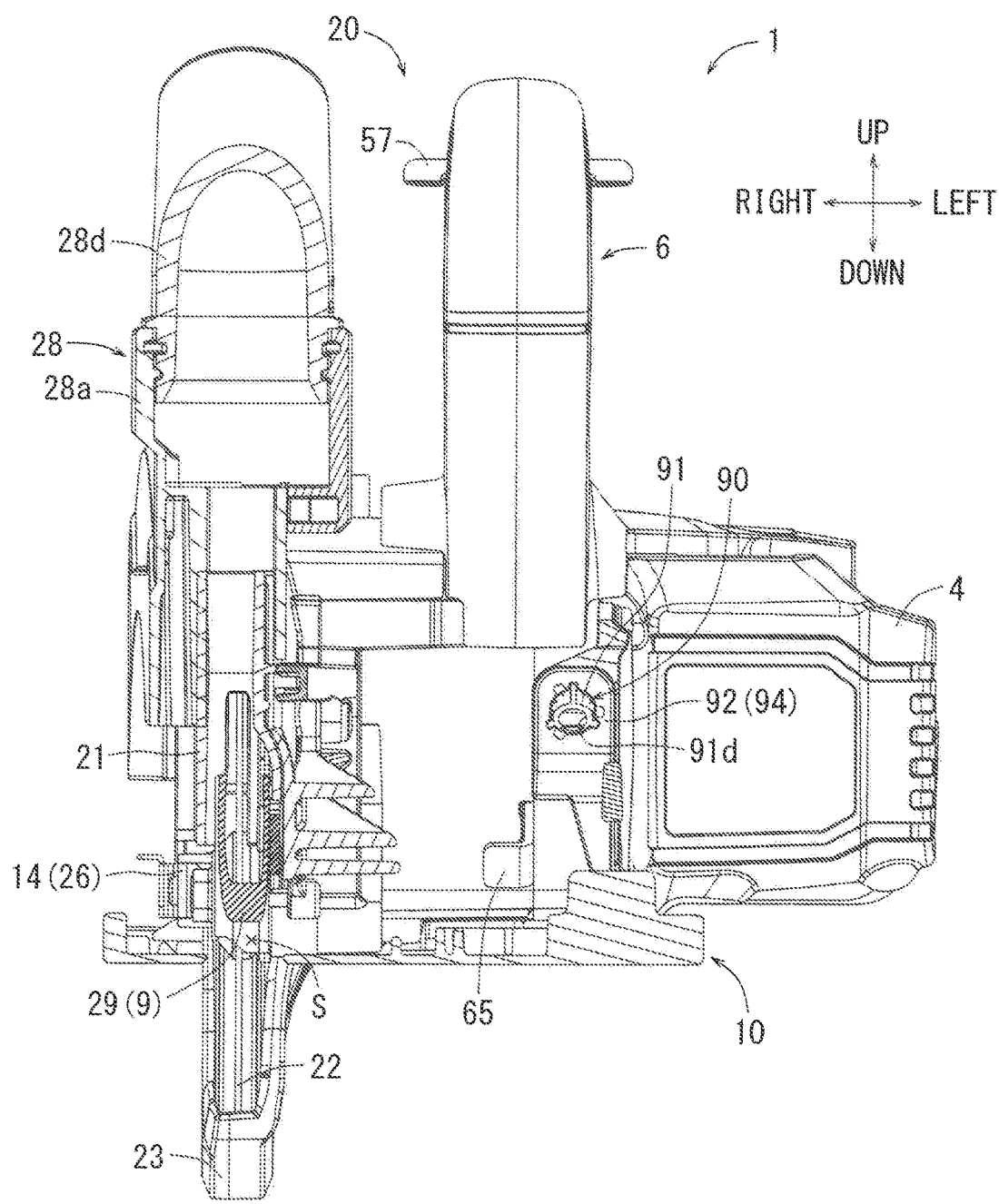
FIG. 32 is a front view of the dust proof circular saw that is partially removed.
Figure 33:
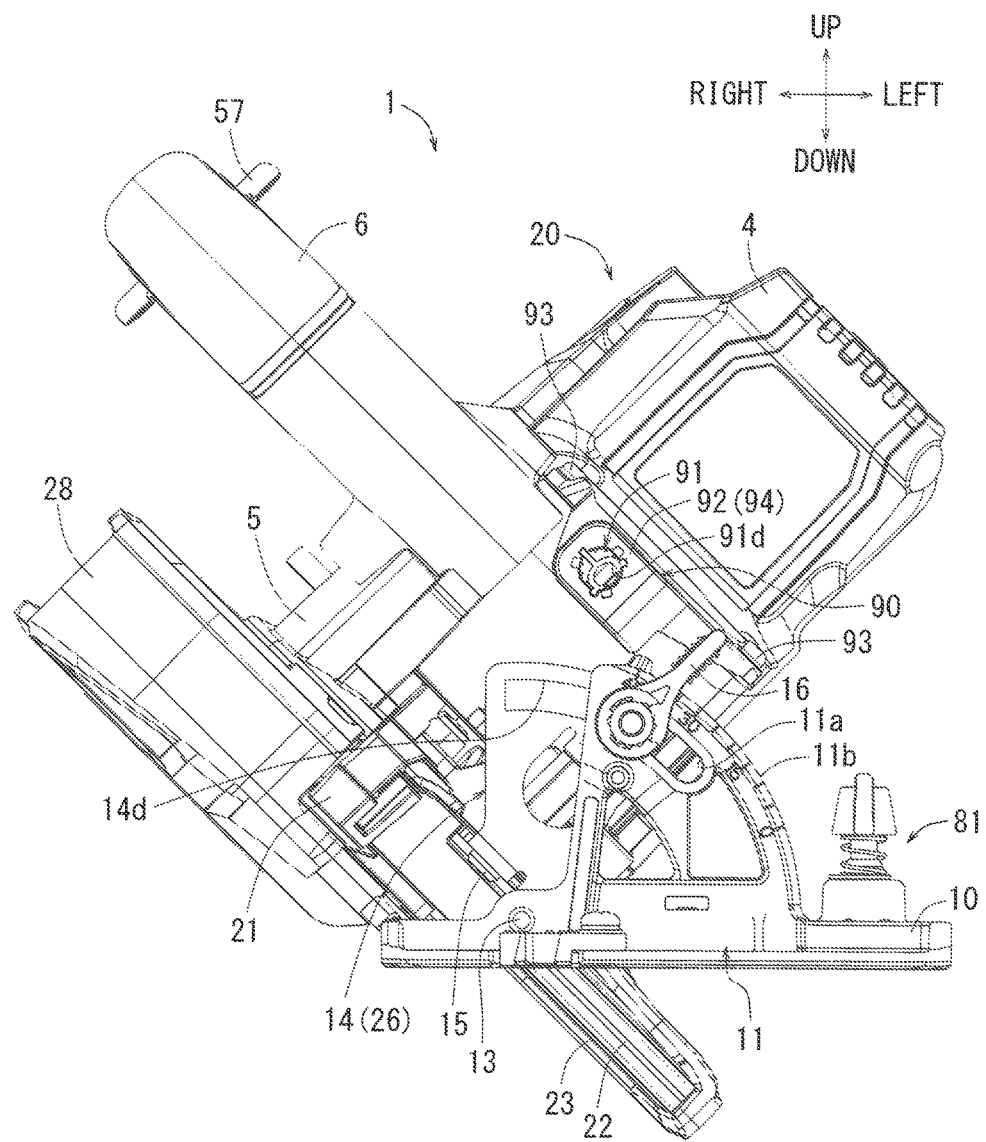
FIG. 33 is a front view of the dust proof circular saw when the circular saw main body is positioned in a tilted posture.

As shown in FIGS. 30 and 31, the circular saw main body 20 is provided with a blower mechanism 90 that serves to blow forward the air out of the motor housing 4. The blower mechanism 90 has a blower base 92 attached to the motor housing 4 and a rotary nozzle 91 attached to the blower base 92. The blower base 92 may be attached to the motor housing 4 to cover an opening 4d of the motor housing 4. The opening 4d is positioned radially outside of the cooling fan 36 i.e. in the flow path of the air from the cooling fan 36. The opening 4d is oriented forward and is covered with the blower base 92.

As shown in FIGS. 41 to 44, the blower base 92 includes a front wall 92a and a peripheral wall 92b extending in the front-to-rear direction around the entire extent of the outer radial periphery of the front wall 92a. An upper arm 92e extends upward from an upper part of the peripheral wall 92b. An upper attachment portion 92f extends rearward from an upper end of an upper arm 92e. An attachment hole 92g is formed to pass through the upper attachment portion 92f in the right-left direction. A lower arm 92h downwardly extends from a lower part of the peripheral wall 92b. A lower attachment portion 92i rearwardly extends from a lower end of the lower arm 92h. An attachment hole 92j is formed in the lower attachment portion 92i that extends in the right-left direction.

Figure 34:
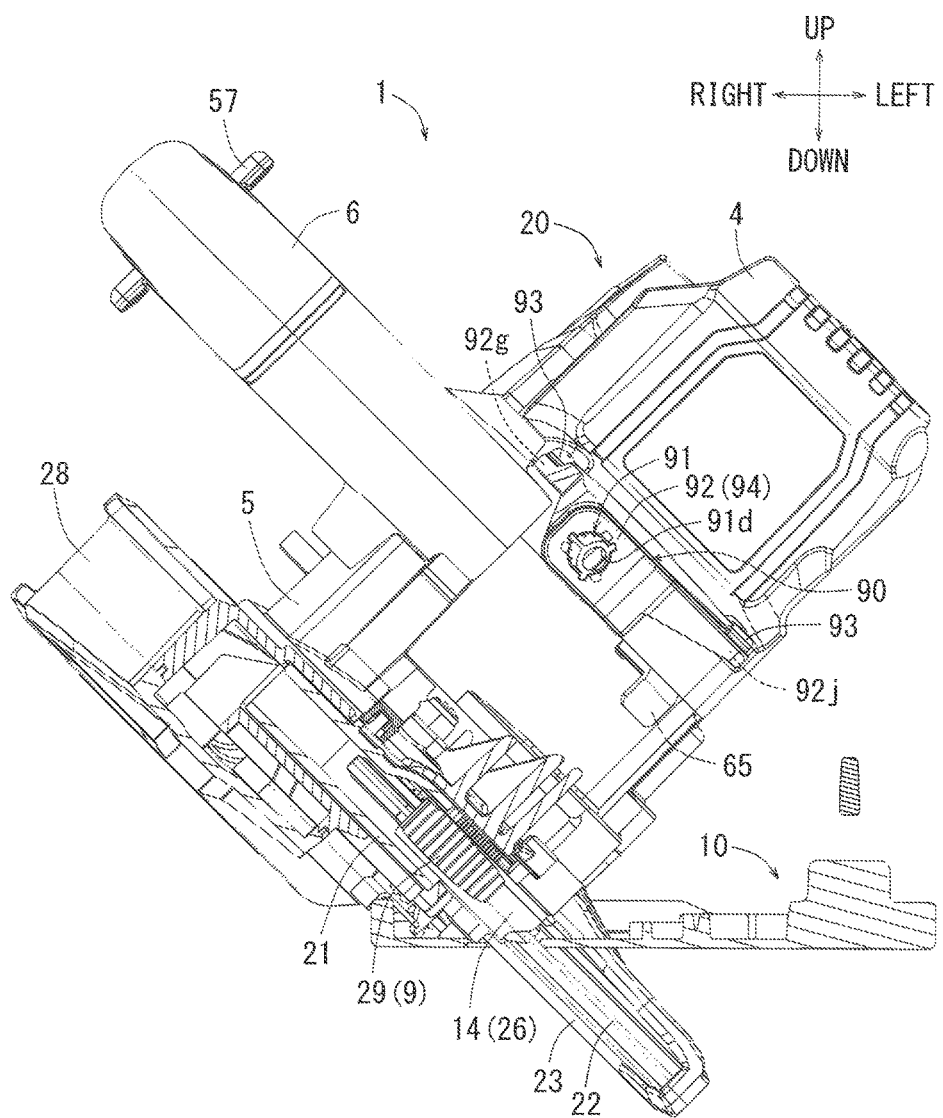
FIG. 34 is a front view of the dust proof circular saw that is partially removed when the circular saw main body is positioned in the tilted posture.
Figure 35:
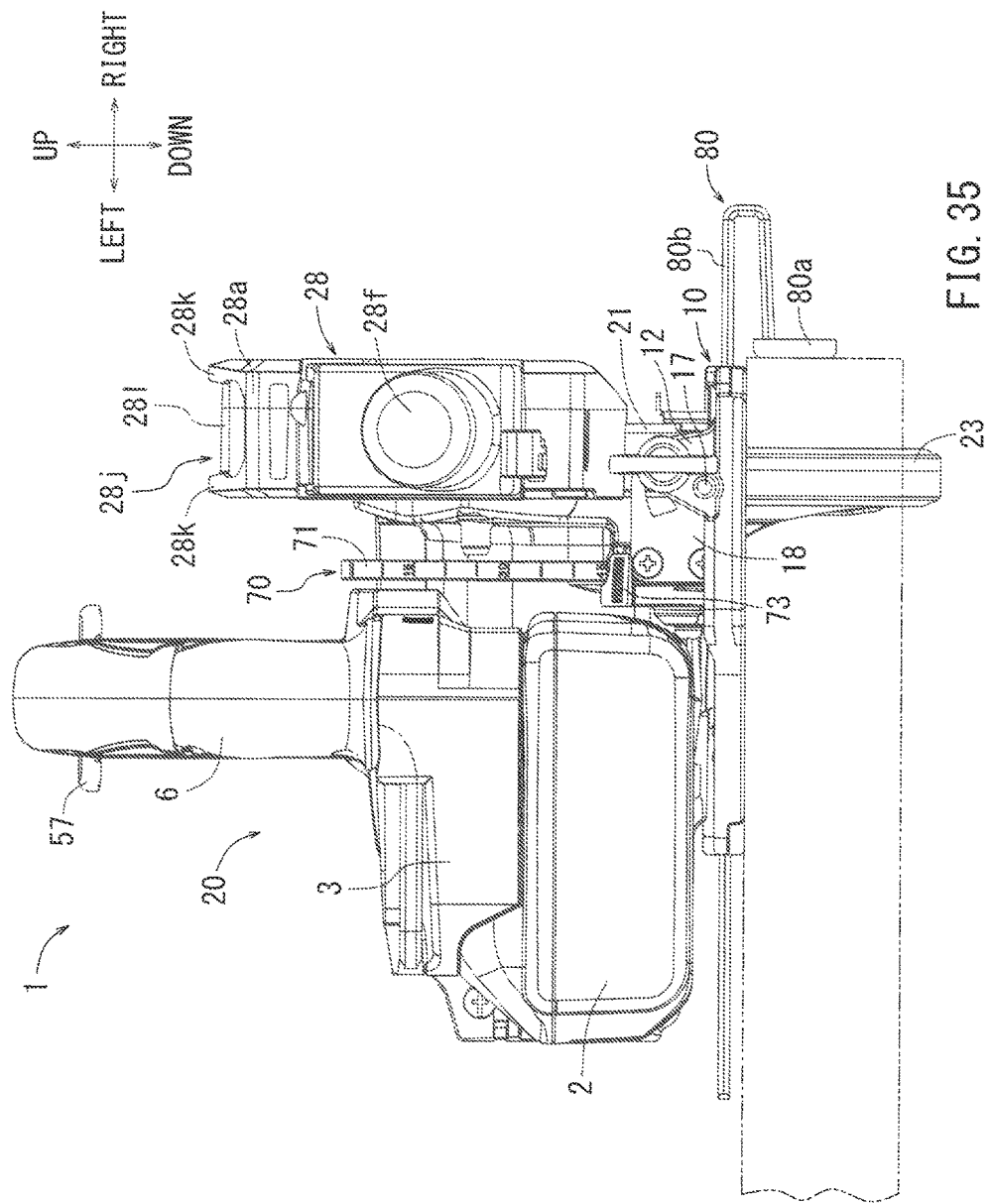
FIG. 35 is a rear view of the dust proof circular saw.
Figure 36:
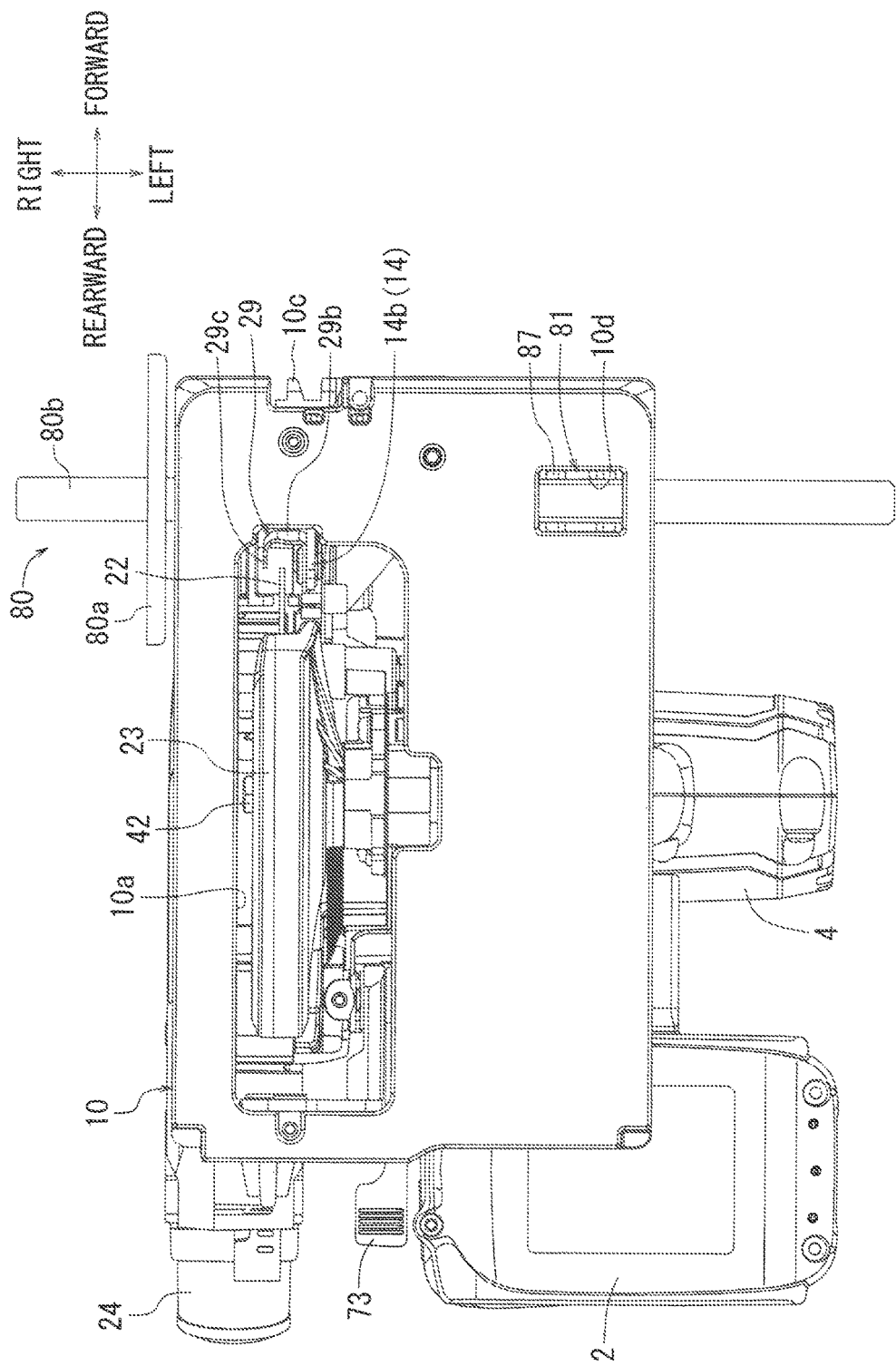
FIG. 36 is a bottom view of the dust proof circular saw.
Figure 42:
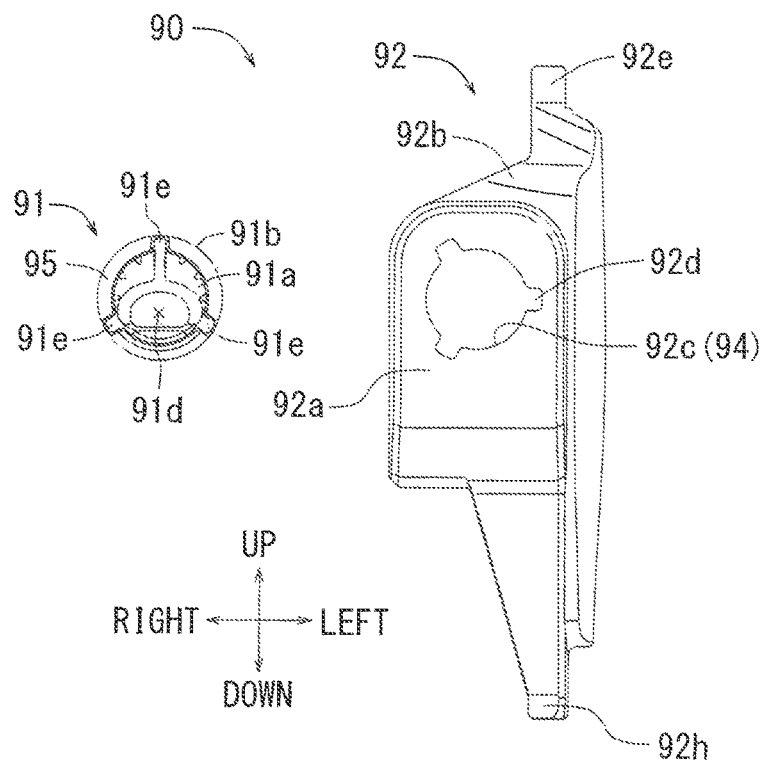
FIG. 42 is an exploded front view of the blower mechanism.

As shown in FIG. 34, the blower base 92 is mounted to a front surface of the motor housing 4 by screws 93 inserted into the attachment holes 92g and 92j. As shown in FIG. 42, a circular opening 92c and a plurality of extending grooves 92d are formed in the front wall 72a. The plurality of the extending grooves 92d is, for example, three radial grooves, extending radially outward from the opening 92c. The plurality of grooves 92d is positioned at equal intervals, for example, by 120 degrees. The rotary nozzle 91 is inserted through the opening 92c to be attached to the blower base 92.

As shown in FIGS. 41 to 44, the rotary nozzle 91 includes a cylindrical main body 91a, a neck 91c and a stopper portion 91b wherein they are positioned coaxially about the longitudinal center of the cylindrical main body 91a. A plurality of outward radial projections 91e are formed on the outer radial peripheral surface of the cylindrical main body 91a. The plurality of the projections 91e project from the main body nozzle 91a in a radial direction and are arranged at equal intervals in a circumferential direction. For example, three projections 91e may be arranged at intervals by 120 degrees. The projections 91e each have a predetermined axial length around the outer peripheral surface of the main body nozzle 91a. The rotary nozzle 91 is inserted in the opening 92c of the blower base 92 from the back such that the projections 91e pass through the extended grooves 92d.

As shown in FIGS. 41 to 44, the stopper portion 91b has a larger diameter than that of the main body nozzle 91a and that of opening 92c of the blower base 92. Therefore, because the rotary nozzle is inserted in the opening 92c of the blower base 92 from the back, the stopper portion 91b abuts the backside of the front wall 92a of the blower base 92 as the rotary nozzle 91 is inserted into the opening 92c. As a result, the rotary nozzle 91 is prevented from being pulled out in the forward direction from the blower base 92.

As shown in FIGS. 41 to 44, the projections 91e of the main body nozzle 91a are inserted into the extended grooves 92d of the blower base 92 from the back. Subsequently, the main body nozzle 91a rotates around an axis relative to the blower base 92. As a result, the projections 91e are positioned in front of the front wall 92a of the blower base 92 so that the rotary nozzle 91 is prevented from being pulled out rearward from the blower base 92. The neck 91c is positioned in the opening 92c when the rotary nozzle 91 is attached to the blower base 92.

Figure 41:
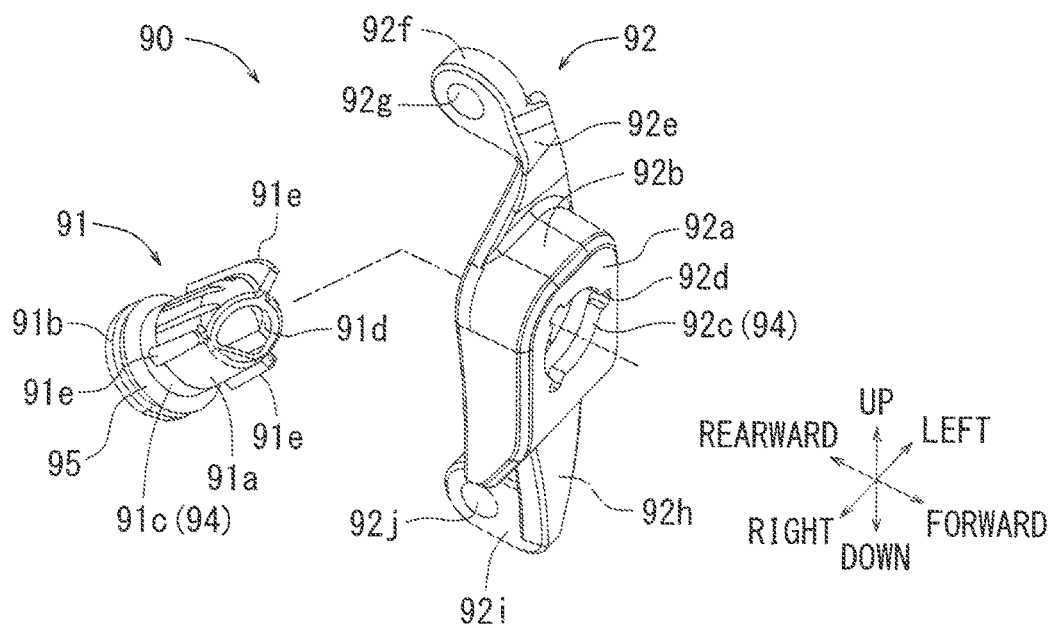
FIG. 41 is an exploded perspective view of a blower mechanism.

As shown in FIGS. 41 and 42, the orientation change mechanism 94 allows the rotary nozzle 91 to rotate around forward-to-rear axis relative to the blower base 92. The orientation change mechanism 94 includes the opening 92c of the blower base 92 and the neck 91c of the rotary nozzle 91. The neck 91c has the same diameter as that of the main body nozzle 91a but does not have projections 91e. The neck 91c has a cylindrical shape with a circular opening 92c. Therefore, the neck 91c may be rotatably and stably supported in the opening 92c. In this way, the rotary nozzle 91 is rotatably connected around the forward-to-rear axis relative to the blower base 92.

As shown in FIGS. 41 to 44, the orientation change mechanism 94 further includes the stopper portion 91b and the projections 91e that prevent the rotary nozzle 91 from being pulled out of the blower base 92. An O-ring 95 is attached to the neck 91c of the rotary nozzle 91. The O-ring 95 is positioned between the stopper portion 91b and the front wall 92a of the blower base 92 and covers the gap between the rotary nozzle 91 and the blower base 92.

Figure 43:
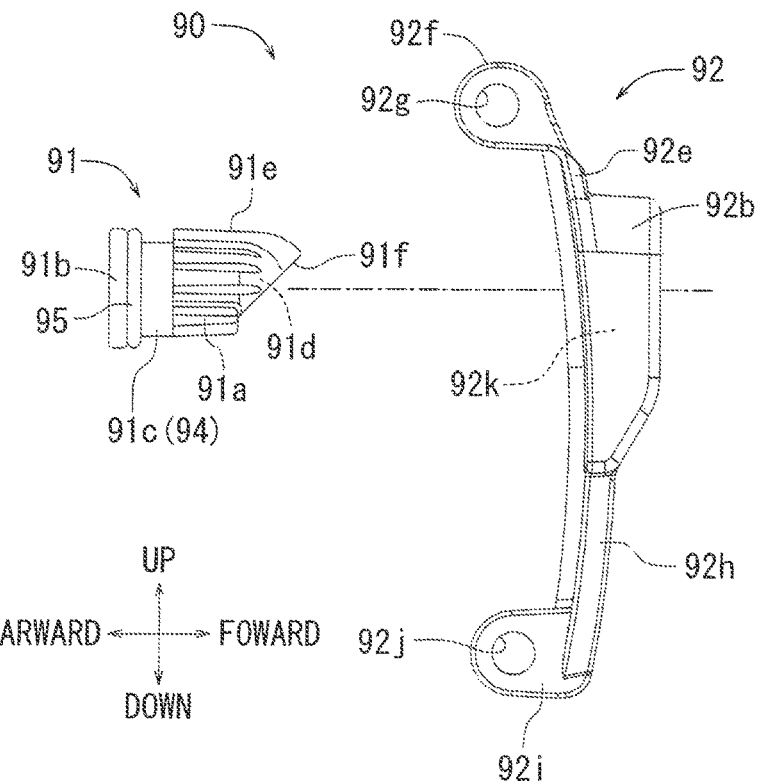
FIG. 43 is an exploded right side view of the blower mechanism.
Figure 44:
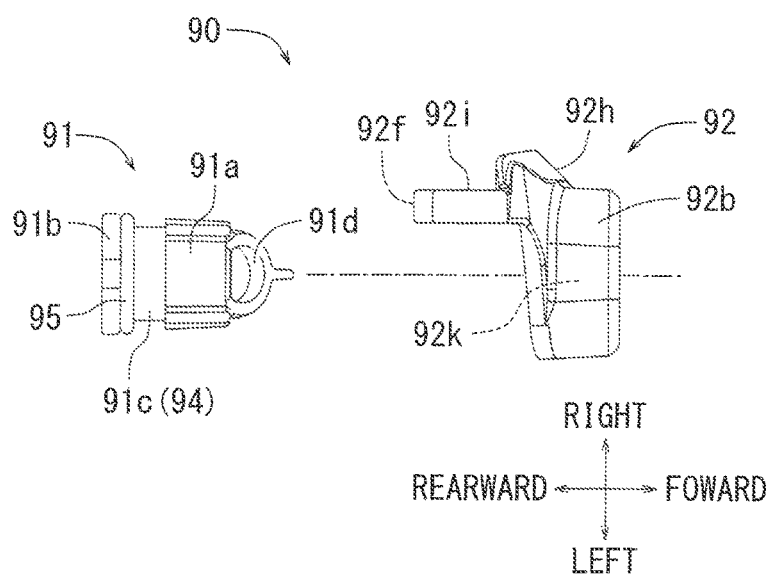
FIG. 44 is an exploded bottom view of the blower mechanism.

As shown in FIGS. 41 and 43, the rotary nozzle 91 includes a front surface 91f inclined with respect to the front-to-rear axis. The air outlet 91d extends along the front-to-rear axis of the rotary nozzle 91 and is also inclined at the leading end of the rotary nozzle 91. The inclination of the air outlet 91d is inclined with respect to the front-to-rear axis of the rotary nozzle 91 at the same inclination as the front surface 91f such that the air is blown out of the air outlet 91d at a predetermined angle with respect to the axis.

As shown in FIGS. 30 and 31, the blower mechanism 90 is positioned in front of the circular saw main body 20. The air produced by the cooling fan 36 is introduced into the blower base 92 through the opening 4d of the motor housing 4. The air within the blower base 92 passes through a through hole along the front-to-rear axis of the rotary nozzle 91. The air outlet 91d of the rotary nozzle 91 is opened toward the front so that the air is blown out via the air outlet 91d toward the front.

As shown in FIG. 31, the rotary nozzle 91 is set at a predetermined angle around its front-to-rear axis. The air outlet 91d is oriented in the right-left direction or the up-down direction depending on the rotation of the rotary nozzle 91 about the axis. Accordingly, the air blowing out of the air outlet 91*d* may be adjusted to blow out in the right-left direction or the up-down direction.

As shown in FIGS. 30 and 31, the blower mechanism 90 is positioned outside of the rotational radial direction of the cooling fan 36 and instead is directly positioned on a flow path of the air where said flow is produced by the rotation of cooling fan 36. Therefore, the distance from the cooling fan 36 to the air outlet 91*d* is short so that a frictional resistance applied to the air flowing therebetween is low, and the flow velocity is still maintained. Consequently, the velocity of the air blowing out of the air outlet 91*d* is relatively high. The orientation of the air blown out of the air outlet 91*d* is determined by the orientation of the rotary nozzle 91. For example, the air may flow toward the marking line guide 10*c* when the rotary nozzle's air outlet 91*d* is oriented to face the marking line guide 10*c* of the base 10.

As shown in FIGS. 30 and 31, the chips accumulated near the marking line guide 10*c* may be blown away by the air blown out of the air outlet 91*d* when the air outlet 91*d* of the blower mechanism 90 is oriented to the marking line guide 10*c*.

Figure 45:
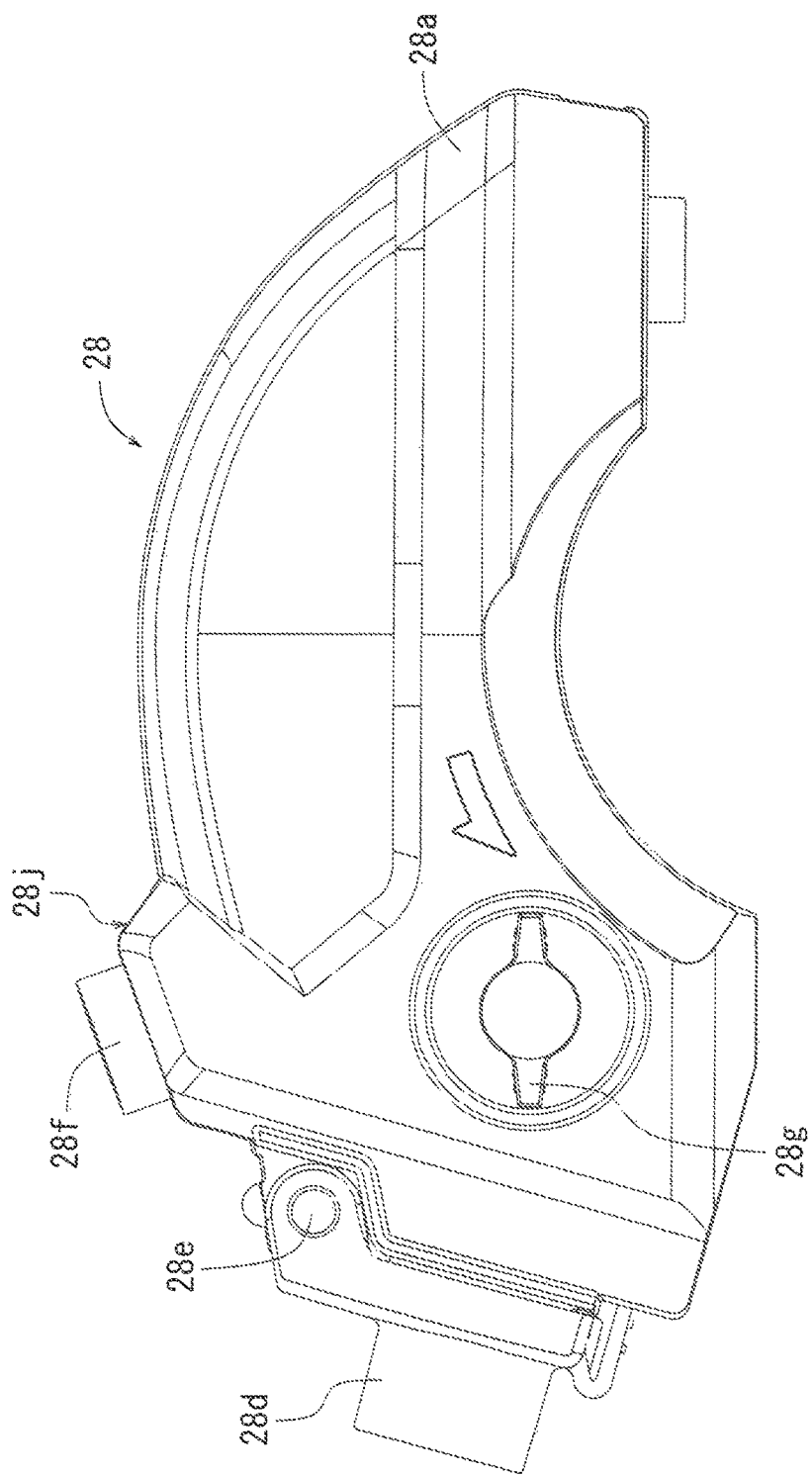
FIG. 45 is a right side view of a dust box.
Figure 46:
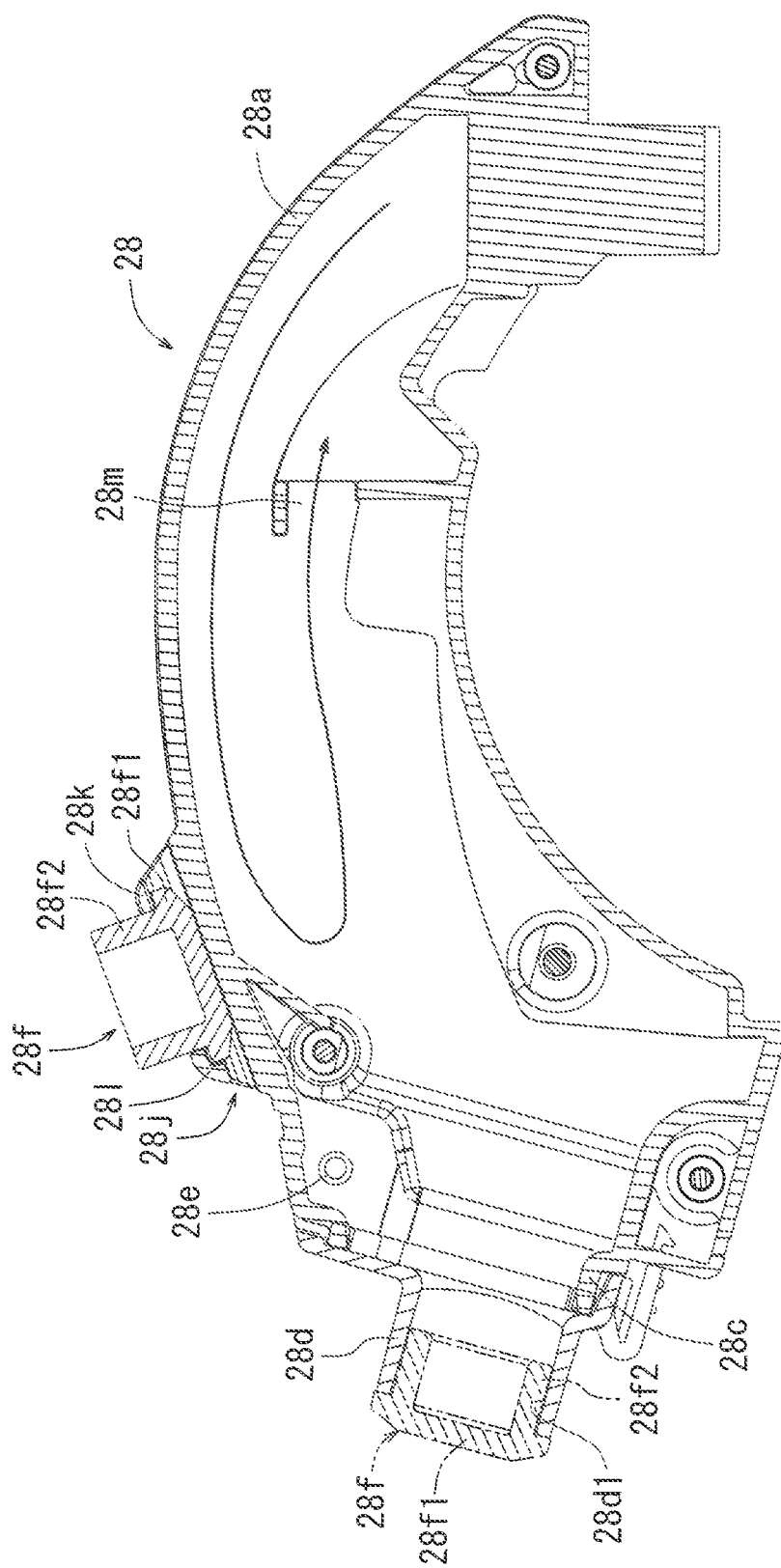
FIG. 46 is a vertical sectional view of the dust box.
Figure 47:
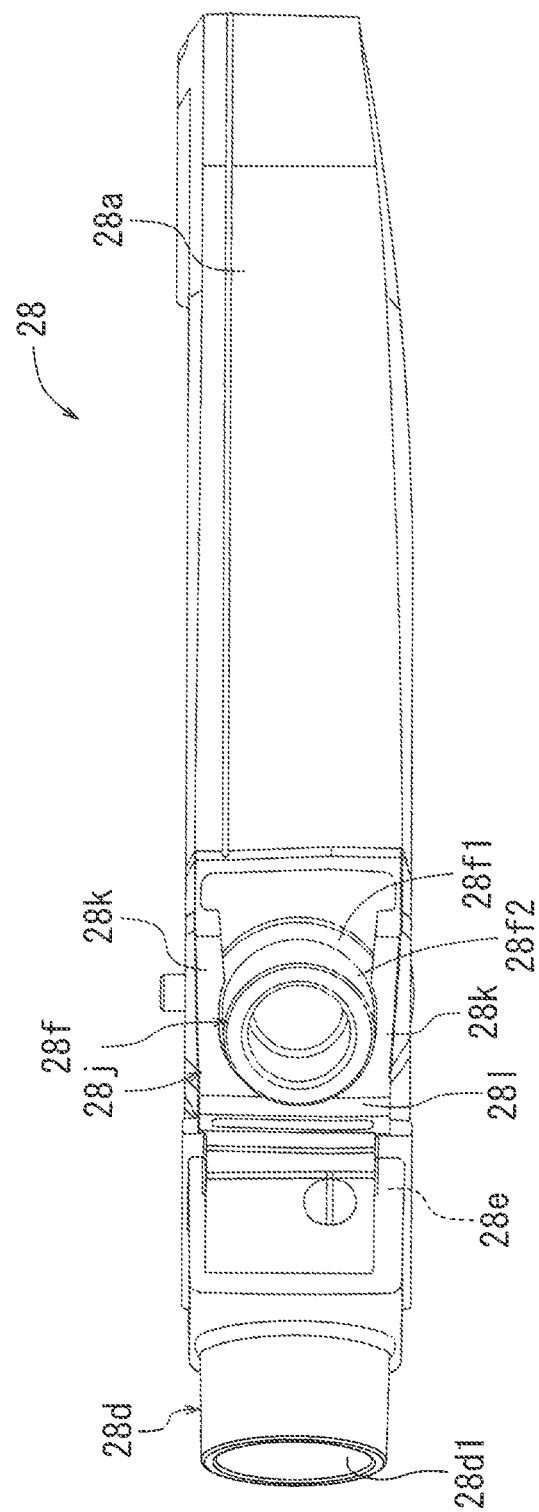
FIG. 47 is a top view of the dust box.

As shown in FIGS. 45 to 47, the dust box 28 includes a temporary holding mechanism 28*j* for temporarily holding the cap 28*f*, which is removed from the cover 28*d*. The temporary holding mechanism 28*j* has pair of rails 28*k* and a bridge portion 28*l* configured to connect rear ends of the pair of rails 28*k*. The pair of the rails 28*k* extends in the front-rear direction along the outer peripheral surface of the box main body 28*a*. The bridge portion 28*l* defines a gap between itself and the outer peripheral surface of the box main body 28*a*. The cap 28*f* has a tubular portion 28*f*2 to be inserted into an opening 28*d*1 of the cover 28*d* and a cover portion 28*f*1 for covering the opening 28*d*1. The cover portion 28*f*1 is circular with a larger diameter than that of the tubular portion 28*f*2 and extends radially outward from one end of the tubular portion 28*f*2.

As shown in FIGS. 46 and 47, the cap 28*f* is moved rearward along the rails 28*k* while the cover portion 28*f*1 of the cap 28*f* is inserted below the rails 28*k*. As a result, the cover portion 28*f*1 is positioned below the bridge portion 28*l* and the rail 28*k*. The tubular portion 28*f*2 protrudes upward between the rails 28*k*. The cap 28*f* is moved forward along the rails 28*k* when the cap 28*f* is to be removed from the temporary holding mechanism 28*j*. The chips and the air within the dust box 28 flow from the front to the back and then the chips may be accumulated on the back. The air flows from the front to the back and flows subsequently downward and turns back to the front, and is finally discharged from the dust box 28 through a release hole 28*m*. Subsequently, the air may, for example, turn and flow to the right within the fixed cover 21 finally to be discharged out of the fixed cover 21.

As shown in FIG. 41, the blower mechanism 90 includes an air outlet 91*d* for blowing the air out and the orientation change mechanism 94 capable of changing the orientation of the air outlet 91*d*. Therefore, the orientation of the air blown out of the blower mechanism 90 can be set at a predetermined angle, for example, in accordance with a working condition.

As described above, the blower mechanism 90 has an air outlet 91*d* for the air and is set in such an orientation that the air outlet 91*d* can blow off the chips drifting in the air in front of the circular saw main body (cutting device main body) 20. In this way the chips floating in front of the eyes of the user can be blown away.

As described above, dust covers 24 and 29 may be attached to the base 10 via the angular guide 14 provided near the front end of the base 10. The size of the dust covers 24 and 29 may be reduced. For example, when the dust cover is rotatably connected relative to the center of rotation of the cutting blade 22, the dust cover must be extended from a center of rotation of the cutting blade 22 to the vicinity of the front end of the base 10. In comparison with such a dust cover, the size of the dust covers 24 and 29 can be reduced.

As shown in FIGS. 27 and 28, the dust proof circular saw 1 includes a vertical coupling structure (auxiliary cover tilting mechanism 25A) for movably connecting the dust cover 29 in an up-down direction relative to the circular saw main body (cutting device main body) 20. The vertical coupling structure serves to tilt the dust cover 29 with respect to the base 10 and to move in the up-down direction with respect to the circular saw main body 20 in a synchronous manner when the circular saw main body 20 is moved in the up-down direction with respect to the base 10.

As shown in FIGS. 27 and 28, the vertical coupling structure includes vertically elongated cam surface or surfaces 29*d* and 29*e* formed on the dust cover 29, and a cam follower (at least one of pins 19A and 19B) that protrudes from the circular saw main body 20 and movably abut at least one of the cam surfaces 29*d* and 29*e* along the cam surfaces. Consequently, with a relatively simple structure, the dust cover 29 can be movably connected to the circular saw main body 20 in the up-down direction.

The vertical coupling structure (auxiliary cover tilting mechanism 25A) shown in FIGS. 27 and 28 includes the cam surfaces 29*d* and 29*e* and the cam follower (pins 19A and 19B). Alternatively, the vertical coupling structure (auxiliary cover tilting mechanism 25A) may have vertically elongated cam surface or surfaces formed on the circular saw main body 20, and a cam follower (pin(s)) that extend from the dust cover 29 and movably abut the cam surface along the cam surface.

The various exemplary embodiment described above in detail with reference to the attached drawings are intended to be representative of the present invention and thus non limiting embodiments. The detailed description is intended to teach a person of skill in the art to make, use and/or practice various aspects of the present teachings and thus does not limit the scope of the invention in any manner. Furthermore, each of the additional features and teachings disclosed above may be applied and/or used separately or with other features and teachings in any combination thereof, to provide improved portable cutting device and/or methods of making and using the same.

What is claimed is:

1. A portable cutting device comprising:
   a cutting device main body having a motor;
   a disc cutter blade that is rotated by the motor;
   a fixed cover that is fixed to the cutting device main body to cover a part of an outer radial periphery of the disc cutter blade;
   a base configured to support the cutting device main body such that an angle of the cutting device main body in an up-down direction relative to the base can be adjusted above the base to adjust the extent to which the disc cutter blade projects in a downward direction beneath the base, wherein the base also supports the cutting device main body such that an angle in a right-left direction of the cutting device main body relative to the base can be adjusted to adjust a tilting angle of the disc cutter blade in the right-left direction;

an auxiliary cover (1) configured to cover an outer radial periphery of the disc cutter blade between the fixed cover and the base and (2) that includes (a) an angular guide that is attached to the base and (b) a dust cover that connects the angular guide and the cutting device main body;

a laterally tilting support shaft configured to pivotally connect the auxiliary cover to the base such that the auxiliary cover can pivot around the laterally tilting support shaft relative to the base in the right-left direction in accordance with the angle of the cutting device main body in the right-left direction; and an auxiliary cover moving mechanism that includes (1) a vertically elongated cam surface formed by the dust cover and (2) a cam follower comprising a pin protruding from the cutting device main body that interacts with the cam surface as the pin moves along the cam surface so that the dust cover is movably connected in the up-down and front-rear directions to the cutting device main body;

the cam surface includes a recessed portion of a rear edge of the dust cover in front-to-rear edge of the dust cover in a front-to-rear direction; and the pin movably abuts the recessed portion of the cam surface.

2. The portable cutting device of claim 1, wherein:

the base lies in a plane defined by a front-rear direction and the right-left direction, where a frontal intersection point of the outer radial periphery of the disc cutter blade and the base moves in the rear direction when adjusting the cutting device main body upward direction, and where the frontal intersection point moves conversely in the front direction when adjusting the cutting device main body in the downward direction, the portable cutting device includes an auxiliary cover laterally moving mechanism configured to move a lower end of the dust cover in the front-rear direction commensurate with the movement of the intersection point, the auxiliary cover laterally moving mechanism includes a front-to-rear elongated hole formed in either one of the angular guide and the dust cover, and at least one pin protruding from the other one of the angular guide and the dust cover that is movably inserted into the front-to-rear elongated hole along the front-to-rear elongated hole.

3. The portable cutting device of claim 2, wherein the angular guide includes a bracket to which the cutting device main body is pivotally attached in the up-down direction, wherein the bracket is formed with the front-to-rear elongated hole.

4. The portable cutting device of claim 2, where the angular guide comprises parallel brackets which connect the cutting device main body with the auxiliary cover, where further the angular guide comprises a front wall perpendicular to the parallel brackets, wherein the front-to-rear elongated hole is located on one of the parallel brackets of the angular guide, wherein at least one of pin inserted through the front-to-rear elongated hole is perpendicular to the laterally tilting support shaft inserted through a hole on the front wall of the angular guide.

5. The portable cutting device of claim 1, wherein the auxiliary cover moving mechanism includes a second vertically elongated cam surface comprising a second recessed portion of the rear edge of the dust cover in the front-to-rear direction, wherein a rearward protrusion lies vertically in between the vertically elongated cam surface and the second vertically elongated cam surface, and a second cam follower comprising a pin provided on the cutting device main body which movably abut the second vertically elongated cam surface along the second vertically elongated cam surface.

6. A portable cutting device comprising:

a cutting device main body having a motor;

a disc cutter blade that is rotated by the motor;

a fixed cover that is fixed to the cutting device main body to cover a part of an outer radial periphery of the disc cutter blade;

a base configured to support the cutting device main body such that an angle of the cutting device main body in an up-down direction relative to the base can be adjusted above the base, to adjust the extent to which the disc cutter blade projects in a downward direction beneath the base, wherein the base also supports the cutting device main body such that an angle in a right-left direction of the cutting device main body relative to the base can be adjusted to adjust a tilting angle of the disc cutter blade in the right-left direction;

an auxiliary cover (1) movably attached to the fixed cover to cover an outer radial periphery of the disc cutter blade between the fixed cover and the base in a cutting direction and (2) that includes (a) an angular guide that is attached to the base and (b) a dust cover that connects the angular guide and the cutting device main body; and an auxiliary cover moving mechanism that includes (1) a vertically elongated cam surface formed by the dust cover and (2) a cam follower comprising a pin protruding from the cutting device main body that interacts with the cam surface as the pin moves along the cam surface;

the cam surface includes a recessed portion of a rear edge of the dust cover in a front-to-rear direction; and the pin movably abuts the recessed portion of the cam surface.

7. The portable cutting device of claim 6, wherein:

the base lies in a plane defined by a front-rear direction and the left-right direction, where a frontal intersection point of the outer radial periphery of the disc cutter blade and the base moves in the rear direction when adjusting the cutting device main body upward direction, and where the frontal intersection point moves conversely in the front direction when adjusting the cutting device main body in the downward direction, the portable cutting device includes an auxiliary cover laterally moving mechanism configured to move a lower end of the dust cover in the front-rear direction commensurate with the movement of the intersection point, the auxiliary cover laterally moving mechanism includes a front-to-rear elongated hole formed in either one of the angular guide and the dust cover, and at least one pin protruding from the other one of the angular guide and the dust cover that is movably inserted into the front-to-rear elongated hole along the front-to-rear elongated hole.

8. The portable cutting device of claim 7, wherein the angular guide includes a bracket to which the cutting device main body is pivotally attached in the up-down direction, wherein the bracket is formed with the front-to-rear elongated hole.

9. A portable cutting device comprising:

a cutting device main body having a motor;

a disc cutter blade that is rotated by the motor;

a cover body that (1) is attached to the cutting device main body to cover an outer radial periphery of the disc cutter blade and (2) includes (a) an angular guide that is attached to the base in an angle-adjustable manner in the right-left direction and (b) a dust cover that connects the angular guide and the cutting device main body;

a base configured to support the cutting device main body such that an angle of the cutting device main body in an up-down direction relative to the base can be adjusted above the base, to adjust the extent to which the disc cutter blade projects in a downward direction beneath the base; and a vertical coupling structure that includes (1) a vertically elongated cam surface formed by the dust cover and (2) a cam follower comprising a pin protruding from the cutting device main body that interacts with the cam surface as the pin moves along the cam surface and is configured to movably connect the dust cover in the up-down direction to the cutting device main body; wherein:

the cover body is tilted with the cutting device main body in a right-left direction, at least of a part of the cover body moves with respect to the cutting device main body in the up-down direction in accordance with an up-down pivotal movement of the circular saw main body so that a gap between the cover body and the base is reduced;

the cam surface includes a recessed portion of a rear edge of the dust cover in a front-to-rear direction; and the pin movably abuts the recessed portion of the cam surface.

* * * * *